United States Patent [19]
Takase et al.

[11] Patent Number: 5,689,501
[45] Date of Patent: Nov. 18, 1997

[54] CONNECTIONLESS COMMUNICATION SYSTEM

[75] Inventors: Tadahiro Takase, Oita; Kazuo Hajikano, Kawasaki; Takeshi Kawasaki, Kawasaki; Toshio Shimoe, Kawasaki; Tetsuo Tachibana, Kawasaki; Teruaki Hagihara, Kawasaki; Satoshi Kakuma, Kawasaki; Masami Murayama, Kawasaki; Ryuichi Takechi, Kawasaki; Satoshi Kuroyanagi, Kawasaki; Jyoei Kamoi, Kawasaki; Hiroshi Tomonaga, Kawasaki, all of Japan

[73] Assignee: Fujitsu Limited, Kawasaki, Japan

[21] Appl. No.: 434,744

[22] Filed: May 4, 1995

Related U.S. Application Data

[62] Division of Ser. No. 378,088, Jan. 25, 1995, which is a continuation of Ser. No. 930,559, Sep. 30, 1992, abandoned.

[51] Int. Cl.$^6$ .................................................. H04L 12/56
[52] U.S. Cl. .......................... 370/244; 370/397; 370/474; 370/905
[58] Field of Search .................................. 370/242, 244, 370/250, 389, 392, 395, 396, 397, 470, 471, 474, 522, 905, 912, 913

[56] References Cited

U.S. PATENT DOCUMENTS

| | | | |
|---|---|---|---|
| 4,956,839 | 9/1990 | Torii et al. | 370/60 |
| 5,050,166 | 9/1991 | Cantoni et al. | 370/94.1 |
| 5,067,123 | 11/1991 | Hyodo et al. | 370/60 |
| 5,101,404 | 3/1992 | Kunimoto et al. | 370/60 |
| 5,113,392 | 5/1992 | Takiyasu et al. | 370/94.1 |
| 5,119,369 | 6/1992 | Tanabe et al. | 370/60 |
| 5,202,885 | 4/1993 | Schrodi et al. | 370/60 |
| 5,214,642 | 5/1993 | Kunimoto et al. | 370/82 |
| 5,280,476 | 1/1994 | Kojima et al. | 370/60.1 |
| 5,287,535 | 2/1994 | Sakagawa et al. | 370/60 |

FOREIGN PATENT DOCUMENTS

| | | |
|---|---|---|
| 55-67818 | 5/1980 | Japan. |
| 1-240050 | 6/1983 | Japan. |
| 63-74346 | 4/1988 | Japan. |
| 63-215131 | 9/1988 | Japan. |
| 63-224445 | 9/1988 | Japan. |
| 2-34060 | 2/1990 | Japan. |
| 2-63345 | 3/1990 | Japan. |
| 2-67846 | 3/1990 | Japan. |
| 64-105641 | 3/1990 | Japan. |

OTHER PUBLICATIONS

IEEE Communication Magazine, vol. 27, No. 9., S. Minzer, "Broadband ISDN and Asynchronous Transfer Mode (ATM)," Sep., 1989.

IEEE Globecom., G. Clapp, "Broadband ISDN and Metropolitan Area Networks," Nov., 1987.

(List continued on next page.)

*Primary Examiner*—Alpus H. Hsu
*Attorney, Agent, or Firm*—Staas & Halsey

[57] ABSTRACT

A communication system for transmitting a fixed-length cell converted from a variable-length information including data and a destination of the data. The system includes a cell assembly/disassembly device for performing bi-directional conversion between the variable-length information and the fixed-length cell, a routing control device for receiving the fixed-length cell converted from the variable-length information by the cell assembly/disassembly device, for analyzing the destination of the data and for controlling a routing of the fixed-length cell based on the analyzed destination, and having an error detecting device for detecting an error of the variable-length information in the fixed-length cell, and a network for connecting the cell assembly/disassembly device and the routing control device by a fixed capacity path and for connecting the routing control device to another routing control device by the fixed capacity path or a variable capacity path.

14 Claims, 72 Drawing Sheets

OTHER PUBLICATIONS

IEEE Documents 802.6–87/15, British Columbia, Canada, G. Clapp et al., "Presentations to the IEEE 802.6 Working Group on Metropolitan Area Networks," 1987.

IEEE Documents 802.6–87/32, Fort Lauderdale, G. Clapp et al., "Man Architecture and Services," 1987.

IEEE Globecom, G. Clapp et al., "Metropolitan Area Network Architecture and Services," Nov./Dec., 1988.

IEEE Document 802.6–88/13, M. Pashan and G. Clapp, "IEEE 802.6 Man Services and Segment Format," 1988.

Commun. Week, T. Sweeney, "Making of a MAN," Dec., 1989.

"Project 802—Local & Metropolitan Area Networks" (Prepared by the IEEE 802.6 Working Group Editor).

IEEE Communications Magazine, vol. 29, No. 1, William R. Byrne et al., "Evolution of Metropolitan Area Networks to Broadband ISDN," pp. 78–82, Jan. 1991.

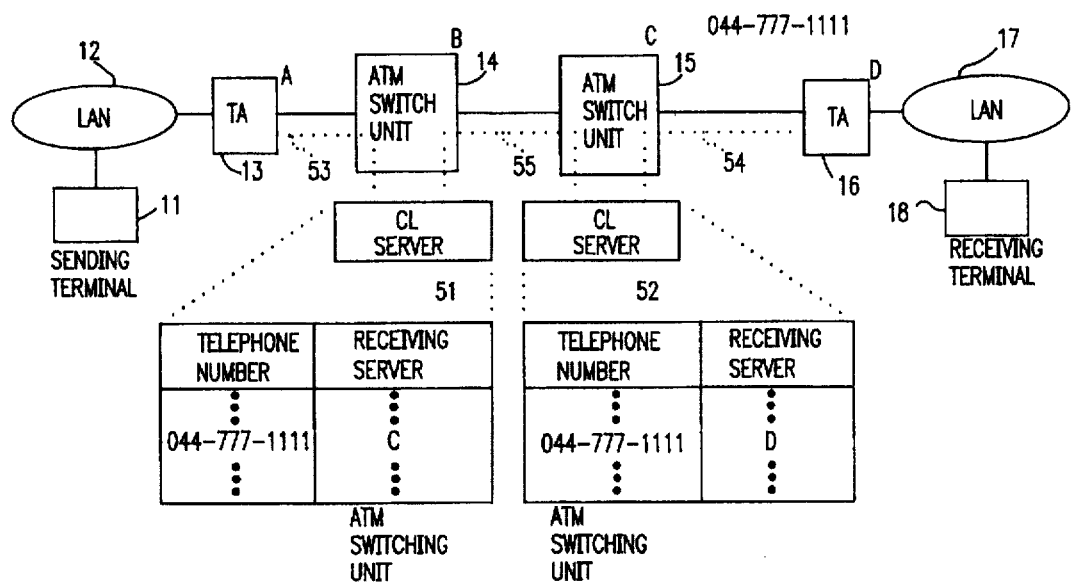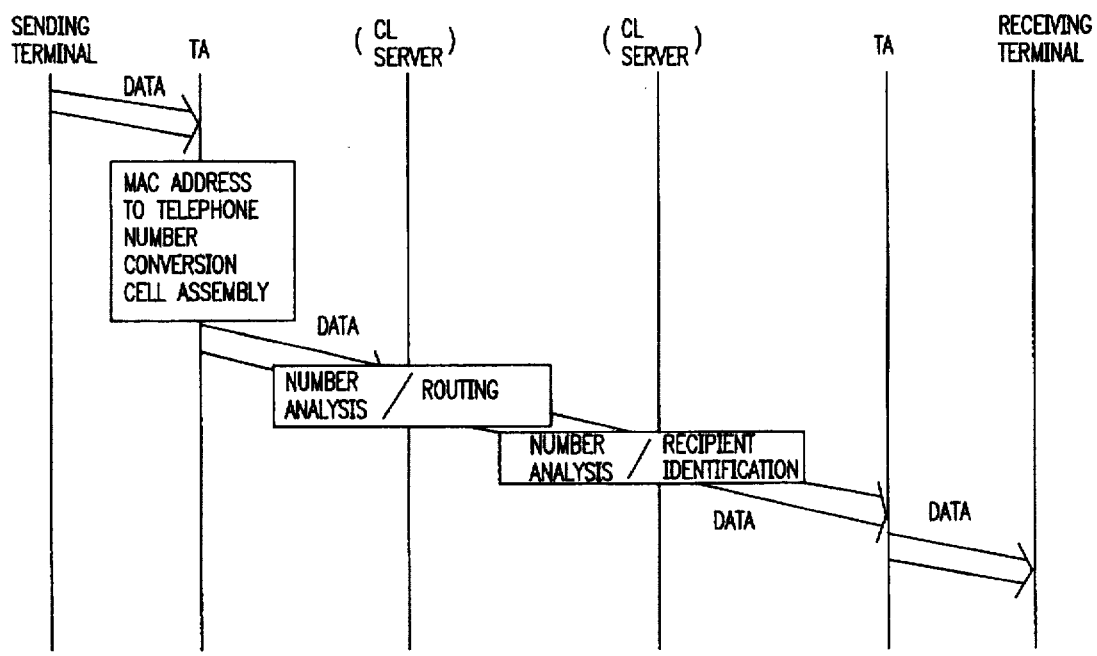
FIG. 14

| ITEM | NAME | FUNCTION |
|---|---|---|
| 1 | GFC | GENERIC FLOW CONTROL USED FOR FLOW CONTROL BETWEEN LINKS |
| 2 | VPI | PATH IDENTIFIER |
| 3 | VCI | CHANNEL IDENTIFIER |
| 4 | PAYLOAD TYPE : PT | TYPE OF CELL |
| 5 | CELL PRIORITY : PR | CELL REJECTION AT TIME OF CONGESTION |
| 6 | HEC | CRC 8, 1 BIT ERROR CONNECTION 2 BIT ERROR DETECTION |

FIG. 17

| ITEM | NAME | FUNCTION |
| --- | --- | --- |
| 1 | SEGMENT TYPE | POSITION OF CELL IN L3-PDU |
| 2 | MESSAGE ID | ANY VALUE IS SET IN UNITS OF LAN INFORMATION MULTIPLEXED ON SAME VCI |
| 3 | PAYLOAD LENGTH | EFFECTIVE INFORMATION LENGTH OF INFO BOM/COM=44BYTES, SSM/EOM≤44BYTES |
| 4 | CRC10 | RESULT OF CALCULATION OF THE WHOLE 48 BYTES OF LEVEL 2 (SAR) |
| 5 | SEQUENCE NUMBER | USED AS MEANS FOR DETECTING CELL-BY-CELL REJECTION BY PROVIDING SEQUENCE NUMBER 0~15 FOR CELLS IN UNITS OF L3-PDU |

FIG. 18

| NAME | BIT ASSIGNMENT | FUNCTION |
|------|----------------|----------|
| BOM  | 10 | L3-PDU, BEGINNING OF MESSAGE |
| COM  | 00 | L3-PDU, CONTINUATION OF MESSAGE |
| EOM  | 01 | L3-PDU, END OF MESSAGE, ZERO FILL IN FREE AREA IN CELL |
| SSM  | 11 | L3-PDU, SINGLE SEGMENT MESSAGE, ZERO FILL IN FREE AREA IN CELL |

FIG. 19

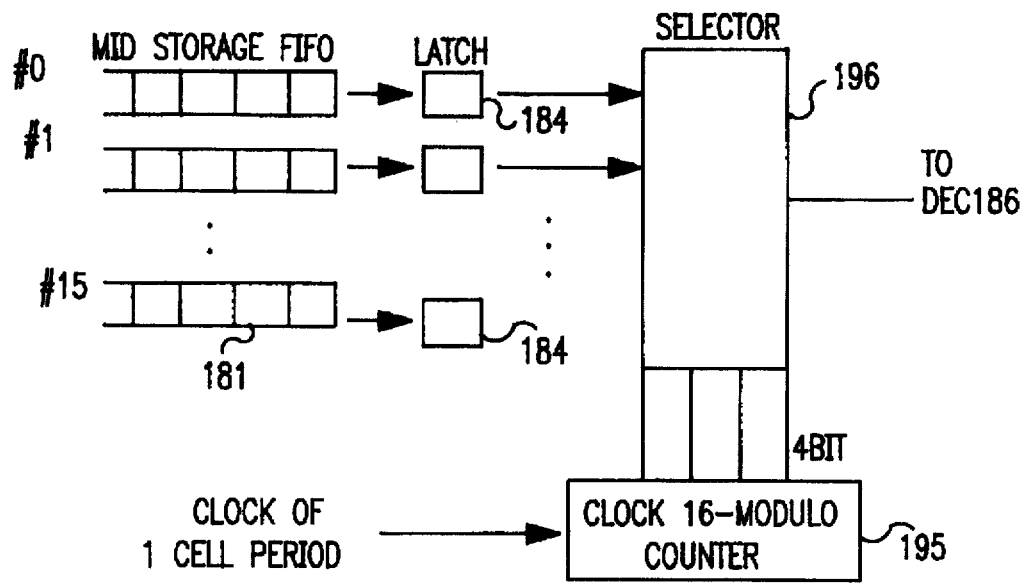
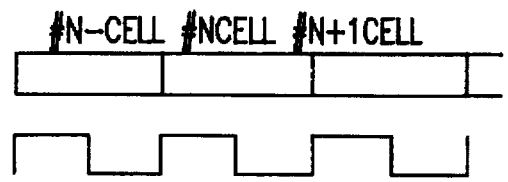
FIG. 50

CONNECTIONLESS COMMUNICATION SYSTEM

This application is a division of application Ser. No. 08/378,088, filed Jan. 25, 1995, now pending which is a continuation of application Ser. No. 07/930,559 filed Sep. 30, 1992 now abandoned.

BACKGROUND OF THE INVENTION

1. Field of the Invention

The present invention relates to an ATM-network-based connectionless communication system which accommodates local connectionless information, such as data in a local area network (LAN), i.e., information sent by a system arranged to immediately transfer data with the address of a receiving terminal placed in the header of a message without establishing a path to the receiving terminal, in an asynchronous transfer mode (ATM) network that uses a connection-oriented communication system, i.e., a system which, before data transfer is made, verifies that a path to a receiving terminal has been established, and interconnects LANs.

2. Description of the Related Art

Local area networks (LANs) installed in companies, which are progressing in a direction that increases speed and capacity, have been made increasingly large in scale and area. The need for connection among LANs scattered through companies is increasing. In general, LANs are adapted for connectionless communication. In contrast with the connectionless communication system, there is a connection-oriented communication system that is used in a broadband ISDN (integrated services digital network).

The connection-oriented communication system is a system which verifies that a path has been established between sending and receiving terminals before data transfer is made. In contrast, the connectionless (CL) communication system, which is used with LANs, is a system in which data transfer is made immediately with a destination address placed in the header without establishing a path to a receiving terminal.

For connection between networks, for example, local area networks, the so-called N-1 connection is generally established between entities, which is realized through the function of a low layer.

In the case where a large quantity of information is to be transmitted as in file transfer, the time required to establish connection can be disregarded. In the case of transmission of a slight quantity of data, such as addresses, however, if connection were established as in the case of transmission of a large quantity of data, the time therefore could not be disregarded. In the recent LAN/distributed processing systems, such short messages are continually transferred. To meet such a requirement, an idea of dividing connection services into conventional connection-oriented services and connectionless services has been introduced.

The need for accommodating local connectionless information, such as LAN data, by a global connection-oriented type ATM network to establish the connection between LANs is increasing. As a network for establishing the connection between LANs, the MAN (Metropolitan Area Network) is investigated at present, but it is not yet put to practice use. The ATM network is globally recognized as a next generation of broadband ISDN. Thus, building the ATM network in such a configuration as involves the functions of the MAN is very significant.

In general, connectionless information is variable in length and starts with a destination address. In order to accommodate such connectionless information in an ATM network which exchanges information as fixed-length cells, it is necessary to perform cell assembly/disassembly of variable-length data, and destination analysis and routing control on a cell-by-cell basis. In the case of communication of such connectionless information, the upper protocol is provided with a timer having a time-out period of several tens of milliseconds to several hundreds of milliseconds to verify the arrival of information. Although connectionless information was transmitted, if no acknowledgment signal is received from a receiving station until timer runout occurs, then the information will be retransmitted over and over again. Therefore, the cell-by-cell routing analysis must be performed fast, within tens of milliseconds. With the present-day techniques, it is required to perform the routing by means of hardware.

Heretofore, when messages are transferred between pieces of user equipment (UE) such as geographically scattered local area networks (LANs), host computers, etc., a connection unit to which one or more pieces of user equipment are connected terminates geographical or logical interface with the user equipment. Within a relay network, messages are relayed through private lines and packet networks.

FIG. 1 illustrates a prior art message transferring system in a wide-area relay network. In this figure, two or more pieces of user equipment (UE) 2 are connected to a relay network (NW) 1, which comprises UE accommodators 3 for accommodating the respective individual user equipment 2 and packet exchange switches or line exchange switches (SW) 4 for exchanging data within the relay network. Each of the UE accommodators 3 serves as a connection unit.

In FIG. 1, the relay network 1 is a packet switched network or line switched network. On this communication network, permanently or semipermanently fixed communication paths are established for message transfers.

With the prior art system of FIG. 1, even if messages are transferred between LANs, the connection between the LANs is not made in such a form as involves the functions of the LANs themselves. Thus, a problem with the prior art is that no ATM network is provided in a form that includes the LAN's functions.

FIG. 2 is a schematic illustration of a communication system in a local area network. In this figure, a sending terminal 7 places a machine (MAC) address in data to be transmitted and then transmits that data onto a network 8, while a receiving terminal 9 verifies the MAC address, i.e. 133.160.41.99 and then accepts that data from the network 8.

FIG. 3 is a diagram for use in explanation of a prior art inter-LAN communication system using call setting as a communication system which sends LAN communication data as described in connection with FIG. 2 to another LAN over an ATM (asynchronous transfer mode) network. In this figure, data from a sending terminal 11 is sent to a sending-area terminal adapter (TA) 13 via a sending-area LAN 12. In the TA 13, a MAC address is translated into the telephone number of a receiving terminal. A request to call the telephone number is sent to a receiving-area TA 16 via a sending-area ATM switching unit 14 and a receiving-area ATM switching unit 15.

On the other hand, the receiving-area TA 16 alerts the sending-area TA 13 to the completion of the call setting via the ATM switching units 15 and 14. Subsequently, the sending-area TA 13 sends data to be actually transmitted to the receiving-area TA 16. That data is transferred to the receiving terminal 18 via a receiving-area LAN 17. A problem with the prior art communication system utilizing call setting is that data to be transmitted cannot be transferred until call setting is completed between the sending-area TA 13 and the receiving-area TA 16.

In practice, data are transferred as accommodated in fixed-length ATM cells in communicating variable-length connectionless information, such as LAN data, between LANs via an ATM network. In such a case, it will be required to install between the receiving-area ATM switching unit 15 and the TA 16 of FIG. 3 a cell error processing system for detecting errors of received cell.

FIG. 4 is a conceptual diagram of a conventional ATM cell error processing system. A number of n of error processing units 20 are connected in series, where n is the number of types of cell errors. The error processing units 20 exist independently of one another and perform the processes of detecting cell errors, rejecting erroneous cells, and alerting of error information, etc. A failure monitor 19 is alerted by the error processing units 20 of their respective results of error processing.

FIG. 5 is a block diagram illustrating a specific arrangement of the error processing units 20. This circuit arrangement operates as follows.

① An error checker 21 checks cell data inputs for the presence of cell errors.

② A cell queuing buffer 22 delays cell data during the process ①.

③ After checking cell errors, the error checker 21 presents a cell reject signal to an erroneous cell rejecting section 23 in the presence of cell errors.

④ The erroneous cell rejecting section 23 is responsive to the cell reject signal to reject a corresponding cell that is in error.

⑤ The error checker 21 alerts the failure monitor 19 of the result of the error checking.

With the conventional error processing system shown in FIGS. 4 and 5, however, since each of the error processing units 20 performs the processes of detecting cell errors and rejecting cells in error, each error processing unit needs the queuing buffer 22 for detecting cell errors. This results in an increase in the amount of hardware required and the amount of delay introduced in cell data.

Further, in the prior art, after the cell-by-cell error processing, the receiving-area terminal adapter 16 restores the LAN data, i.e., messages and then performs error processing on the messages level, such as address screening error, using addresses placed in message headers and message-length indication, for example. This requires a lot of buffers arranged in message units for disassembly of ATM cells to messages.

SUMMARY OF THE INVENTION

It is, accordingly, a first object of the present invention to route variable-length connectionless information, such as LAN information, through a connection-oriented ATM network in a form of fixed-length cells efficiently, at high speed, thereby realizing the connection between LANs.

It is a second object of the present invention to solve various problems encountered in achieving the first object, i.e., in realizing the connection between LANs through the ATM network. One of the problems is simultaneous transmission of the same information from a certain LAN to two or more other LANs. In this case, it is the second object to accommodate connectionless information in the ATM network and transfer the information not only to a single destination but also to two or more destinations designated by, for example, a group address at high speed, efficiently.

It is a third object of the present invention to perform the detection of cell errors in the ATM network and processes associated with the cell error detection efficiently, thereby reducing delays involved in detecting errors and to detect errors on the messages level in the cell stage, thereby eliminating the need for disassembly buffers for detecting message errors.

FIG. 6 is a basic block diagram of the first, second and fifth inventions. More specifically, this figure is a basic block diagram of an ATM-network-based connectionless communication system which accommodates local connectionless information, such as local area network (LAN) data, in a connection-oriented ATM network to realize the connection between LANs.

In FIG. 6, connectionless information cell assembly (cell segmentation)/disassembly means 30 performs bi-directional conversion between variable-length connectionless information, such as LAN data, and fixed-length cells used in an ATM network. The LAN data is converted to fixed-length connectionless cells.

Routing control means 31a (31b, 31c in the second and fifth inventions), which is installed in a switching unit in the ATM network, analyzes the destination address of connectionless information in a connectionless cell obtained by converting LAN data and controls the routing of that cell in the ATM network. The means 31a may be a server.

The ATM network 32a (35b in the fifth invention) is a network that transfers fixed-length cells in an asynchronous transfer mode. In the ATM network, the connectionless information cell assembly/disassembly means 30 and the routing control means 31a are connected by a fixed path, for example, a permanent virtual channel, while the routing control means 31a are connected to each other by a permanent virtual channel serving as a fixed path or by a semi-fixed path, for example, a virtual channel. Note that although, in FIG. 6, each communication path is shown having an arrow pointing in one direction for the sake of convenience, they are all bi-directional.

In FIG. 6, a between-LAN-data-and-cell conversion section constituting the connectionless information cell assembly/disassembly means 30 divides a piece of connectionless information, for example, a message (LAN data) into two or more cells and then places the same message identifier MID in those cells. As segment types, a BOM (beginning of message) is placed in the first cell of the cells resulting from segmentation of that message, an EOM (end of message) is placed in the last cell, and a COM (continuation of message) is placed in any intermediate cell. When a message is converted to a single cell, an SSM (single segment message) is placed in that cell.

Next, a routing information retrieval section in the server, which constitutes the routing control means 31a and performs routing of connectionless cells, retrieves routing information on a route within the ATM network from the destination address of connectionless information contained in the cell in which the BOM or the SSM has been placed.

Subsequently, a MID/routing information temporary storage section in the server temporarily stores the retrieved routing information and the message identifier MID for the cell in which the BOM or the SSM has been placed and retrieves routing information for a cell or cells in which the COM or the EOM has been placed by its or their MID.

Further, a routing information rewriting section in the server rewrites routing information placed in incoming cells by using routing information retrieved for the cells, whereby routing of cells is performed. When the cell having the EOM or SSM is input, an MID erasing section in the server erases the contents of the MID/routing information temporary storage section, thereby terminating the routing for one message.

As described above, according to the first invention, one message, which is connectionless information, is divided into two or more cells, and routing information for the first cell is retrieved by using the addressed destination of that message contained in the first cell. For the intermediate cells and the last cell, the same routing information is retrieved by the message identifier. Thus, the routing of that message is performed.

The second invention is the same in basic block diagram as the first invention. In the second invention, however, when connectionless information with a group address assigned to two or more destinations is sent out to the ATM network, that information is copied, thereby realizing the group addressing facility for forwarding that information to a group of LANs.

The connectionless information cell assembly/disassembly means 30 and the ATM network 32a in the second invention are identical in operation to those in the first invention. The routing control means 31b may also be a server as in the first invention and controls the routing of connectionless cells. When the destination address of connectionless information indicates two or more destinations, the routing control means 31b controls the routing of cells in the ATM network 32a after copying as many cells as needed.

As in the first invention, one message, which is connectionless information, is usually divided into two or more cells, and the same message identifier MID is placed in these cells. For the intermediate and last cells for that message, the message identifier is used to retrieve the same routing information as that for the first cell, thereby routing the cells.

FIG. 7 is a basic block diagram of a third invention. In this figure, the operation of connectionless information cell assembly/disassembly means 30 is the same as in the first invention.

Routing control means 33 analyzes the destination address of connectionless information to control the routing of connectionless cells. In the case of connectionless information having a single destination address, or one-to-one communication, the operation of the control means 33 is the same as that of the routing control means 31a of FIG. 5 illustrating the principle of the first invention. In the case of connectionless information having a group address, or one-to-N ($\geq 2$) communication, however, the routing control means 33 transfers connectionless cells to message copying means 34, which will be described later, via an ATM network 35 without copying the cells.

The message copying means 34 copies the connectionless cells having the group address from the routing control means 33 by the number of destinations indicated by the group address and controls the routing of the cells to the destinations. That is, such connectionless cells are routed to the destinations by the message copying means 34 through the routing control means 33.

The ATM network 35 makes connection between the connectionless information cell assembly/disassembly means 30 and the routing control means 33 by, for example, a permanent virtual channel, connection between the routing control means 33 and the message copying means 34 and connection between the two routing control means 33 by, for example, a virtual channel serving as a semi-fixed path.

In FIG. 7 illustrating the principle of the third invention, the routing for connectionless cells bound for a single destination is performed between the routing control means 33 as in the first invention. For connectionless cells bound for two or more destinations, on the other hand, the cells are transferred from the routing control means 33 to the message copying means 34, as many cells as needed are copied by the message copying means 34, and the cells are transferred to their respective destinations via the routing control means 33.

FIG. 8 is a basic block diagram of a fourth invention. In this figure, the connectionless information cell assembly/disassembly means 30 is the same in operation as that in the first invention.

Each routing control means 36 is connected to a respective one of the connectionless information cell assembly/disassembly means 30 by an ATM network 37, for example, by a permanent virtual channel and has input and output interfaces dedicated to connectionless cells bound for two or more destinations. The routing control means 36 further includes a multiplexing section for multiplexing connectionless cells input from corresponding connectionless information cell assembly/disassembly means 30 and outputting multiplexed cells from its dedicated output interface, a copying section for copying connectionless cells bound for the means itself of the connectionless cells entered from its dedicated input interface and outputting the copied cells to the corresponding connectionless information cell assembly/disassembly means 30, and a rejecting section for rejecting connectionless cells that are output from its dedicated output interface and then input to its dedicated input interface.

The ATM network 37 connects the input and output interfaces of the routing control means 36, which are dedicated to connectionless cells bound for two or more destinations, by virtual channels in the form of a ring.

In the fourth invention, connectionless cells obtained by connectionless information cell assembly/disassembly means 30 are multiplexed by the routing control means 36, for example, the multiplexing section in the server, output from the output interface dedicated to connectionless cells bound for two or more destinations and forwarded over the virtual channel that connects the dedicated input and output interfaces of the routing control means 36 in the form of a ring within the ATM network 37.

The copying section in each server monitors cells on the ring form from virtual channel, copies connectionless cells directed to its server of the connectionless cells input from its dedicated input interface and outputs them to corresponding connectionless information cell assembly/disassembly means 30. Each server, when finding connectionless cells output from it among connectionless cells input to its dedicated input interface, rejects the cells without outputting them to the succeeding server because the cells have run around the ring form from virtual channel.

The basic block diagram of a fifth invention is the same as that in FIG. 6 illustrating the principles of the first and second inventions. However, the fifth invention, unlike the first invention, is made on the premise that the ATM network 32b can set not only a virtual channel for one-to-one communication but also a virtual channel for one-to-N ($\geq 2$) communication. The destination's address of connectionless information is analyzed by the routing control means 31c of FIG. 6. As a result, when the connectionless information is bound for a single destination and thus one-to-one communication is to be performed, use is made of the virtual channel for one-to-one communication from the sending-area routing control means 31c to the receiving-area routing control means 31c. When the address is a group address, the virtual channel for one-to-N communication is used.

FIG. 9 is a basic block diagram of a sixth invention. In this invention, message identifiers (MIDs) are placed in individual messages in connectionless communication, and two or more messages are sent multiplexed to one virtual channel. However, the number of message identifiers that can be assigned to one virtual channel is limited to, say, 1,024. When this limit is exceeded, a problem will arise in that the communication has to be deferred until message identifiers MID become available or messages are rejected.

The object of the sixth invention is to vary the number of virtual channels between connectionless communication servers varies according to the number of messages to be transferred, thereby preventing the rejection of messages and the delays involved in deferred communications which result from the limitation on the number of MIDs.

In FIG. 9, the operation of the connectionless information cell assembly/disassembly means 30 is exactly the same as in the first invention, i.e., the two-way conversion between LAN data and fixed-length cells.

Routing control means 38, which control routes of connectionless cells within an ATM network 39, are interconnected within the ATM network 39 by a virtual channel (synonymous with a virtual circuit) through ATM switching units, and detect the number of messages transmitted over the virtual channel to determine whether or not there is a need for addition or deletion of the virtual channel.

Switching control means 40, which are switching control means for the ATM switching units connected to the routing control means 38, are responsive to the determination by the routing control means 38 to establish and release the virtual channels among the routing control means 38.

In the sixth invention, a connectionless communication server constituting the routing control means 38 detects the number of messages transferred over a virtual channel connected to another server on the basis of the number of message identifiers MIDs. The detection is made by incrementing a message counter at the time of entry of a cell in which the previously-described BOM has been placed as a segment type and decrementing it at the time of entry of a cell in which the EOM has been placed.

Subsequently, the number of messages detected is compared with a threshold. When the threshold is exceeded, the above-described switching control means 40 increases the number of virtual channels to be established between servers. When the number of messages detected is smaller than the threshold, on the other hand, the control means 40 decreases the number of the virtual channels.

In increasing or decreasing the number of the virtual channels, the usual call setting procedure is used. Therefore, there is no need of addition of a new facility to a switching unit. Thereby, a maximum number of messages that can be simultaneously communicated between servers is made variable. Varying the number of the virtual channels may dynamically be performed during communication by using hardware or may be performed over a middle or long period of time by using software.

FIG. 10 is a basic block diagram of a seventh invention. In the seventh invention, the operations of connectionless information cell assembly/disassembly means 30 and ATM network 32 are the same as in the first invention. As is the case with the first invention, routing control means 41 is a server which controls the routes of connectionless cells. In distinction to the first invention, receive-side routing control means 41b is equipped with a number-of-messages limiting section 42 which limits the number of messages sent to the receive-side LAN 17 in FIG. 3. That is, the seventh invention solves one problem with the inter-LAN connection system in which connectionless information is formed into cells for transfer through an ATM network, that is, a problem that, if messages transferred from the ATM network to the receive-side routing control means 41b, e.g., the server are sent to the receive-side LAN as they are, they may overflow the LAN-terminal site memory.

In the seventh invention, the number-of-messages limiting section 42 is constructed from a cell storage section which stores cells corresponding to each of messages that can simultaneously arrive at the receive-side server, an MID storage FIFO which stores message identifiers MIDs equal in number to messages that can be sent simultaneously to the receive-side LAN, a distribution section which distributes the MIDs to the MID storage section when cells are stored in the cell storage section, and a readout control section which reads the MIDs from the MID storage FIFO in sequence.

When cells arrives at the receive-side server and are then stored in the cell storage section, the distribution section distributes the MIDs placed in the cells to the MID storage FIFO, the readout control section reads the stored MIDs in sequence. The cells corresponding to the read MIDs are taken from the cell storage section and then sent to the receive-side LAN, thereby limiting the number of messages to be transferred.

FIG. 11 is a basic block diagram of an eighth invention. In this figure, connectionless information cell assembly/disassembly means 30 and ATM network 32 are the same in operation as in the first invention. As is the case with the first invention, routing control means 43 controls the routing of connectionless cells. However, the means 43 is distinct from the first invention in FIG. 6 in that each of transmit-side and receive-side routing control means, for example, servers 43a and 43b is equipped with an error detecting section 44 which detects cell errors.

As described previously, upon receipt of a BOM cell, the server obtains its routing information associated with the MID. Upon receipt of the EOM cell corresponding to the BOM cell, the server releases the MID for the corresponding message.

In case where there is a failure in data of a COM cell in the intermediate portion of a message, the transmit-side server stops transmission of the remaining cells and erases the temporarily stored MID.

On the other hand, the receiving server has already received the BOM cell and waits for the arrival of the EOM cell following the COM cell or cells.

However, since a cell or cells following the COM cell that has developed an error are not transmitted from the transmit side, the receive-side server is placed in the wait state until the EOM cell is received. In this state, the receive-side server cannot release the MID stored by itself. This will lock the MID, so that another processing cannot be performed and failure recovery become difficult.

It is the object of the eighth invention to provide a technique which, when an error is detected by a transmit-side server, permits a receive-side server to release a corresponding MID.

According to the eighth invention, when transmit-side server 43a detects a data failure in an intermediate COM cell resulting from segmentation of a message in its error detecting section 44, it alerts the receive-side server 43b of that data failure.

As alerting means, a failure information communicating line which is distinct from transmission lines between the ATM switching units can be provided.

In addition, when detecting an error, the transmit-side server 43a may generate a pseudo-EOM cell and sends it onto a transfer path.

Moreover, when an error is detected on the transmit side, a pseudo-erroneous cell may be generated for transmission to the path, and the receive-side server 43b may detect the error in its error detecting section 44.

Furthermore, when an error is detected on the transmit side, information on the occurrence of the error in a COM cell may be stored and then sent over the transmission path.

As described above, various types of alerting means permit the receive-side server 43b to recognize the occurrence of an error, so that it can release a reserved MID to continue subsequent processing.

FIG. 12 is a basic block diagram of a ninth invention. In this invention, the operations of the connectionless information cell assembly/disassembly means 30 and the ATM network 32 are the same as those in FIG. 6 illustrating the principle of the first invention. As in the case of the first invention, routing control means 45 is a server which controls the routes of cells. Unlike the first invention, the means 45 is equipped with an error processing section 46 which, upon receipt of the first one of cells associated with a message, detects an error in the message header and rejects the message-associated cells following the first cell.

In the routing control means 45 of the ninth invention, the error processing section is followed by a routing section which controls the routes of cells. As is the case with the first invention, the routing section retrieves routing information for the first cell in which the BOM has been placed as a segment type and temporarily stores that routing information in association with its message identifier MID. For the following cells, or the COM or EOM cell, their routing information is retrieved by the MID value. However, when an error is detected in the first cell by the error processing section 46, routing information for that cell is not stored, that is, no correspondence table is created, thereby rejecting the succeeding COM or EOM cell.

FIG. 13 is a basic block diagram of a tenth invention. In general, connectionless information, such as LAN information, is transmitted without considering traffic at destinations. Thus, when there is a lot of traffic at the receive side, cells transmitted over the ATM network cannot be handled, which may overflow a buffer at the receive side. In order to prevent the buffer from overflowing which may occur at the congestion time of the receive side, the tenth invention aims to alert the transmit side separated from the receive side by the ATM network of the congestion condition at the receive side to thereby control the traffic from the transmit side.

In FIG. 13, buffer capacity monitoring means 47 monitors the capacity of a buffer for receiving connectionless information cells and, when, for example, 3/4 of the buffer capacity is exceeded by the cells, issues an alarm signal indicating the congestion state. Congestion informing means 48 comprises a periodic cell generating section which periodically generates a cell for alerting the transmit side of the congestion state at the receive side, and a congestion state marking section for marking connectionless information cells with alert information. Upon receipt of an alarm signal from the capacity monitoring means 47, the means 48 alerts the transmit side of the congestion state at the receive side.

The traffic control means 49 at the transmit side, which controls the transmission of cells according to the alert information from the receive side, is constructed from a transmission control signal generating section which is responsive to the alert information to generate a collision signal as a transmission control signal and send it onto a bus on the transmit side, and a carrier sense multiple access with collision detection (CSMA/CD) protocol processing section which scans information on the bus and controls the transmission of cells upon detecting a collision signal.

In FIG. 13, when 3/4 of the capacity of the buffer at the receive side is exceeded, the buffer capacity monitoring means 47 issues an alarm signal to the congestion alerting means 48. The congestion alerting means 48, which is constructed from the periodic cell generating section and the congestion state marking section, marks connectionless information cells to be transmitted to the receive side, if any, with congestion alerting information. If, on the other hand, there is no information cells to be transmitted, the cell generated by the periodic cell generating section is used for alerting the transmit side of the congestion state at the receive side. To alert the transmit side, the reserved portion in the header of a connection information cell or a periodic cell is used.

At the transmit side, the congestion information from the receiving side is received by the traffic control means 49. In the traffic control means 49 which, as described above, is constructed from a transmission control signal generating section and a CSMA/CD protocol processing section, a collision signal is sent out onto the bus at the transmit side when congestion information is received, and the collision signal is detected by the CSMA/CD protocol processing section, so that the transmission of cells is controlled.

As described above, according to the tenth invention, the receive side alerts the transmit side of its congestion state, thereby controlling the transmission of cells from the transmit side.

BRIEF DESCRIPTION OF THE DRAWINGS

FIG. 14 is a basic block diagram of a connectionless communication system in accordance with the present invention;

FIG. 17 illustrates the contents of the ATM header field in the cell format of FIG. 16;

FIG. 18 illustrates the contents of the adaptation field in the cell format of FIG. 16;

FIG. 19 illustrates one example of a segment type;

FIG. 50 is a block diagram of the readout control section;

DETAILED DESCRIPTION OF THE PREFERRED EMBODIMENTS

Figure 1:
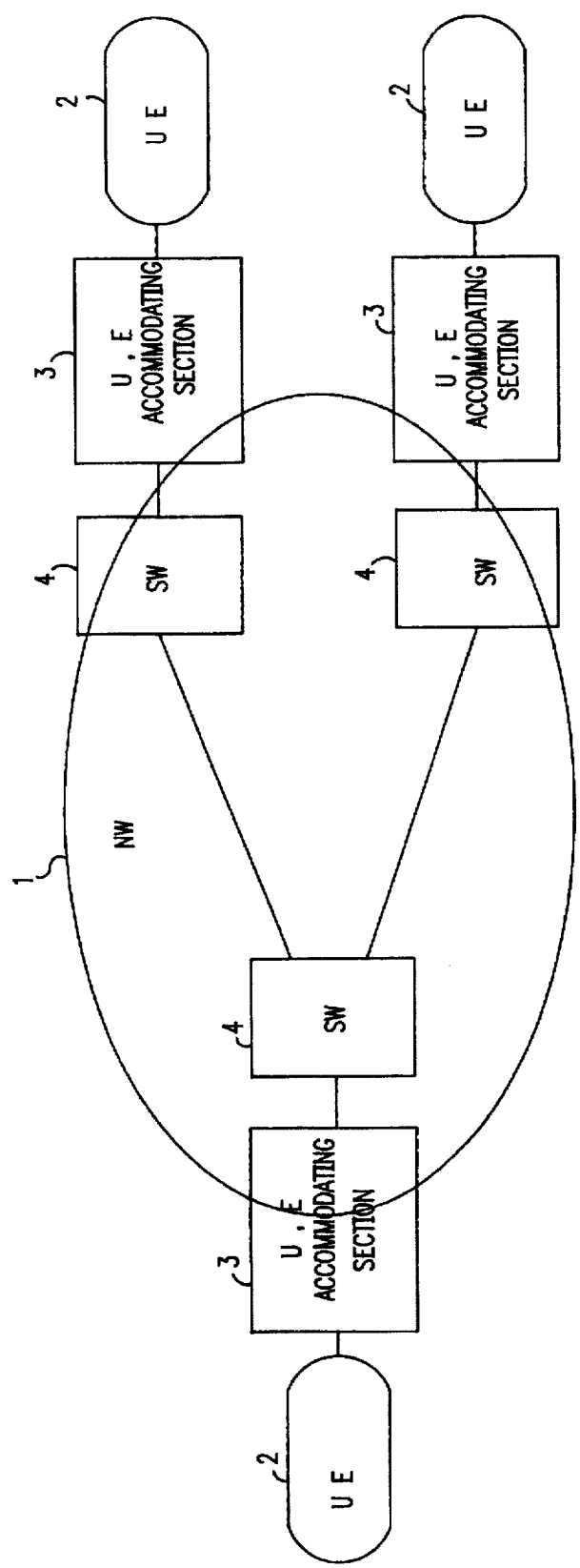
FIG. 1 (PRIOR ART) is a diagram illustrating a conventional message transfer system.
Figure 2:
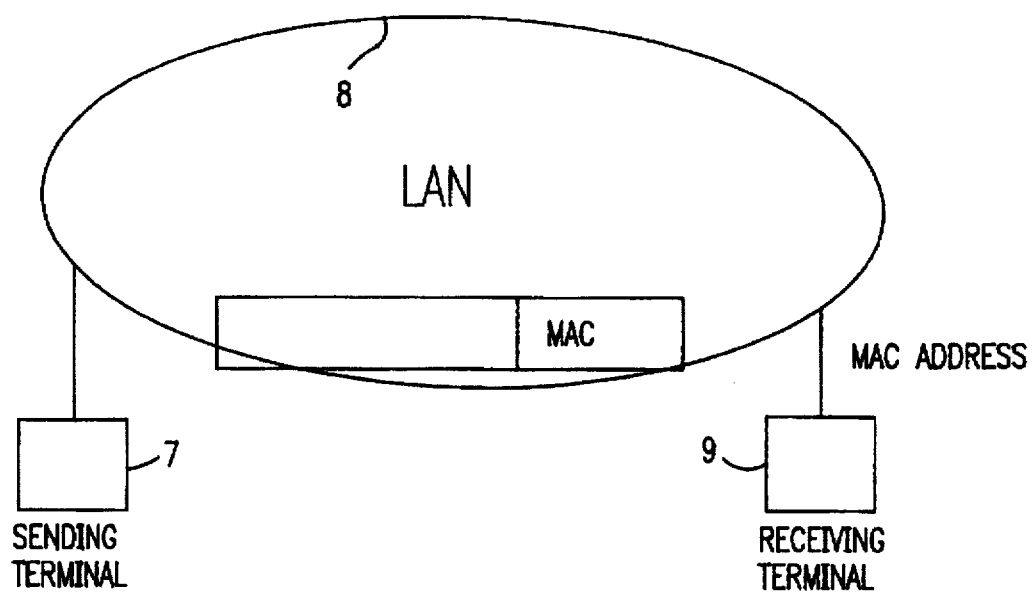
FIG. 2 (PRIOR ART) is a diagram illustrating a communication system within a LAN.
Figure 3:
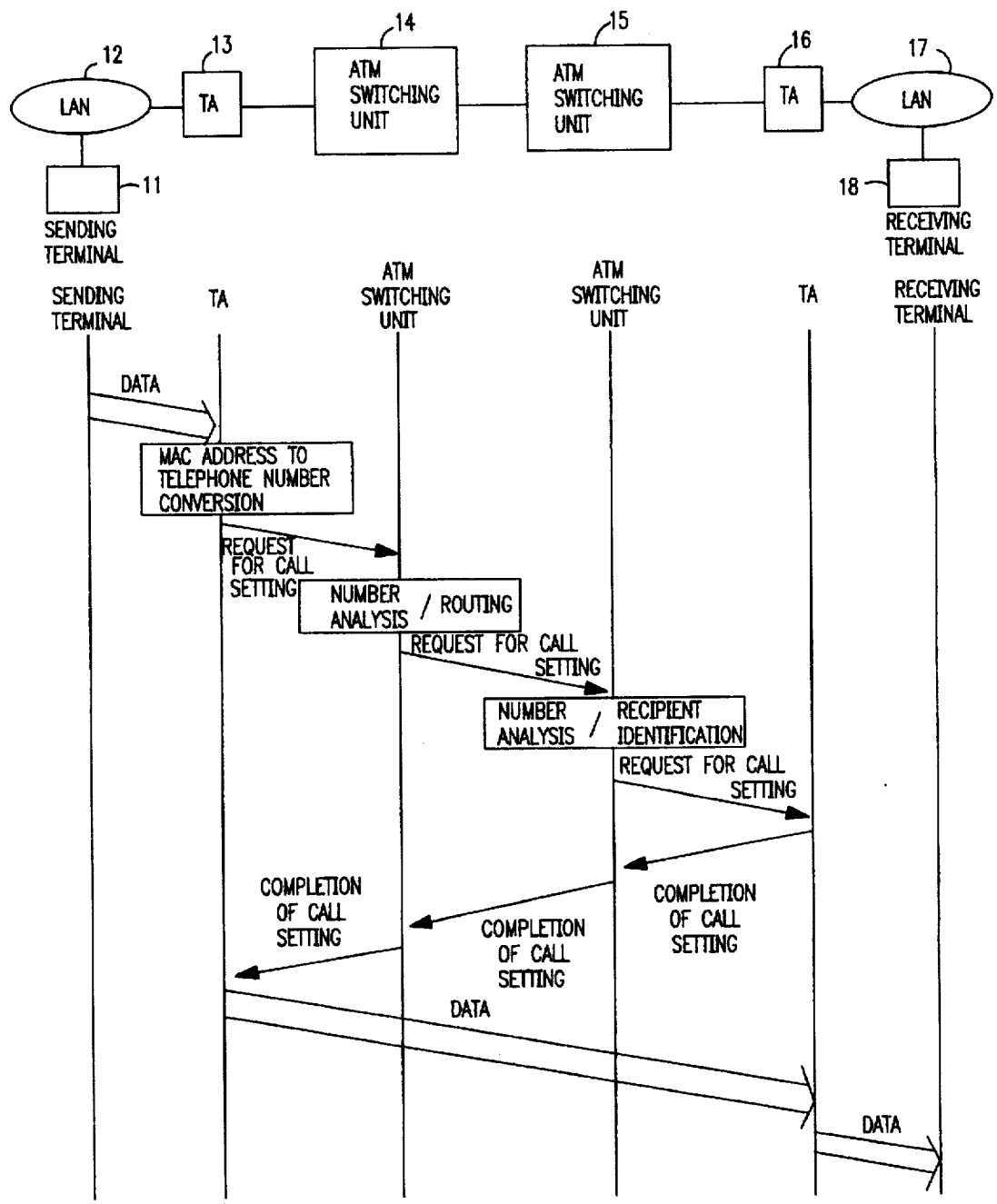
FIG. 3 (PRIOR ART) is a diagram illustrating an inter-LAN communication utilizing call setting.
Figure 4:
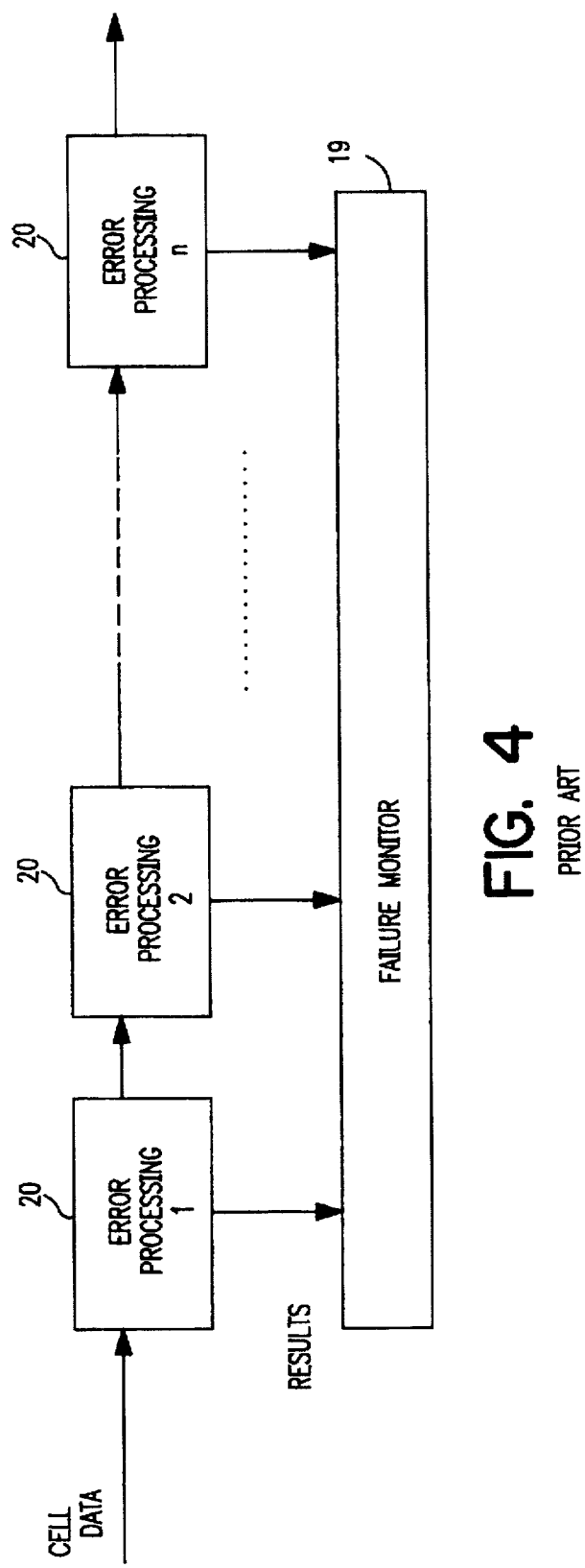
FIG. 4 (PRIOR ART) is a conceptual diagram of a conventional ATM cell error processing system.
Figure 5:
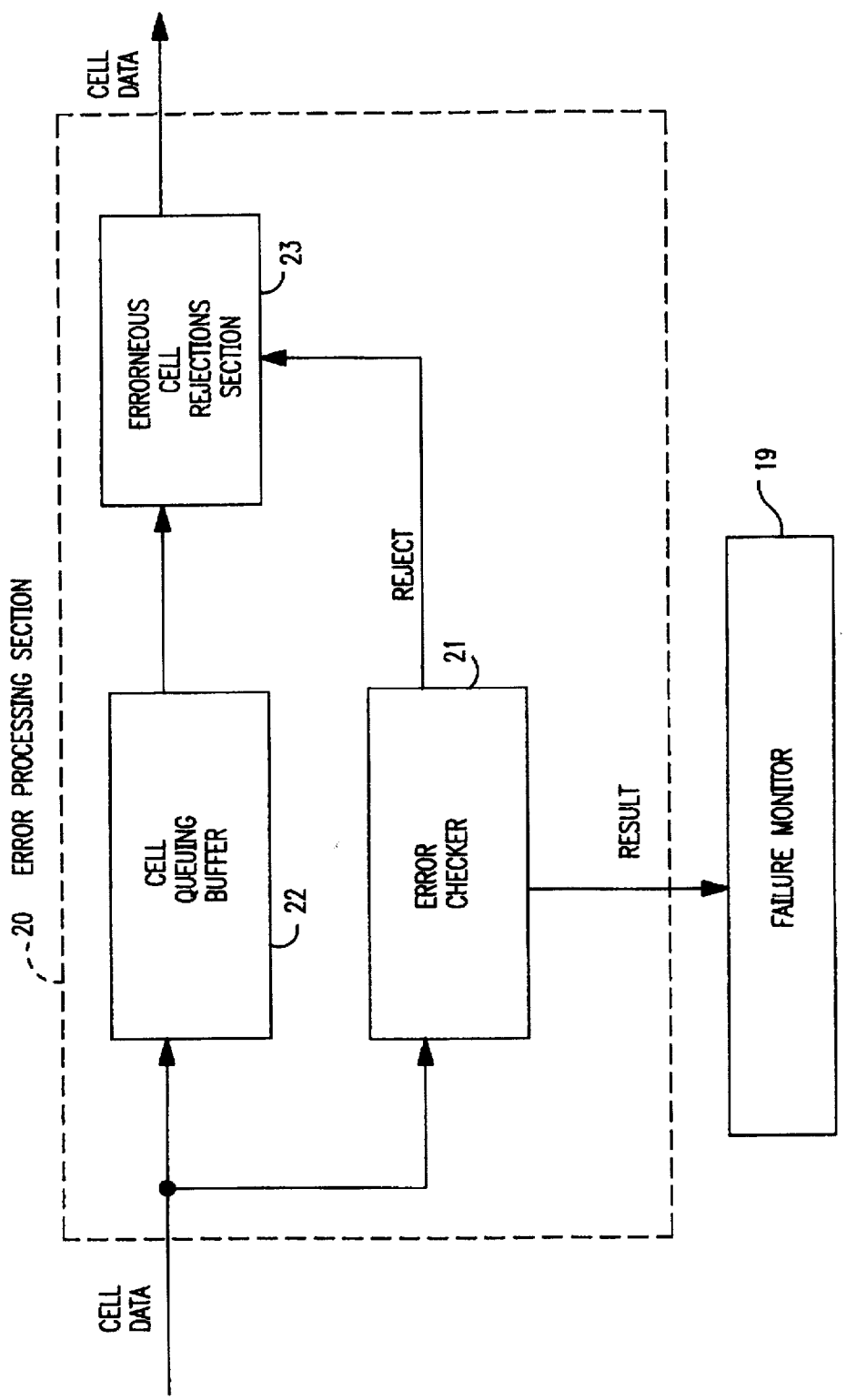
FIG. 5 (PRIOR ART) illustrates a specific arrangement of the error processing section in block form.

Referring now to FIG. 14, there is shown a communication system using a connectionless communication system according to the present invention. In this figure, like reference characters are used to denote corresponding parts to those in FIG. 3 illustrating a prior art communication system.

In FIG. 14, for transmission of connectionless data, such as LAN data, which are segmented into ATM cells, over an ATM network, connectionless (CL) communication Servers 51 and 52 that control the routing of the cells in the ATM network are associated with sending-area and receiving-area ATM switching units 14 and 15, respectively. A sending-area terminal adapter (TA) 13 and the CL server 51 are connected by, for example, a permanent virtual channel (which is also called a permanent virtual circuit) 53, while the CL server 52 and a receiving-area TA 16 are connected by a permanent virtual channel 54. Also, the CL servers 51 and 52 are connected by, for example, a virtual channel (which is also called a virtual circuit) 55.

In FIG. 14, when data, or a message, is transmitted from a sending terminal 11 to the sending-area TA 13 over a sending-area LAN 12, a machine (MAC) address assigned to a receiving terminal, which is placed in the message, is converted to the telephone number of a destination, and then the message is segmented into cells. The cells are transferred to the sending-area CL server 51 over the permanent virtual channel 53 for number analysis and routing and then sent to the receiving-area CL server 52 via the ATM switching units 14 and 15. The CL server 52 identifies a recipient on the basis of the number analysis and sends the cells to the receiving-area TA 16 over the permanent virtual channel 54. In the TA 16, the incoming cells are converted into the LAN data, or the message, which is subsequently sent to a receiving terminal 18 via a receiving-area LAN 17. This allows data transmission between the LANs without performing call setting between the TAs 13 and 16 which is required in the prior art system described in connection with FIG. 3.

Figure 6:
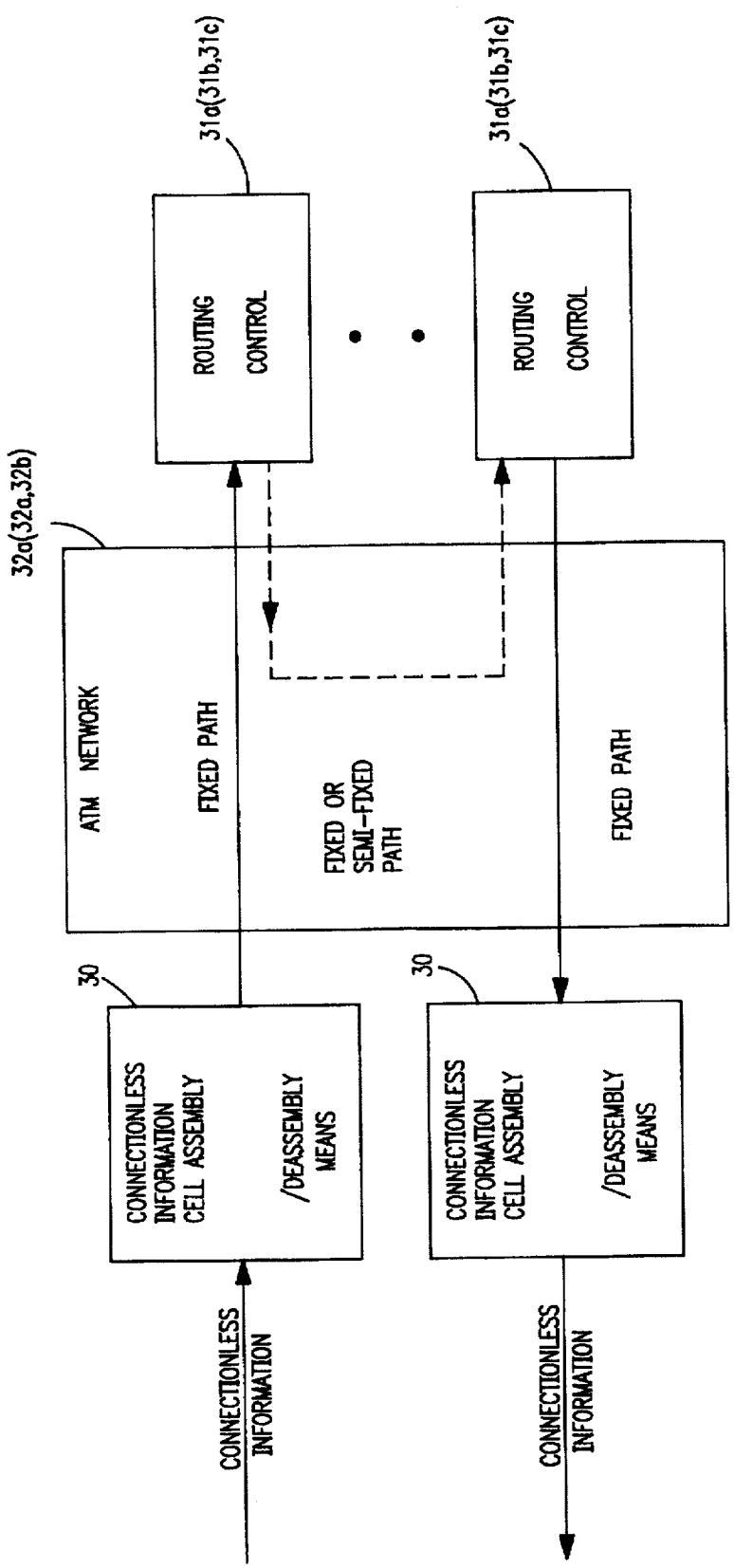
FIG. 6 is a basic block diagram of a first (second or fifth) invention.
Figure 15:
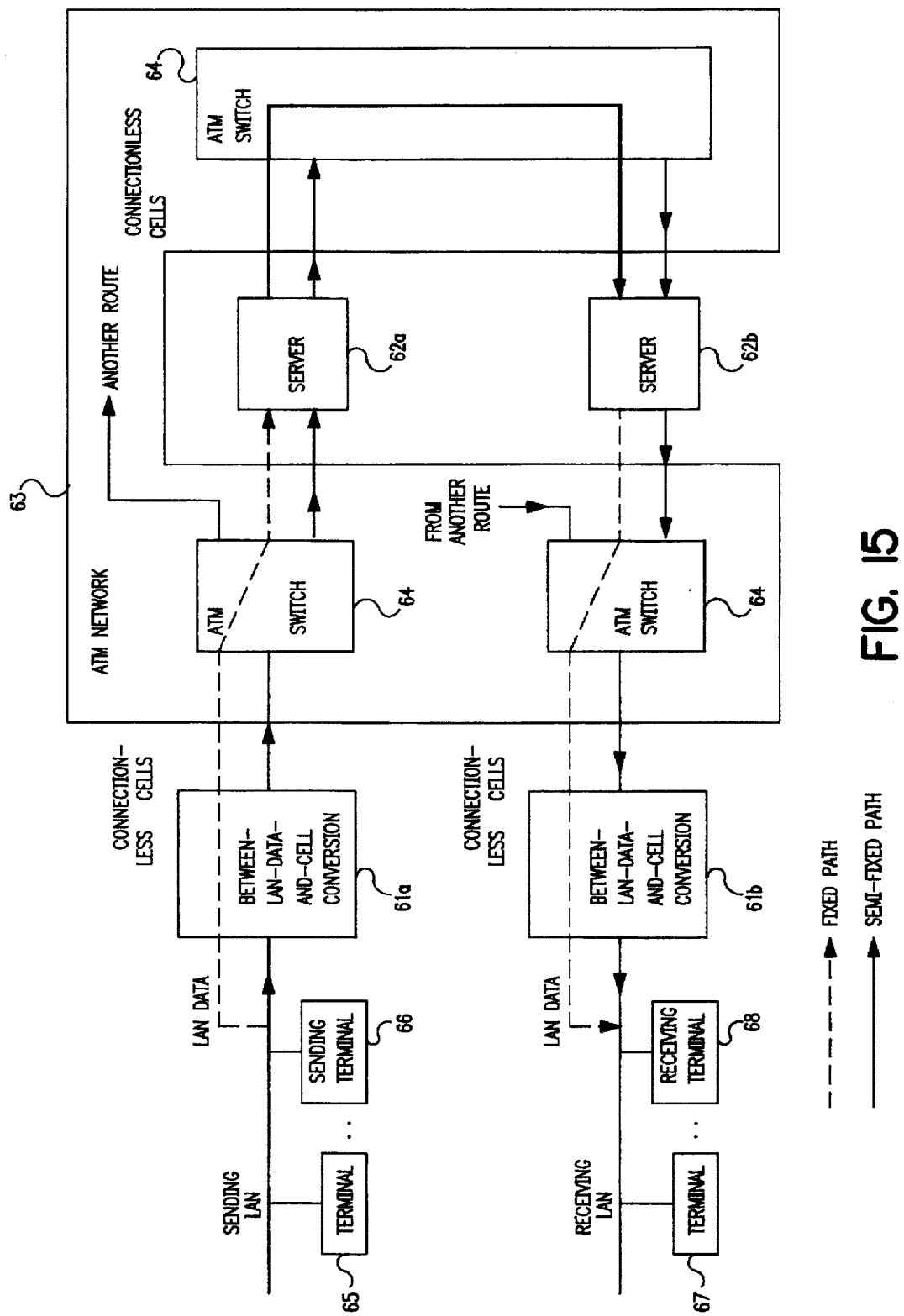
FIG. 15 is a block diagram of the whole connectionless communication system in accordance with the first invention.

FIG. 15 is a block diagram of the whole of a connectionless communication system according to a first invention. In this figure, a between-LAN-data-and-cell conversion section 61 corresponds to the connectionless information cell assembly/disassembly means 30 in FIG. 6 and performs conversion from LAN data, or connectionless information, to ATM cells and vice versa.

Servers 62, corresponding to the routing control means 31a, are installed in a switching unit within an ATM network to analyze the LAN data addresses in cells for routing within the ATM network, transmission/reception screening, and flow control. The ATM network 63 includes a plurality of ATM switches 64 and connects corresponding between-LAN-data-and-cell conversion section 61 and server 62 to each other by a permanent virtual channel serving as a fixed path and the servers 62 to each other by a permanent virtual channel serving as a fixed path or a virtual channel serving as a semi-fixed path.

In FIG. 15, when a sending terminal 66, of terminals 65 associated with sending LAN, issues LAN data, the sending conversion section 61a converts the data into fixed-length cells handled by the ATM network. As will be described later, BOM is placed as a segment type in the first one of the resulting cells from the LAN data, or a message, COM is placed in the intermediate cell or cells, and EOM is placed in the last cell. Where one message is contained in a single cell, SSM is placed in that cell. Information about the destination address of the LAN data is contained only in the cell in which the BOM or SSM is placed, i.e., the BOM or SSM cell, is not contained in the COM and EOM cells.

An ATM header required for switching within the ATM network 63 is placed in each of the cells. In the sending-area conversion section 61a, however, the destination of LAN information is not analyzed, and only a virtual channel identifier for identifying a fixed path to the sending server 62a is placed as the ATM header.

The connectionless cells resulting from the incoming LAN data reach the server 62a and are then transferred over the ATM network to the receiving-area server 62b on the basis of routing control by the server 62a which will be described later. Further, the cells are sent over the fixed path to the receiving conversion section 61b where the fixed-length ATM cells are restored to the original LAN data again. The resulting LAN data is transferred to a receiving terminal 68 of terminals 67 associated with a receiving LAN. At this point, the terminals 67 monitors data transferred over the LAN, and the receiving terminal 68 accepts the LAN data after identifying it as information directed to itself.

In FIG. 15, the connectionless communication system is shown having two servers; however, where a wide ATM network is used, routing over the entire ATM network can be performed by using more servers and repeating the routing between two servers on the basis of destination information of LAN data. This will make the routing range per server smaller than one server covers a wide routing range, permitting the amount of hardware and processing time to be reduced.

Figure 16:
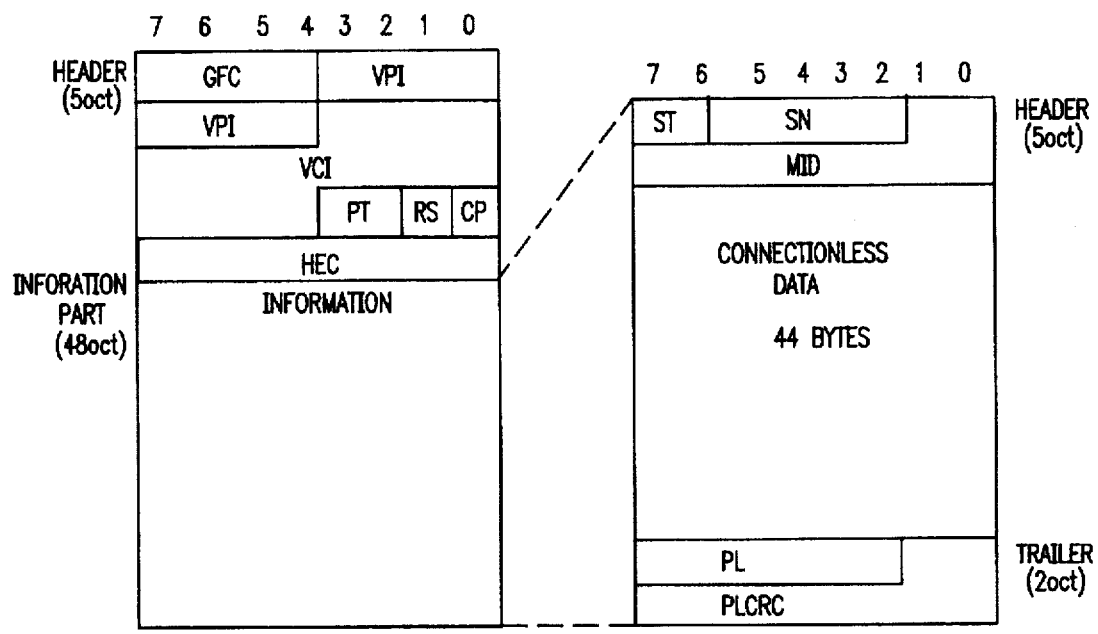
FIG. 16 illustrates one example of a connectionless communication cell format.

FIG. 16 illustrates one example of an ATM cell format used in the present invention. In FIG. 16(a), showing on ATM cell format, an ATM cell is fixed at 53 bytes, 5 bytes being used as an ATM header and 48 bytes as an information field. As shown in FIG. 16(b) of a segment format, the 48-byte information field consists of a 2-byte header for routing connectionless cells in the present invention, 44-byte connectionless data, and a 2-byte trailer which, when the effective information of the connectionless data is less in length than 44 bytes, stores a payload length indicating its length. GFC represents Generic Flow Control; VPI represents Virtual Path Id (12 bit); VCI represents Virtual Channel Id (16 bit); PT represents Payload Type (2 bit); RS represents Reserve (1 bit); CP represents Cellloss Priority; HEC represents Header Error Check; ST represents Segment Type (2 bit); SN represents Sequence Number (4 bit); MID represents Message ID (10 bit); PL represents Payload Length (6 bit); and PLCRC represents Payload CRC (10 bit).

In the 5-byte (40-bit) ATM header field in the cell format of FIG. 16, as shown in FIG. 17, the first 4 bits give GFC used for flow control, or an extension of a virtual path identifier and the next 8 bits give a virtual path identifier, and the next 16 bits give a virtual channel identifier. The next 2 bits give a payload type indicating a type of cell, the next 1 bit gives reserve, the next 1 bit gives cell priority, and the last 8 bits give header error check for 1-bit error detection.

In the segment format as the contents of the 48-byte information field shown in FIG. 16(b), of 4 bytes, excluding 44 bytes of connectionless data, 2 bytes are used as the header and 2 bytes are used as the trailer. The 2-byte header, as shown in FIG. 18, consists of a 2-bit segment type which, when connectionless information is segmented into cells, indicates the positions of these cells, a 4-bit sequence number which is periodically placed in the resultant cells and adapted to detect cell-by-cell rejection, and a 10-bit message identifier which is set for the same message. The 2-byte trailer consists of 6-bit information indicating the effective information length of connectionless data, and a 10-bit cyclic redundancy check code CRC for error checking and correction.

FIG. 19 illustrates one example of segment types which, when the layer 3 protocol data unit, i.e., one message, or LAN data, is segmented into two or more cells, indicate the positions of these cells. In this figurer the BOM indicates the first cell, the EOM indicates the last cell, and the COM indicates the intermediate cell or cells. The SSM indicates that the message is contained in a single cell. Each of the cells is assigned a 2-bit segment type.

Figure 20:
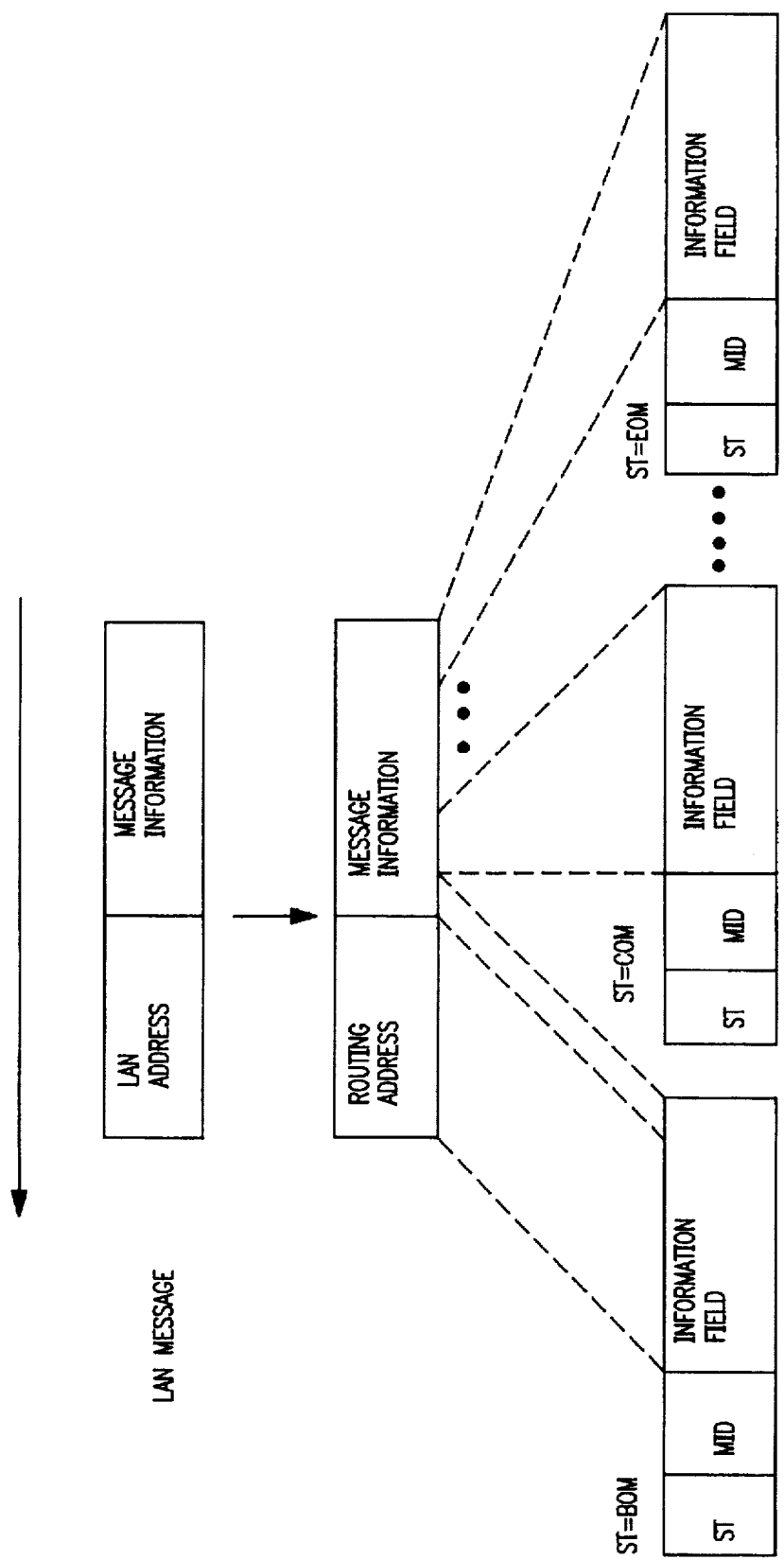
FIG. 20 illustrates one example of a way of segmenting a LAN message into ATM cells.

FIG. 20 illustrates one example of a way of segmenting a LAN message into fixed-length ATM cells. In this figure, the LAN message consists of the address of a LAN to which a destination terminal is connected and message information. The LAN message is converted by a routing address assigner to be described later into a format assigned a routing address and then segmented into fixed-length cells.

In FIG. 20, each cell is shown having only the segment type ST, the message identifier MID and the information field for convenience of illustration. As ST, the BOM (beginning of message) is placed in the first cell, the EOM (end of message) is placed in the last cell, and the COM (continuation of message) is placed in the intermediate cell or cells. As the message identifier MID, the same identifier is placed in the respective cells resulting from the same message. When a message is not greater than one-cell length, the SSM (single message segment) is placed in a single cell for that message. The routing address is, for example, a maximum of 48 bits in length and placed in the information field of the BOM or SSM cell.

Figure 21:
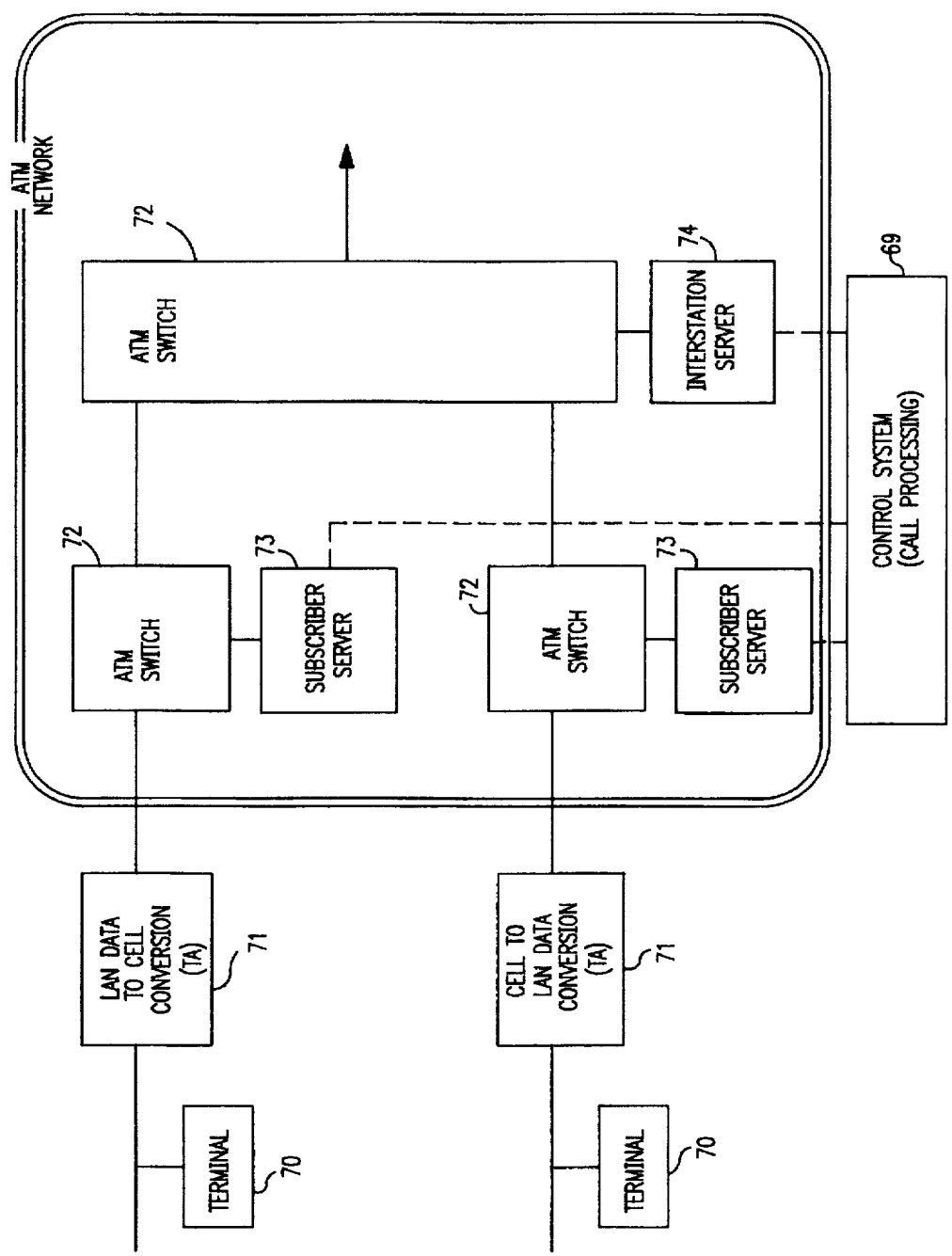
FIG. 21 is a block diagram of a communication system including a control system (call processing section) in the first invention.

FIG. 21 is a block diagram of a communication system including a control system (call processing section) according to the first invention. In this figure, a terminal 70 is connected with an ATM network through a between-LAN-data-and-cell conversion section (TA) 71. The ATM network is constructed from ATM switches 72, subscribers' servers 73, and an interstation server 74. The subscriber-server- and interstation-server-dependent cell routing is controlled by a control system (call processing section) 75.

Figure 22:
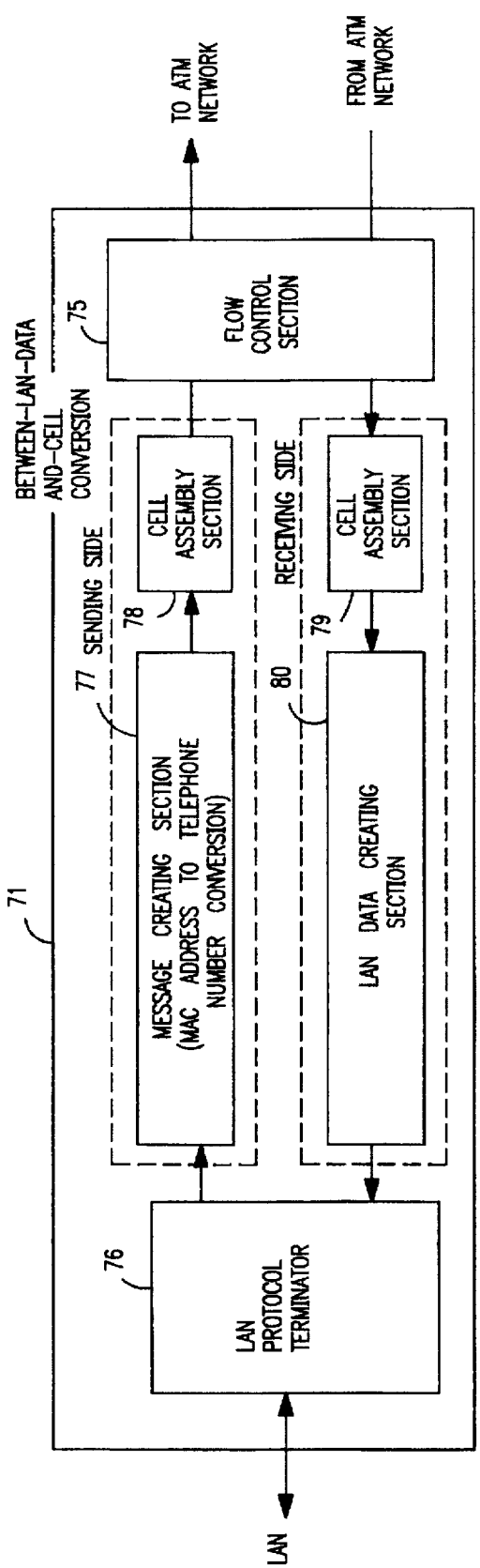
FIG. 22 is a block diagram of the LAN data cell conversion section.

FIG. 22 is a block diagram of the between-LAN-data-and-cell conversion section 71 of FIG. 21. As shown, the conversion section 71 is constructed from a LAN protocol terminating section 76 which transmits to or receives from a LAN, a message creating section 77 which adds the message header and the trailer to LAN data input from the protocol terminating section 76 and retrieves a telephone number by a machine (MAC) address that the LAN data has, which is then placed in a message, a cellulating section 78 which divides the message from the message creating section 77 and places the header and the trailer in each cell, a flow control unit 75 which controls the flow of cells to or from the ATM network, a decellulating section 79 which combines cells from the ATM network into a message, and a LAN data generating section 80 which generates LAN data after removing the message header and the trailer from the output of the decellulating section 79.

Figure 23:
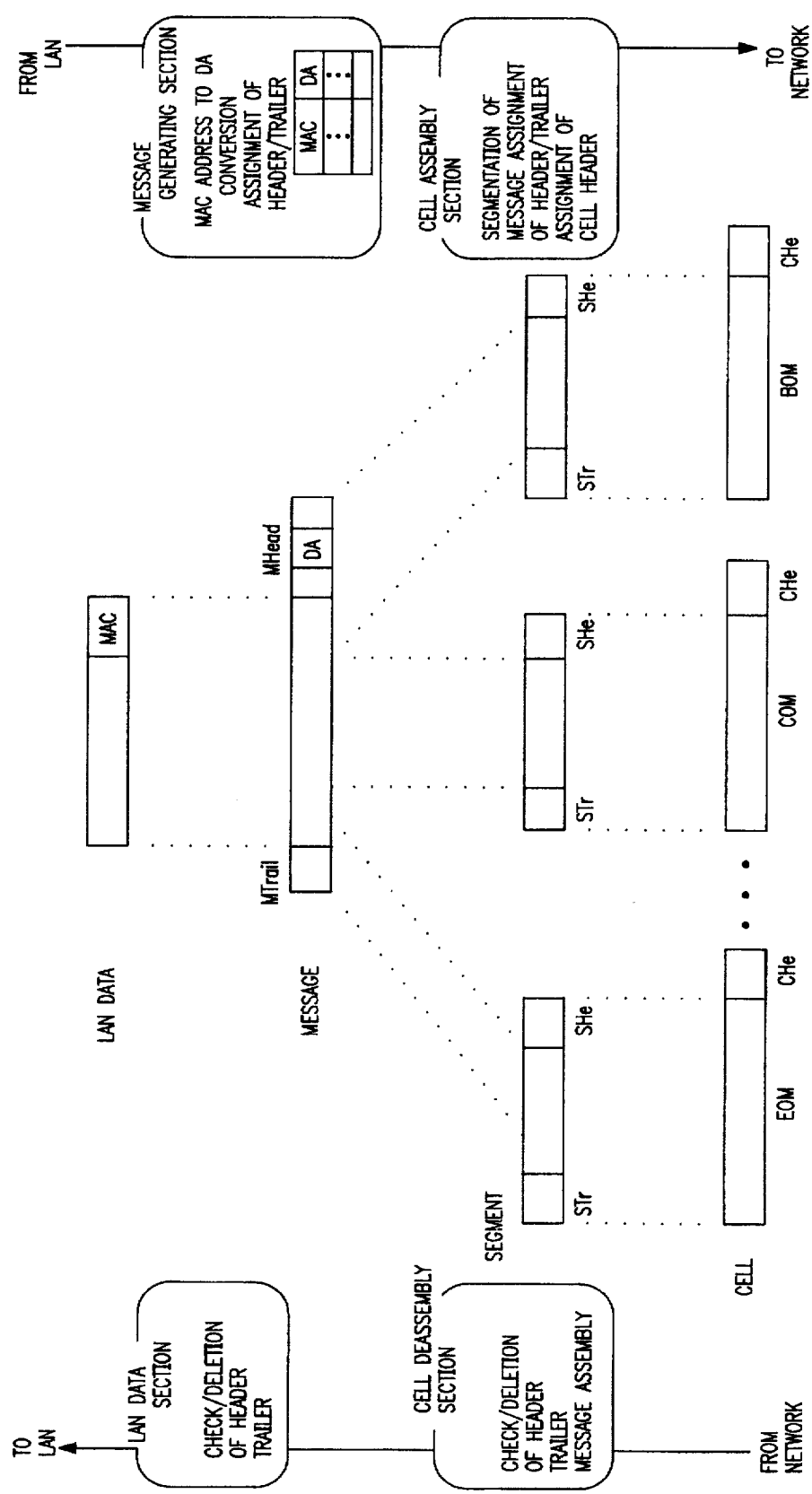
FIG. 23 is a diagram for use in explanation of conversion from LAN data through a message to cells and vice versa.

FIG. 23 illustrates conversion between LAN data and message and between message and cell by the message generating section 77, cellulating section 78, decellulating section 79 and LAN data generating section 80. As shown, a MAC address indicating the destination of data is placed in LAN data. At the time of generating a message, the address is converting to a destination address (DA) indicating the telephone number of the destination, and a header and a trailer are placed in the message. When the message is segmented into cells, a header and a trailer are added to each cell, the BOM as a segment type, COM or EOM is applied, and a cell header is further added to each cell. MAC represents Machine Address; MHead represents Message Header; Mtrail represents Message Trailer; DA represents Destination Address; SHe represents Segment Header; STr represents Segment Trailer; CHe represents Cell Header; BOM represents Beginning of Message; COM represents Continuation of Message; and EOM represents End of Message.

Figure 24:
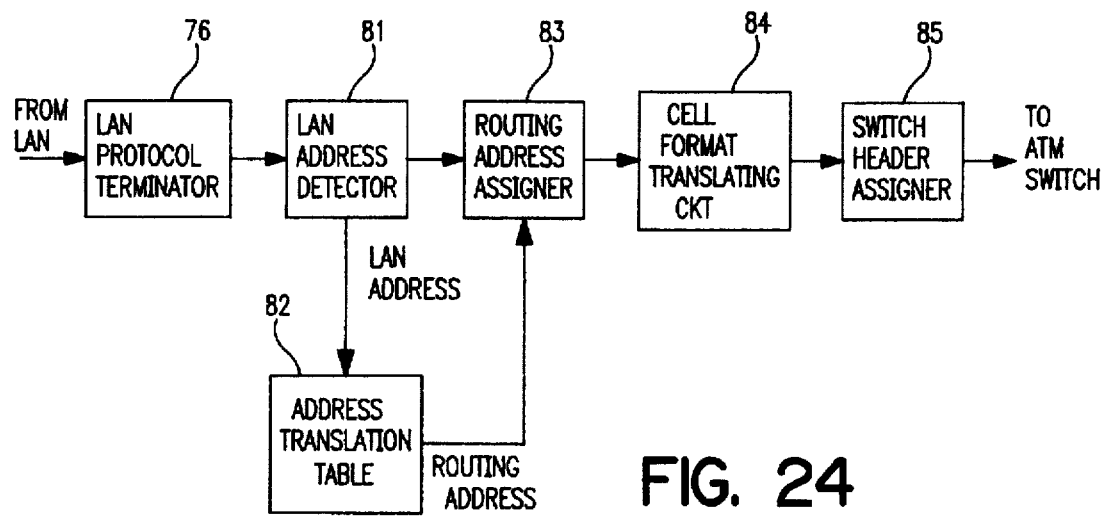
FIG. 24 is a detailed block diagram of the between-LAN-data-and-cell conversion section.

FIG. 24 is a detailed block diagram of the conversion section 71. In this figure, within the ATM network, the LAN protocol terminating section 76 terminates a message sent from the LAN down to a protocol data unit (N-PDN) of a network layer which is easy to sort destinations.

An LAN address detecting circuit 81 detects from the message in the protocol data unit format the address of a LAN that accommodates a destination terminal, i.e., the LAN address, and outputs it to an address translation table 82. The LAN address detecting circuit 81 also outputs the message to a routing address adding circuit 83. The address translation table 82 outputs a routing address (corresponding to the telephone number of a receiving terminal) peculiar to the LAN address within a relay network to the routing address adding circuit 83, which adds the routing address to the incoming message from the LAN address detecting circuit 81 and outputs the resultant message to a cell format translating circuit 84.

The cell format translating circuit 84 segments the message in the protocol data unit format from transmitted routing address adding circuit 83 into ATM cells of fixed length. A switch header adding circuit 85 adds to the divided cells a switch header (VPI, VCI) for identifying PVC from the between-LAN-data-and-cell conversion circuit 61a through the ATM switch 64 to the server 62a in FIG. 15 and outputs the cells to the ATM switch 64.

Figure 25:
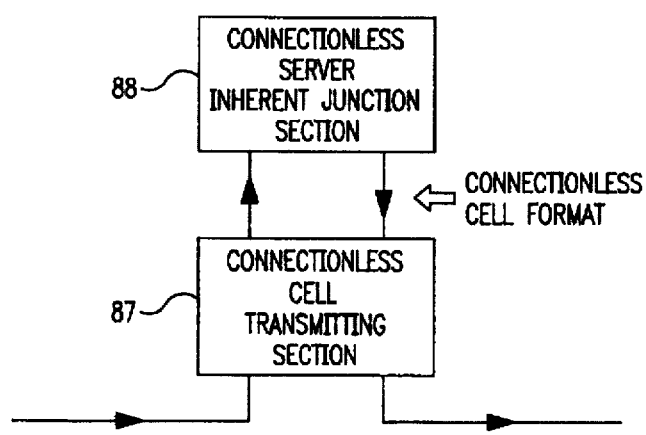
FIG. 25 is a block diagram of the server.

FIG. 25 illustrates one example of a server. In this figure, the server is constructed from a connectionless cell sending section 87 and a connectionless-server-inherent function section 88. The connectionless cell sending section 87 absorbs differences in transmission rate, format, medium, etc., between LANs, converts LAN data to connectionless cells in a unified format, and sends them to the connectionless-server-inherent function section. This can accommodate various types of LANs. The function section 88 carries out functions inherent in the server, i.e., cell routing control, transmission/reception screening, flow control, etc.

Figure 26:
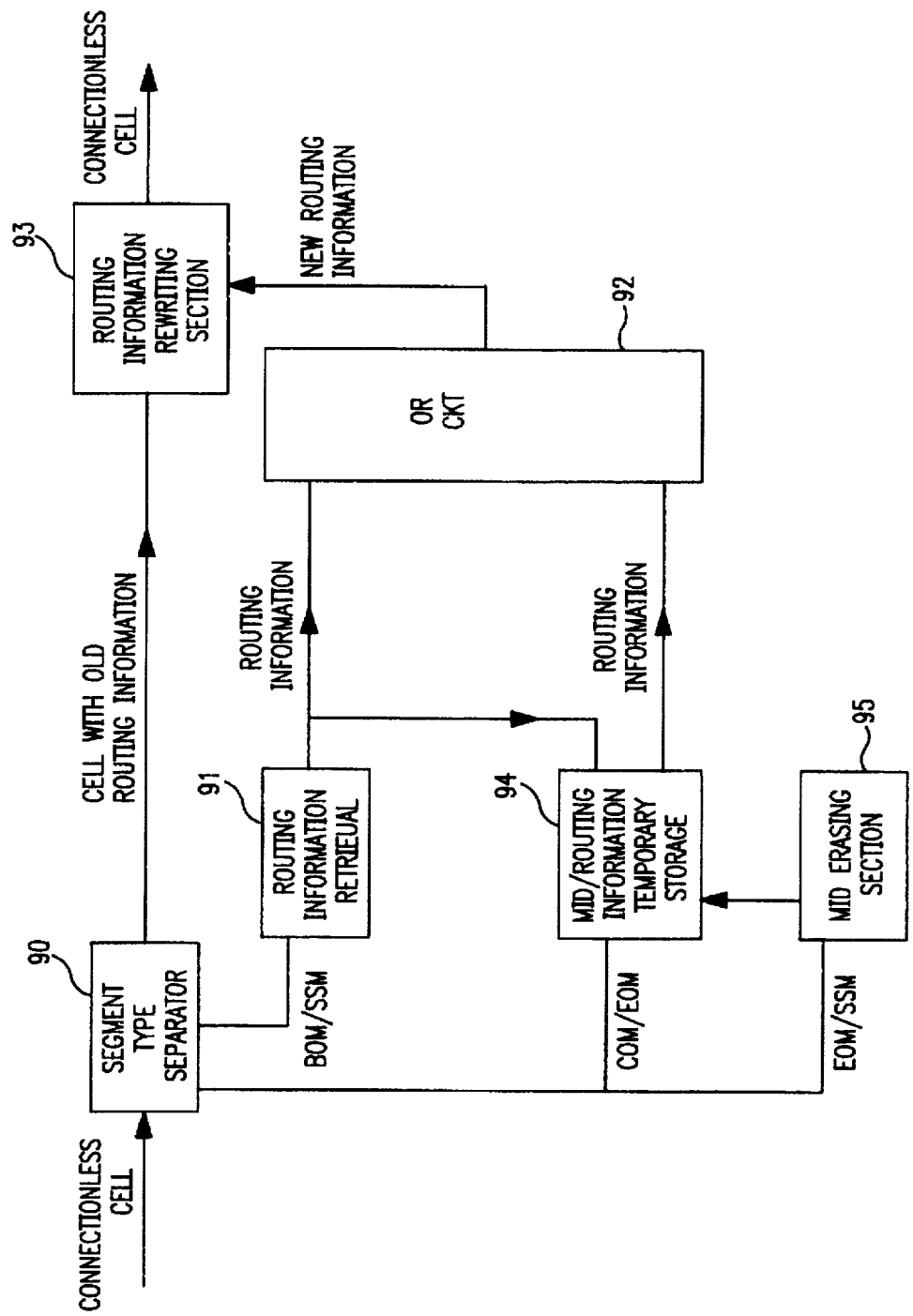
FIG. 26 is a block diagram of the inherent-function section of the connectionless server of FIG. 25.

FIG. 26 is a block diagram of the connectionless-server-inherent function section 88 of FIG. 25. In this figure, a segment type separator 90 separates a segment type from incoming connectionless cells and detects its content. When the segment type is the BOM or SSM, a routing information retrieve section 91 analyzes the destination address of LAN data contained in the cells, retrieves information on routing within the ATM network and outputs it to a routing information rewriting section 93 via an OR circuit 92. The routing information rewriting section 93 rewrites routing information for the BOM or SSM cell into the content sent from the routing information retrieve section 91 and outputs it to the ATM network again.

The routing information retrieved for the BOM or SSM cell is output from the routing information retrieving section 91 to a MID/routing information temporary storage section 94 together with a message identifier MID added to that cell, so that they are stored temporarily. When a COM or EOM cell is input, routing information is retrieved by the message identifier MID temporarily stored in the MID/routing information temporary storage section 94 and then applied to the routing information rewriting section 93, so that the routing information for that cell is output rewritten.

When an EOM or SSM cell is input, the routing of cells for a message terminates, so that the message identifier ID and the routing information stored in the MID/routing information temporary storage section 94 are erased by a MID erasing section 95. Although there is no need for temporary storage of routing information for the SSM cell, the processing for that cell is here made common to the BOM cell processing without the use of a separate route.

Figure 27:
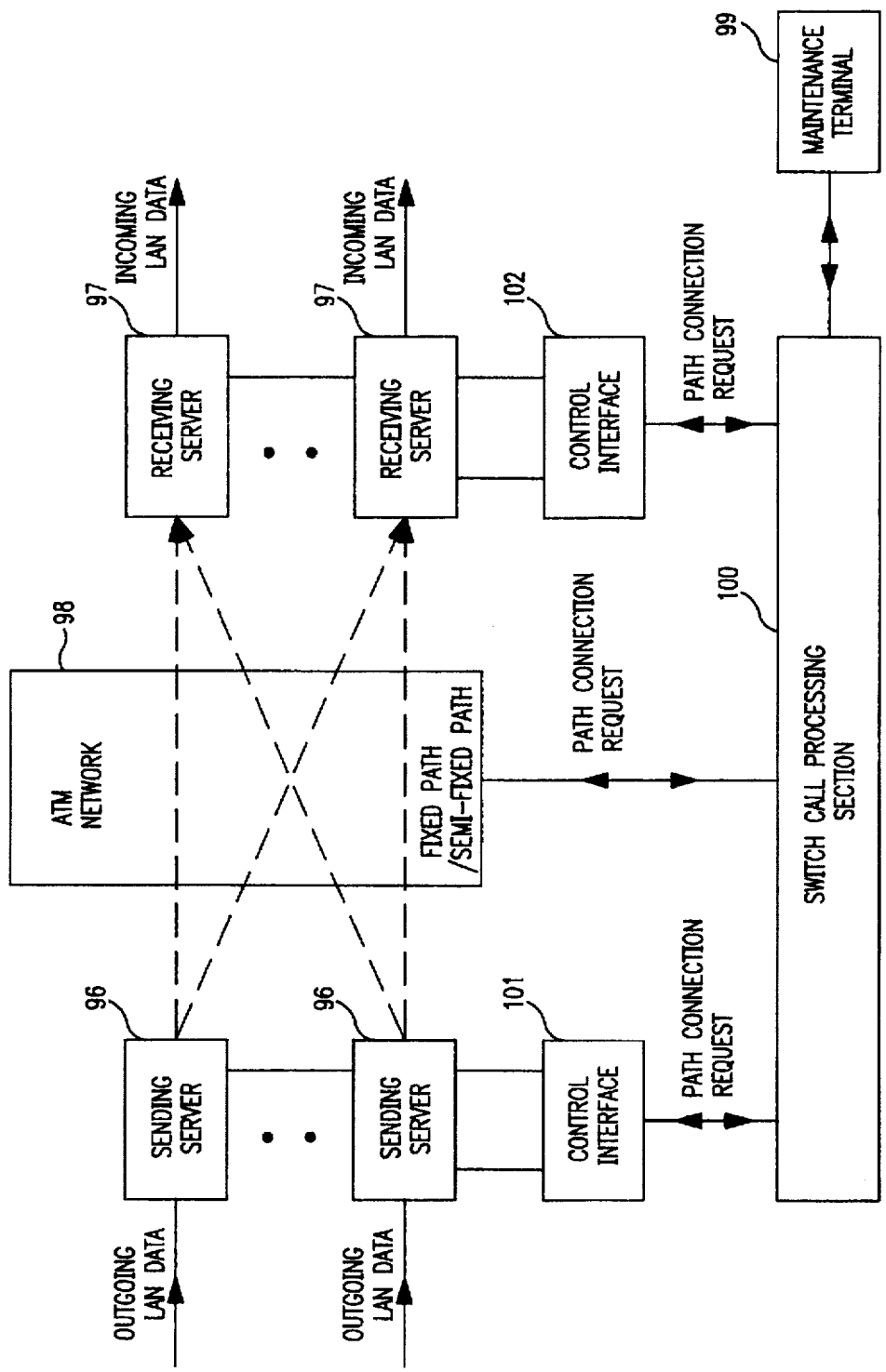
FIG. 27 is a block diagram of a communication system in which transmitting servers and receiving servers are separated.

FIG. 27 is a block diagram of a communication system in which sending servers and receiving-are servers are separated. In this figure, sending servers 96 are provided on the sending LAN, while receiving servers 97 are provided on the receiving LAN side. The sending servers 96 and the receiving servers 97 are connected by a connection-oriented network, for example, by a fixed or semi-fixed path through an ATM network 98. The sending servers 96 and the receiving servers 97 are controlled via control interfaces 101 and 102 by an switching call processing unit 100 to which a maintenance terminal 99 is connected.

In FIG. 27, the path connection between the servers 96 and 97 can be controlled by the call processing unit as in the case of, for example, a sound trunk. Thus, naturally there is a need of a phase of setting of a path between the servers. There may be two path setting ways: fixed path setting in which a path is automatically set at the time of turning on the power of the switching unit; and semi-fixed path setting in which a path is set through a remote operation from the maintenance terminal 99 at the time of subscription for access to the communication service.

Figure 28:
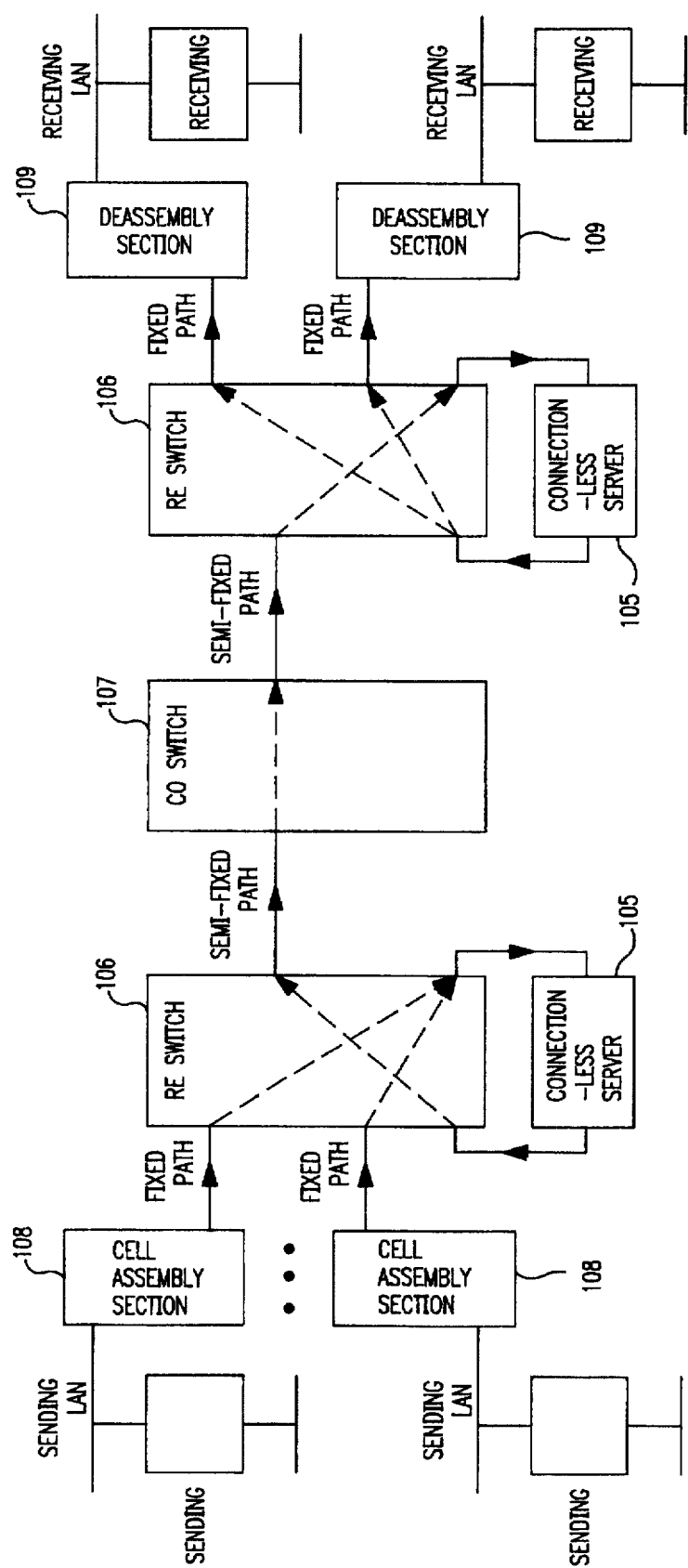
FIG. 28 is a block diagram of a communication system in which a server is installed in a remote switching unit.

FIG. 28 is a block diagram of a communication system in which a server is installed in a remote switching unit (exchange). Each of connectionless servers 105 is installed in a respective one of remote exchanges (REs) 106 as an additional module. The REs 106 are interconnected by, for example, a semi-fixed path via a central office exchange (CO) 107.

In FIG. 28, each of the REs 106 is installed for the purpose of concentrating a large number of low-usage subscribers' lines and thereby improving the usage of the input highway of the CO 107. The CO 107 makes exchanges between high-usage input highways. The connectionless server 105 installed in the RE 106 has a function of statistically multiplexing connectionless cells sent from the cell assembly section 108 on the sending LAN side over the fixed path, thus permitting the bandwidth required of the semi-fixed path between the REs 106 to be reduced.

Figure 29:
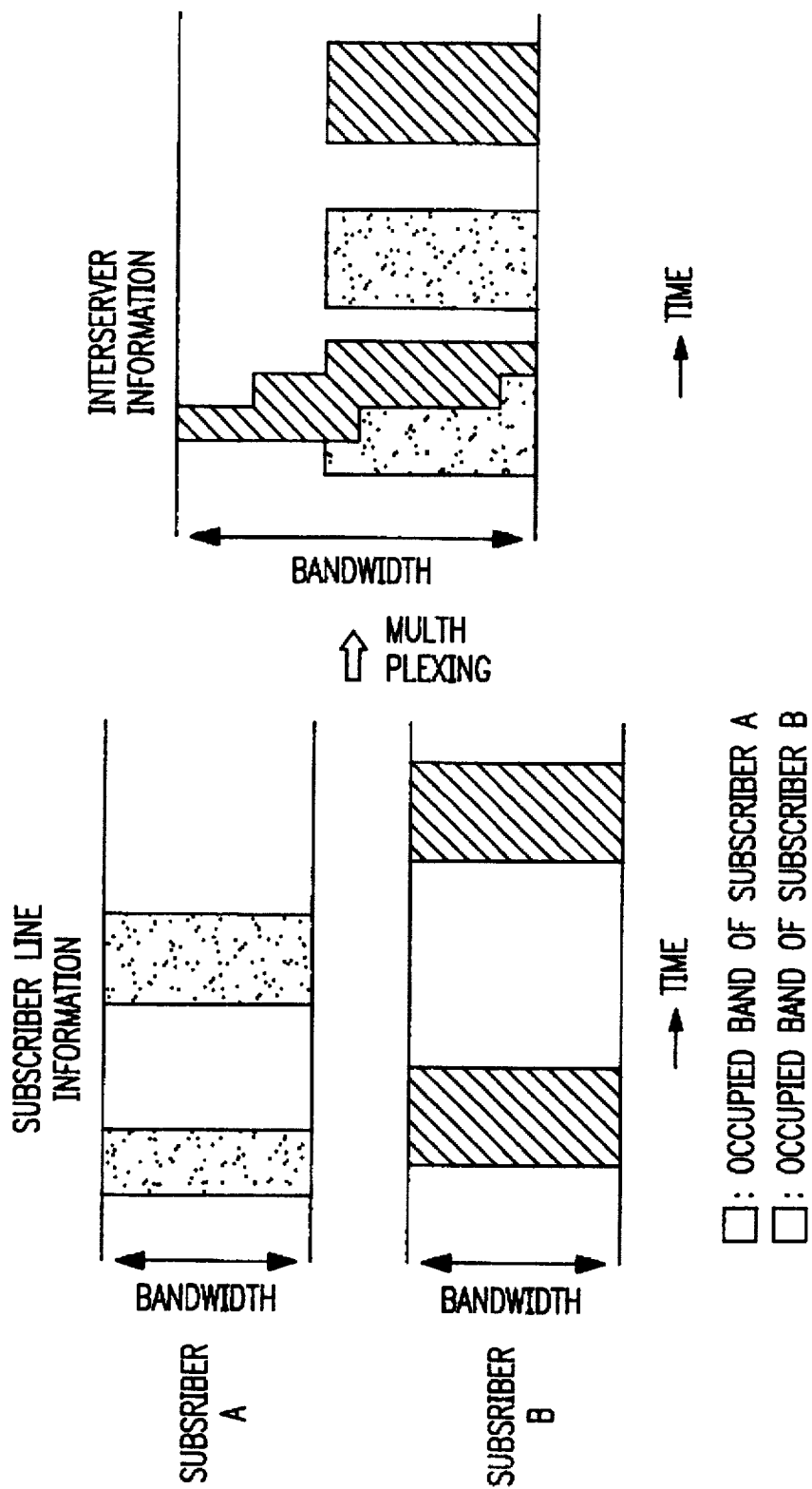
FIG. 29 is a diagram for use in explanation of the effect of reducing a required band in FIG. 28.

FIG. 29 is a diagram useful in explaining the effect of reducing the bandwidth required of the semi-fixed path between the REs 106 in the communication system in which the server is installed in each of the REs as shown in FIG. 28. In this figure, since subscribers' line information from subscribers A and B are entered into the RE 106 over their respective fixed paths extending from the cell assembly sections 108 and then subjected to statistical multiplexing in the connectionless server 105 installed in the RE 105, the bandwidth required of the interserver information, that is, the bandwidth required between the REs 106 is made narrower than the sum of bandwidths of information from the two subscribers.

Figure 30:
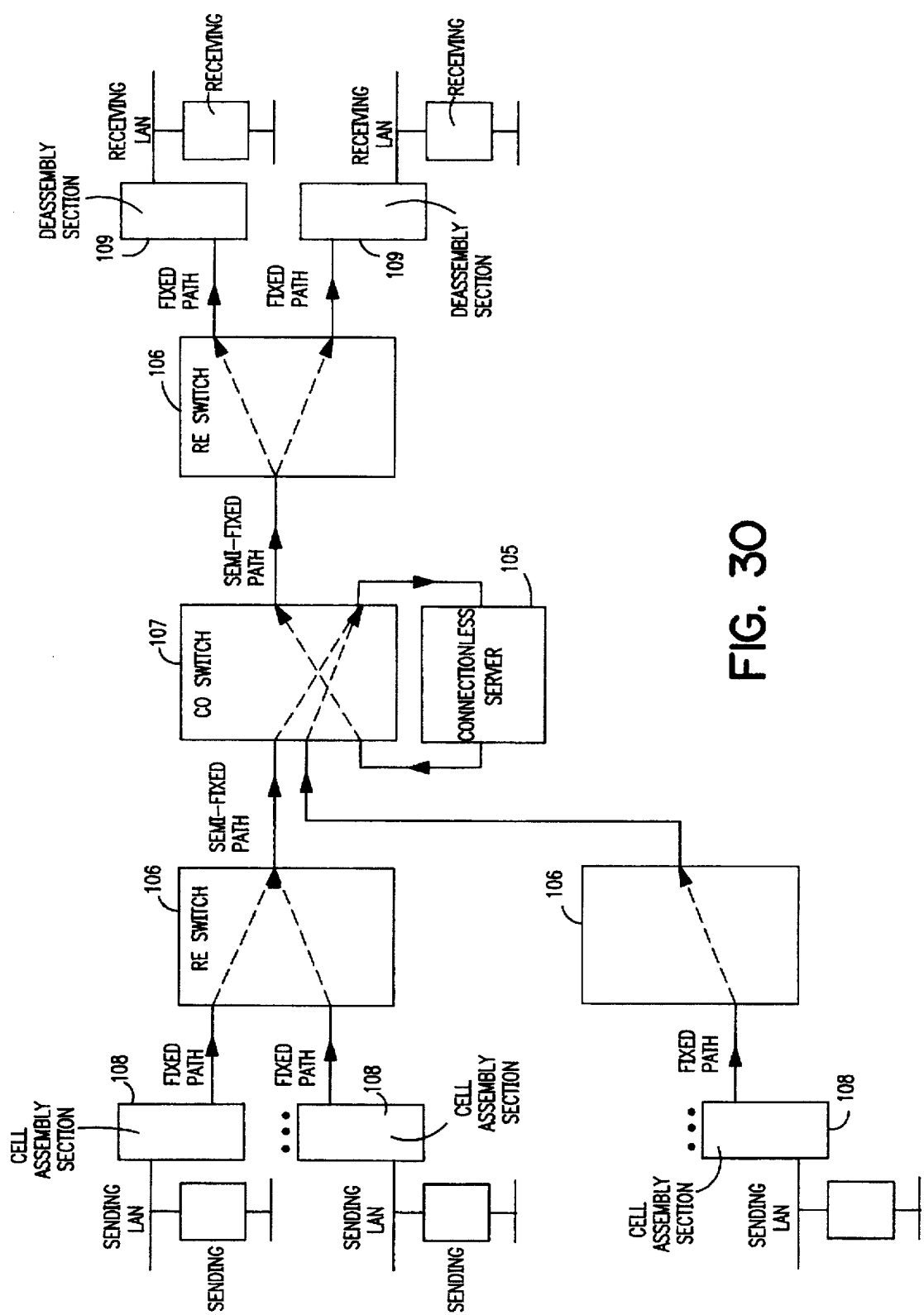
FIG. 30 is a block diagram of a communication system in which a server is installed in a central office switching unit.

FIG. 30 is a block diagram of a communication system in which a server is installed in a central office exchange. In this figure, a connectionless server 105 is installed as an additional module of a CO exchange 107. Such installation of the connectionless server 105 in the CO exchange 107 will accommodate displacement of the between-LAN-data-and-cell conversion section 61a shown in FIG. 15 merely by changing the switch connection between the RE exchange 106 and the CO exchange 107 without changing the physical location of the server 105.

Figure 31:
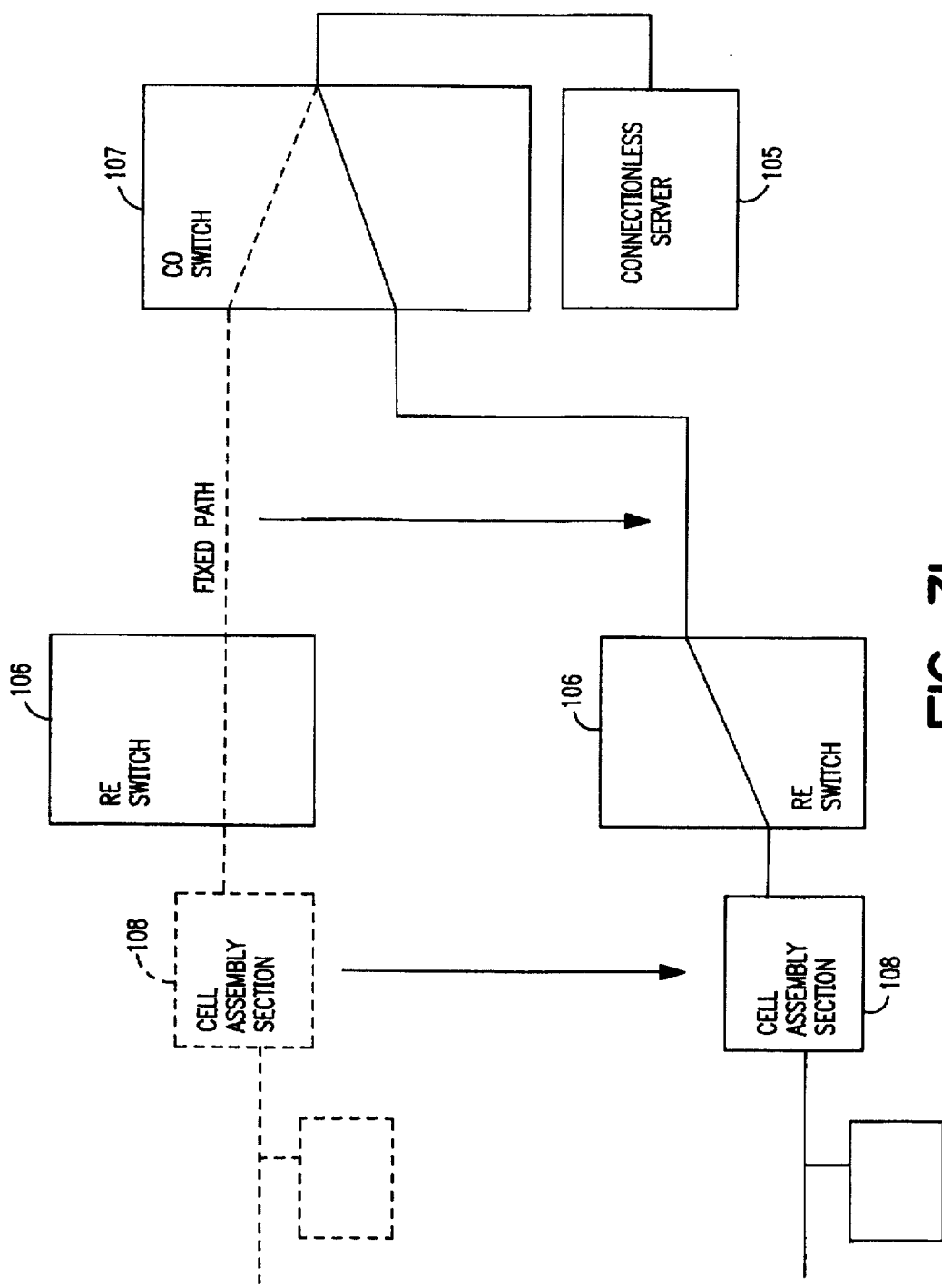
FIG. 31 is a diagram for use in explanation of accommodation of displacement of a cell assembly section.

FIG. 31 is a diagram illustrating accommodation to the displacement of the between-LAN-data-and-cell conversion section in the communication system in which the connectionless server is installed in the CO exchange 107 as shown in FIG. 30. In this figure, the displacement of the cell assembly section 108, corresponding to the between-LAN-data-and-cell conversion section, can be accommodated merely by re-establishing the fixed path, shown by a dotted line, between the RE exchange 106 and the CO exchange 107 as shown by a solid line.

Figure 32:
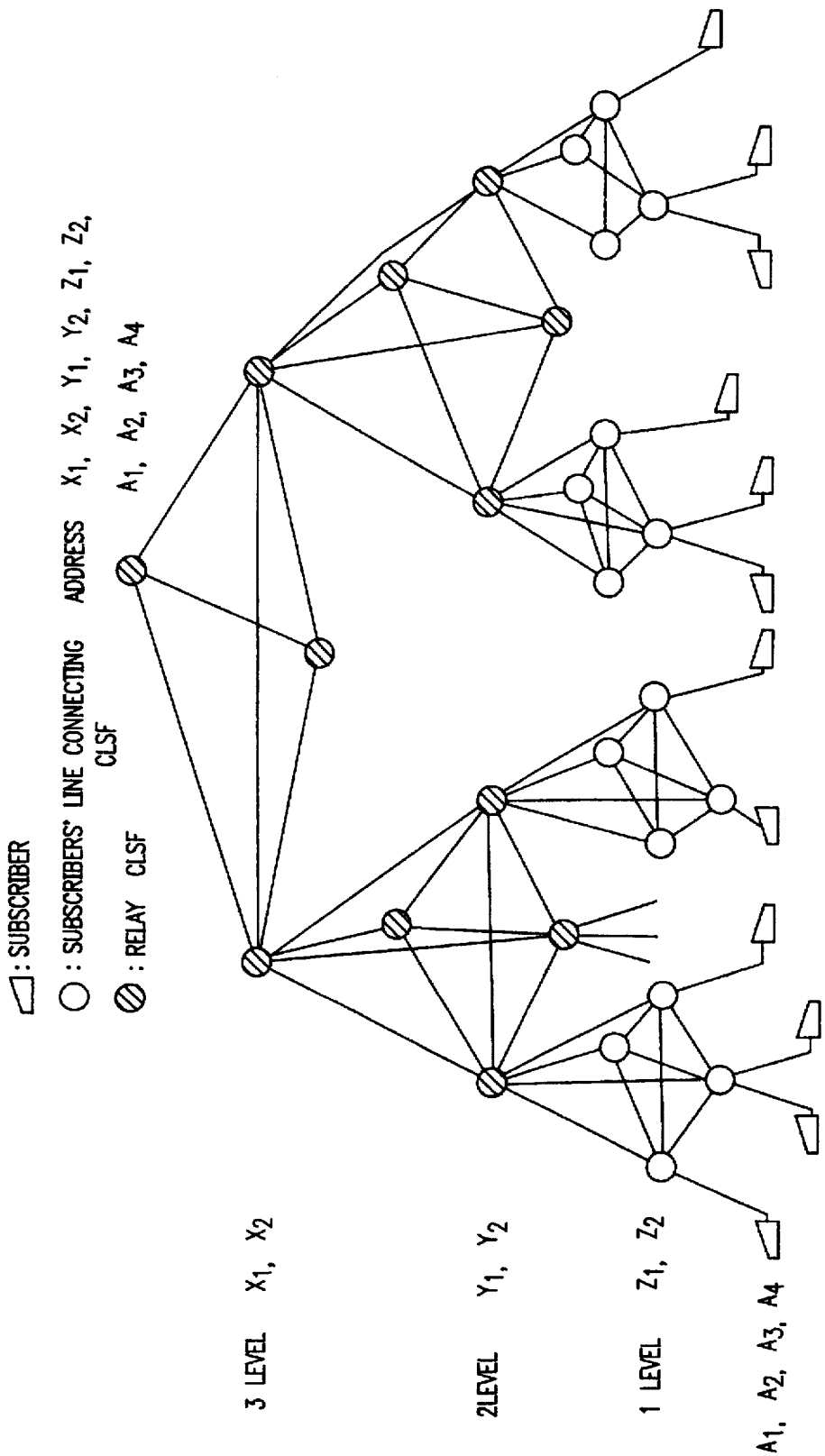
FIG. 32 illustrates one example of an interserver connection system.

FIG. 32 illustrates one example of the interserver connection in the first invention. This figure illustrates an interserver connection system of hierarchical structure in which, at each level in the hierarchy, two or more servers, or connectionless service function CLSFs, are arranged into groups of more than one server, mesh connections are made in each group, and each group of CLSFs is connected to a relay CLSF at a higher level. In FIG. 32, there is shown a three-level hierarchy. Suppose now that, of a 10-digit address $X_1 X_2 Y_1 Y_2 Z_1 Z_2 A_1 A_2 A_3 A_4$, 6 digits of $X_1 X_2 Y_1 Y_2 Z_1 Z_2$ represent a station number. Each hierarchical level is assigned a 2-digit address. The CLSFs at each level analyze the destination address of a message beginning with its high-order digits, route the message to a high-order relay CLSF when the message is not directed to their group, analyze lower-order digits when the message is directed to their group, and route the message to a receiving CLSF.

Figure 33:
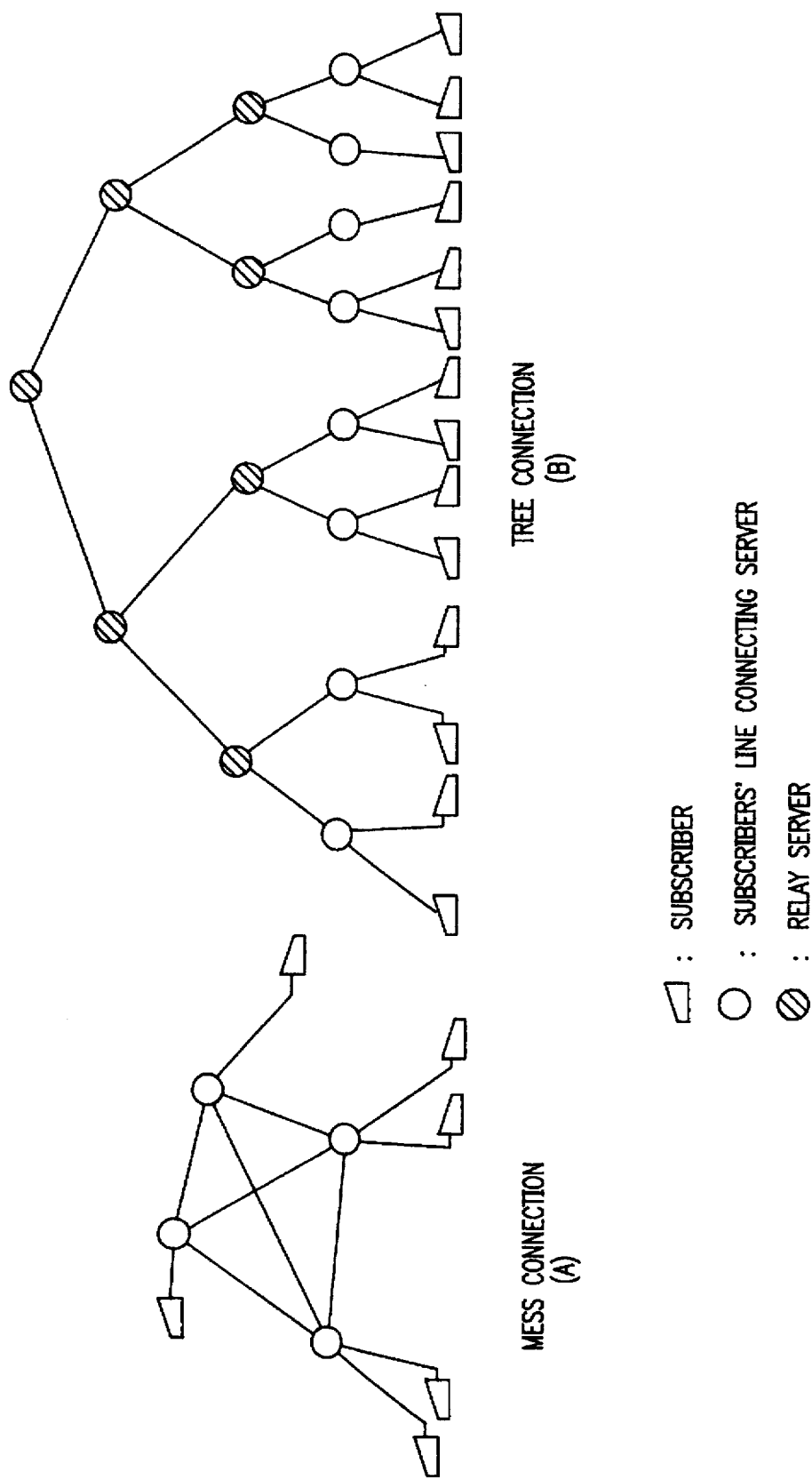
FIG. 33 illustrates another example of the interserver connection system.

In general, there is a high traffic volume between stations close to each other, and the traffic volume reduces as the distance between stations increases. For this reason, CLSFs close to one another are grouped, and a mesh connection is made within a group. This eliminates the need of the use of relay CLSFs for intragroup communication with a high traffic volume, permitting the burden imposed on the relay CLSFs to be alleviated. In addition, in the case of long-distance communications, high-order digits of addresses have only to be analyzed. This can reduce the amount of address analysis, which is advantageous in comparison with the case where only a mesh connection or a tree connection is used as shown in FIG. 33.

In the hierarchical structure of FIG. 32, the relay CLSFs are described as being placed at high levels all the time. On the other hand, use may also be made of one of the lowest-level subscribers' line connecting CLSFs as a relay CLSF.

The second invention, which, as described above, sends connectionless data simultaneously from one LAN to two or more LANs, is the same as the first invention in the entire system configuration, cell format, etc. Thus, their description will be omitted herein.

Figure 34:
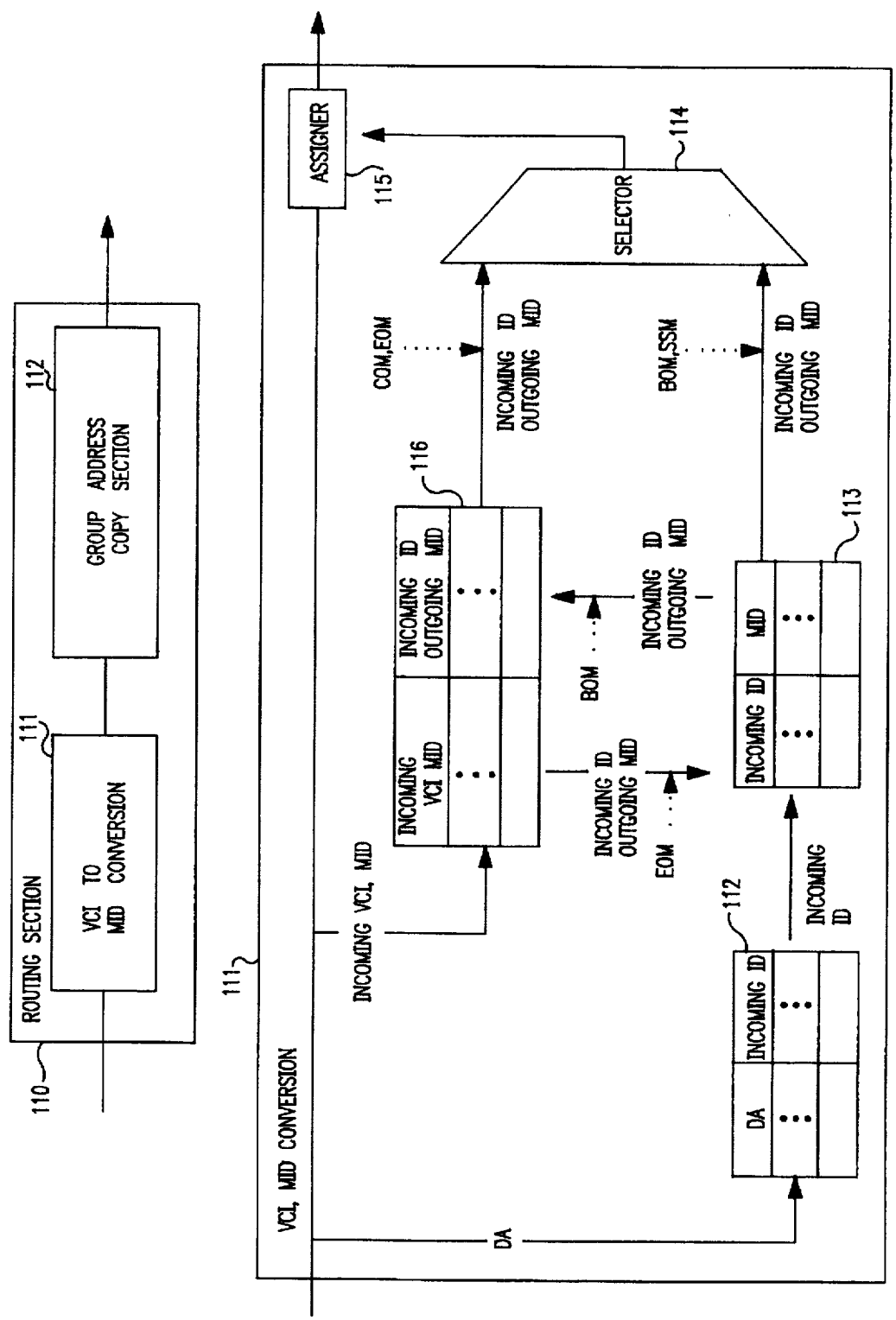
FIG. 34 is a block diagram of an example of a routing section according to a second invention.

The server is also the same in configuration as that shown in FIG. 25 of the first invention. The connectionless-server-inherent function section, or the routing section 110, includes a group address copying section 112 in addition to a between-VCI-and-MID conversion section 111 that has a configuration similar to that shown in FIG. 26 of the first invention. FIG. 34 is a diagram for explaining the between-VCI-and-MID conversion section using a table contained therein. In this figure, when a BOM or SSM cell is input, DA that indicates the destination is extracted from that cell. A DA-to-incoming-MID correspondence table 112 is referred to by that DA to retrieve an incoming MID. As a result, the incoming MID and an outgoing MID to be placed in the input cell are output from an incoming-ID-to-message-identifier-MID correspondence table 113 and then applied to an assigner 115 via a selector 114, so that they are placed in the input cell. The input cell is applied to the group address copying section. At this point, when a BOM cell is input, the relationship of the virtual channel identifier VCI and the message identifier MID, which are placed in that input cell, to the incoming ID and the outgoing MID is stored in a table 116.

When a COM or EOM cell is input, reference is made to the table 116 to retrieve the incoming ID and the outgoing MID, which are, in turn, applied to the assigner 115 via the selector and then placed in the input cell. The cell is output to the group address copying section 112. When an EOM cell is input, the contents of the incoming-ID-to-outgoing-MID correspondence table 113 are erased.

The group address copying section 112 copies as many cells as needed, the number of copies depending on a group address. The conversion from incoming ID to incoming VCI and assignment of the VCI to the cell are performed, and then the cell is output to the ATM network.

Figure 35:
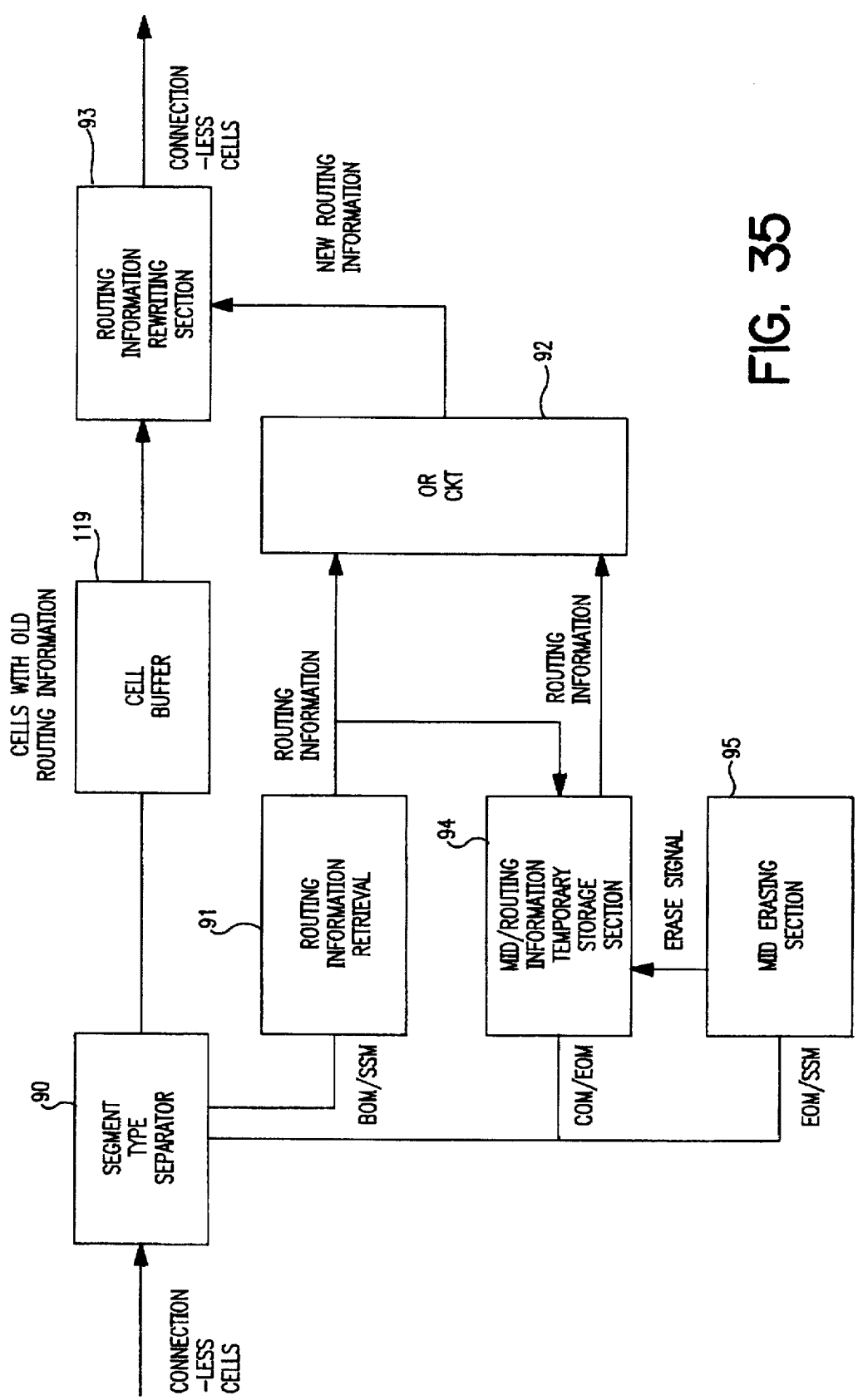
FIG. 35 is a block diagram of the another example of the routing section according to the second invention.

FIG. 35 illustrates another example of the connectionless-server-inherent function section (routing section) according to the second invention. This figure is similar to FIG. 26 of the first invention, and thus like reference characters are used to denote corresponding parts. Unlike the section in FIG. 26, the section of FIG. 35 is equipped, between the segment type separator and the routing information rewriting section, with a cell storage section 119 which temporarily stores cells input from the between-LAN-data-and-cell conversion section and having old routing information.

Figure 36:
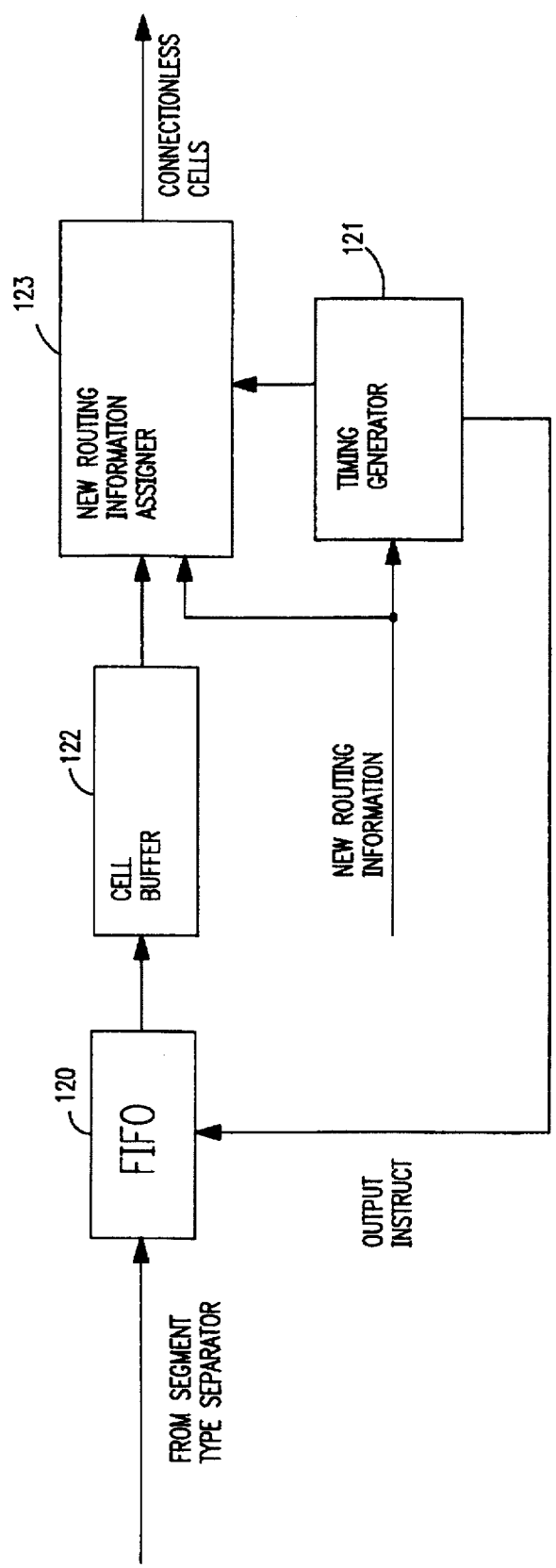
FIG. 36 is a block diagram of the cell storage section and the routing information rewriting section.

FIG. 36 is a detailed block diagram of the cell storage section and the routing information rewriting section of FIG. 35. In this figure, connectionless cells from which segment types have been separated by the segment type separator 90 are input to a first-in first-out memory (FIFO) 120. The connectionless cells stored in the FIFO 120 are output to a cell buffer 122 in accordance with an outputting instruct signal from a timing generator 121 which will be described later. The timing generator 121 is responsive to new routing information output from the OR circuit 92 to output to a new routing information assigner 123 a timing signal used for assigning new routing information to the connectionless cells. The new routing information assigner 123 is responsive to the timing signal to assign new routing information from the OR circuit 92 to the connectionless cells from the cell buffer 122. The connectionless cells are then input to the ATM switch 64 of FIG. 15.

As described above, in order to distribute connectionless information to several destinations, it is necessary to output connectionless cells in accordance with the value of new routing information. The timing generator 121 outputs a timing signal to the new routing information assigner 123 each time it receives new routing information from the OR circuit 92 with the result that connectionless cells stored in the cell buffer 122 are output assigned the new routing information. When the last new routing information is output from the OR circuit 92, the end mark placed in that information is detected by the timing generator 121. At this point, an output instruction is applied to the FIFO 120, so that new connectionless cells are entered into the cell buffer 122.

Figure 37:
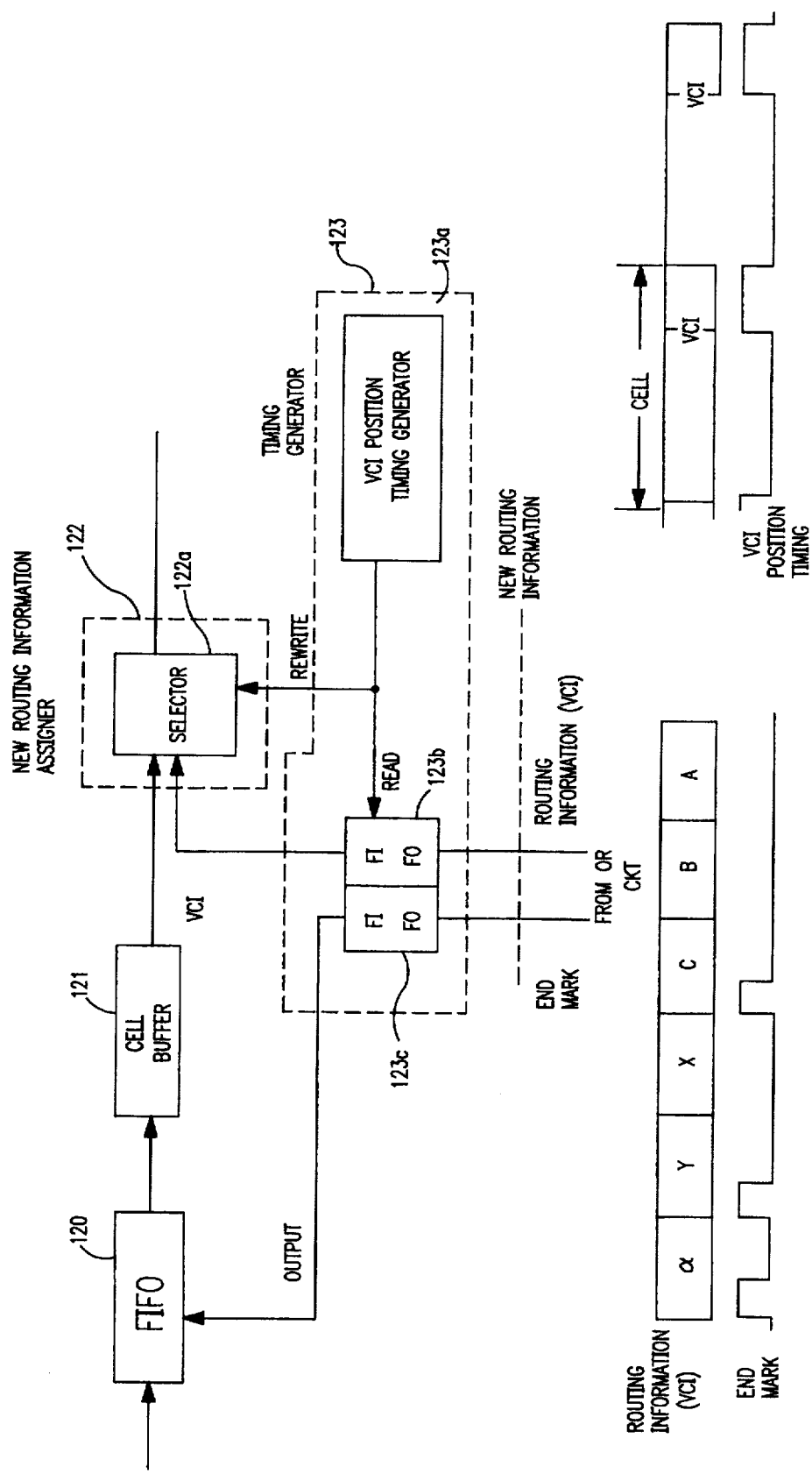
FIG. 37 is a diagram for use in explanation of the operation of the cell storage section and the routing information rewriting section.

FIG. 37 is a diagram useful in explaining the operation of the cell storage section and the routing information rewriting section of FIG. 36. As shown, new routing information VCI and an end mark indicating the last of pieces of VCI corresponding to a group address are applied from the OR circuit 92 to two FIFOs 123b and 123c, respectively, in the timing generator 123. At the timing of the VCI position in a cell, a VCI position indicating timing generator 123a in the timing generator 123 outputs a rewrite instruction to a selector 122a constituting the new routing information assigner 122 and a readout instruction to the FIFO 123b. Consequently, the selector 122a copies cells from the cell buffer 121, so that old VCI stored in cells are rewritten into new VCI. When the end mark is detected by the FIFO 123c, the FIFO 120 is instructed to output next cells to the cell buffer 121, so that the contents of the cell buffer are updated.

Figure 38:
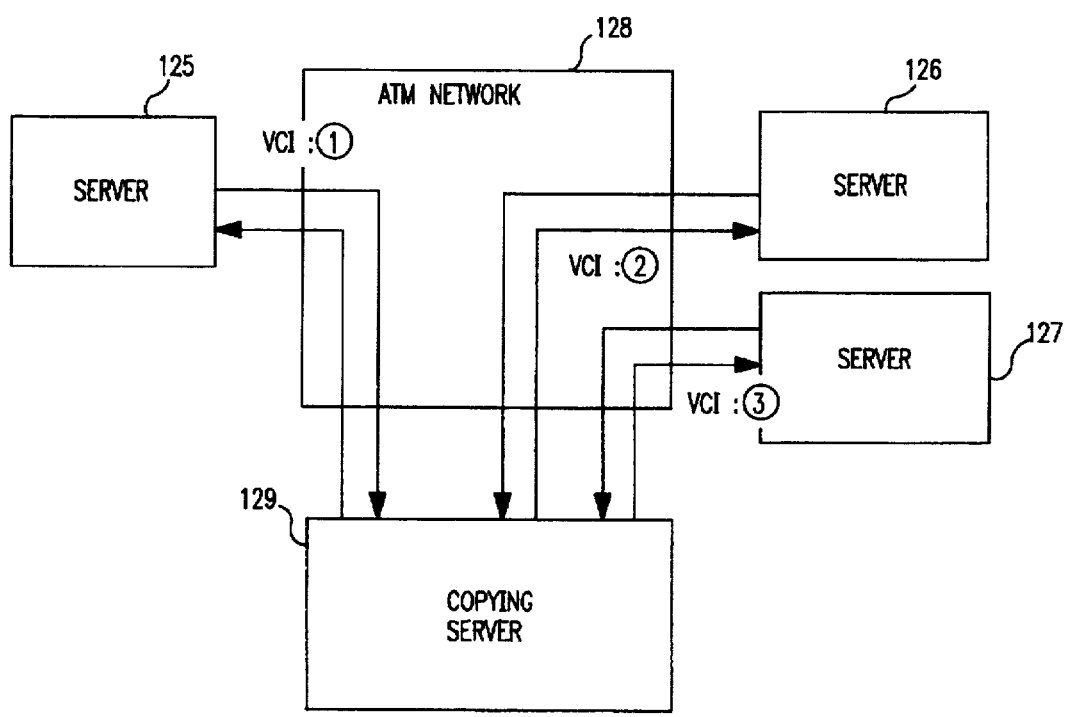
FIG. 38 illustrates one example of installation of servers and an ATM network in accordance with a third invention.

FIG. 38 illustrates an arrangement of servers in a third invention. In this figure, only servers and an ATM network are illustrated for simplicity, and the between-LAN-data-and-cell conversion section and each of the terminals in FIG. 15 are omitted.

In FIG. 38, when a server 125 has connectionless information to be distributed to servers 126 and 127, connectionless cells resulting from the connectionless information are transferred to a copying server 129 through an ATM network 128 over a virtual channel with a virtual channel identifier ①. The cells are copied by the copying server and then distributed to the servers 126 and 127 over virtual channels with virtual channel identifiers VCI ② and ③.

In FIG. 38, the configuration of the copying server 129 is the same as those shown in FIGS. 35 and 36. The other servers 125, 126 and 127 are not equipped with the cell storage section 119 in FIG. 35. When the connectionless information is directed to a single destination, it will be directly transferred, for example, from the server 125 to the server 126 over a virtual channel not shown.

Figure 39:
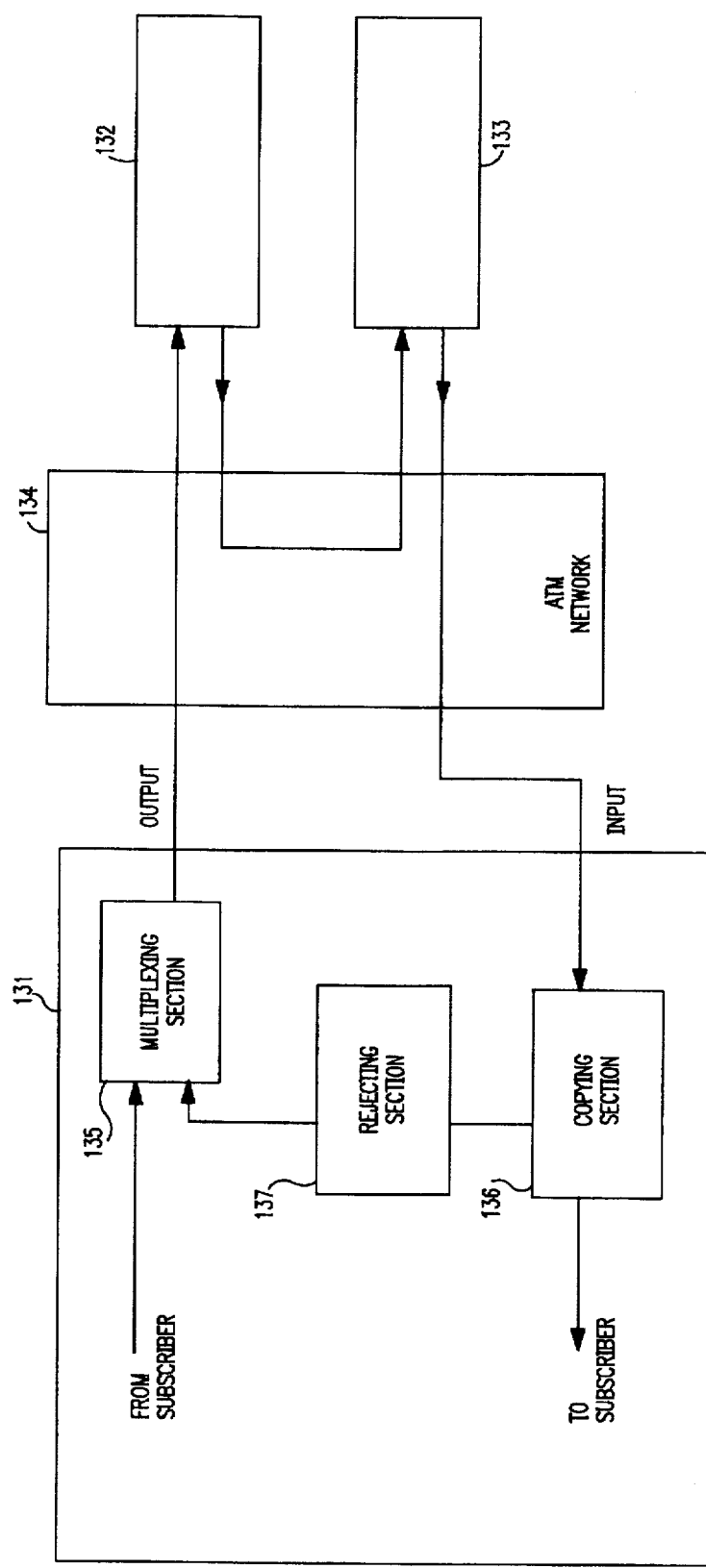
FIG. 39 is a block diagram of a fourth invention.

FIG. 39 is a block diagram of an embodiment of a fourth invention. In this figure, each of servers 131, 132 and 133 has a group address and is equipped with input and output interfaces dedicated to connectionless cells to be distributed to several destinations. The output interface of the server 131 is connected to the input interface of the server 132 through an ATM network 134 so that, as a whole, a ring form from virtual channels may be formed. Note that a virtual channel for transfer of cells directed to one destination is provided separately.

A multiplexer 135 in each server multiplexes connectionless cells having a group address from a subscriber (associated with a LAN) and then outputs them on the ring form from the virtual channels. Of incoming cells from the input interface of each server, cells directed to subscribers under the same server are copied by a copying section 136 and then output to the subscribers. Of incoming cells, cells output from the same server are rejected by a rejecting section 137 because they have traveled around the ring form from the virtual channels.

Figure 40:
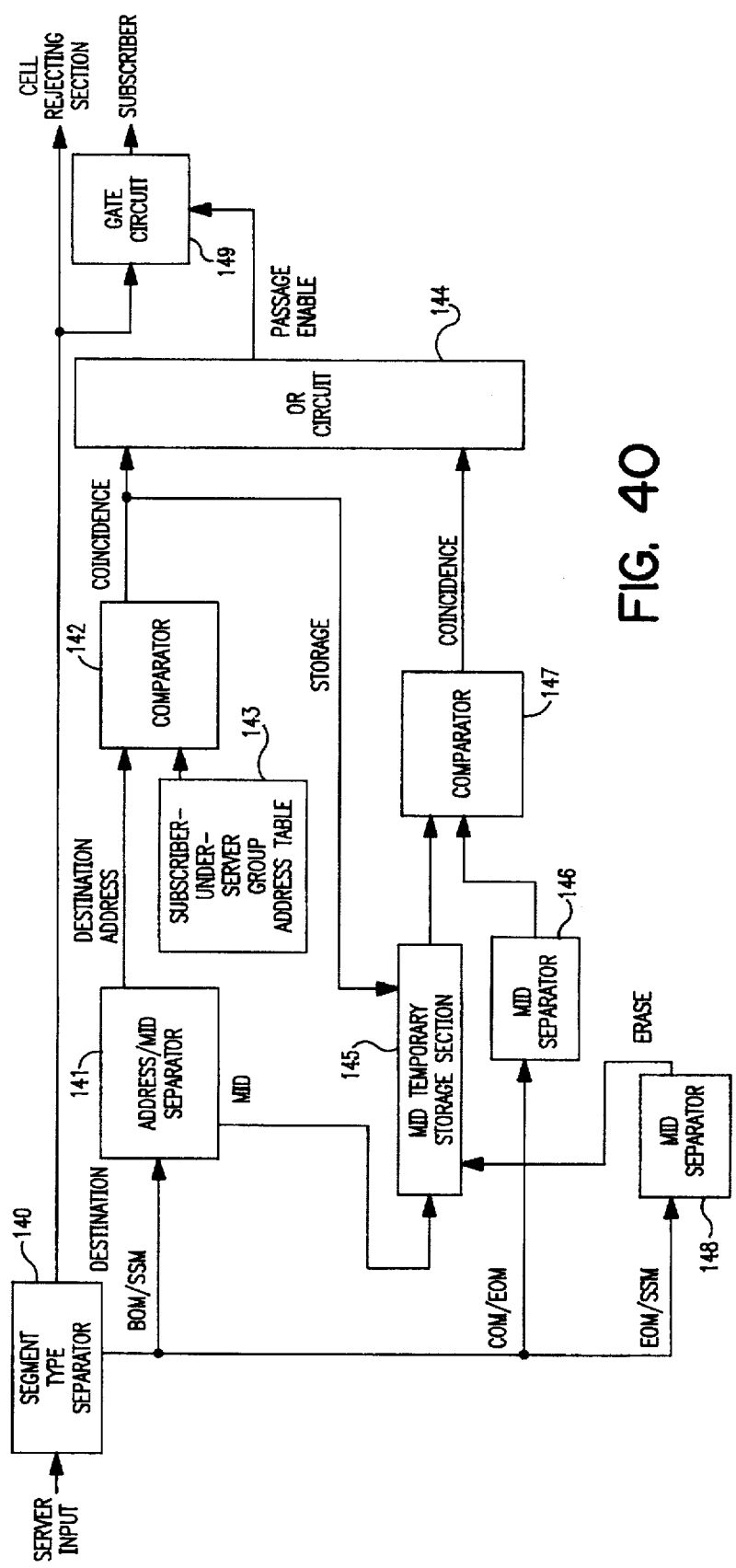
FIG. 40 is a detailed block diagram of the copying section.

FIG. 40 is a detailed block diagram of the copying section 136 of FIG. 39. In this figure, a segment type separator 140 separates segment types from incoming cells from the input interface dedicated to connectionless cells directed to several destinations. An address-MID separator 141 separates a destination address and an MID from a BOM or SSM cell. The destination address is compared with the contents of a subscriber-under-server group address table 143. When a coincidence occurs, a coincidence signal is applied to an OR circuit 144, and a MID temporary storage section 145 is commanded to store the MID separated by the separator 141.

When a COM or EOM cell is input, the separator 146 separates the MID from the cell. The resulting MID is compared with the MID stored in the MID temporary storage section 145. When a coincidence occurs, a coincidence indicating signal is applied to the OR circuit 144. When an EOM or SSM cell is input, the MID separator 148 issues an erase instruction to the MID temporary storage section 145.

When a coincidence signal is output from the comparator 142 or 147, a passage enable signal is applied from the OR circuit 144 to a gate circuit 149, so that cells output from the segment type separator 140 are permitted to be sent to the subscribers. At the same time, the cells are sent to the rejection section 137 as well.

Figure 41:
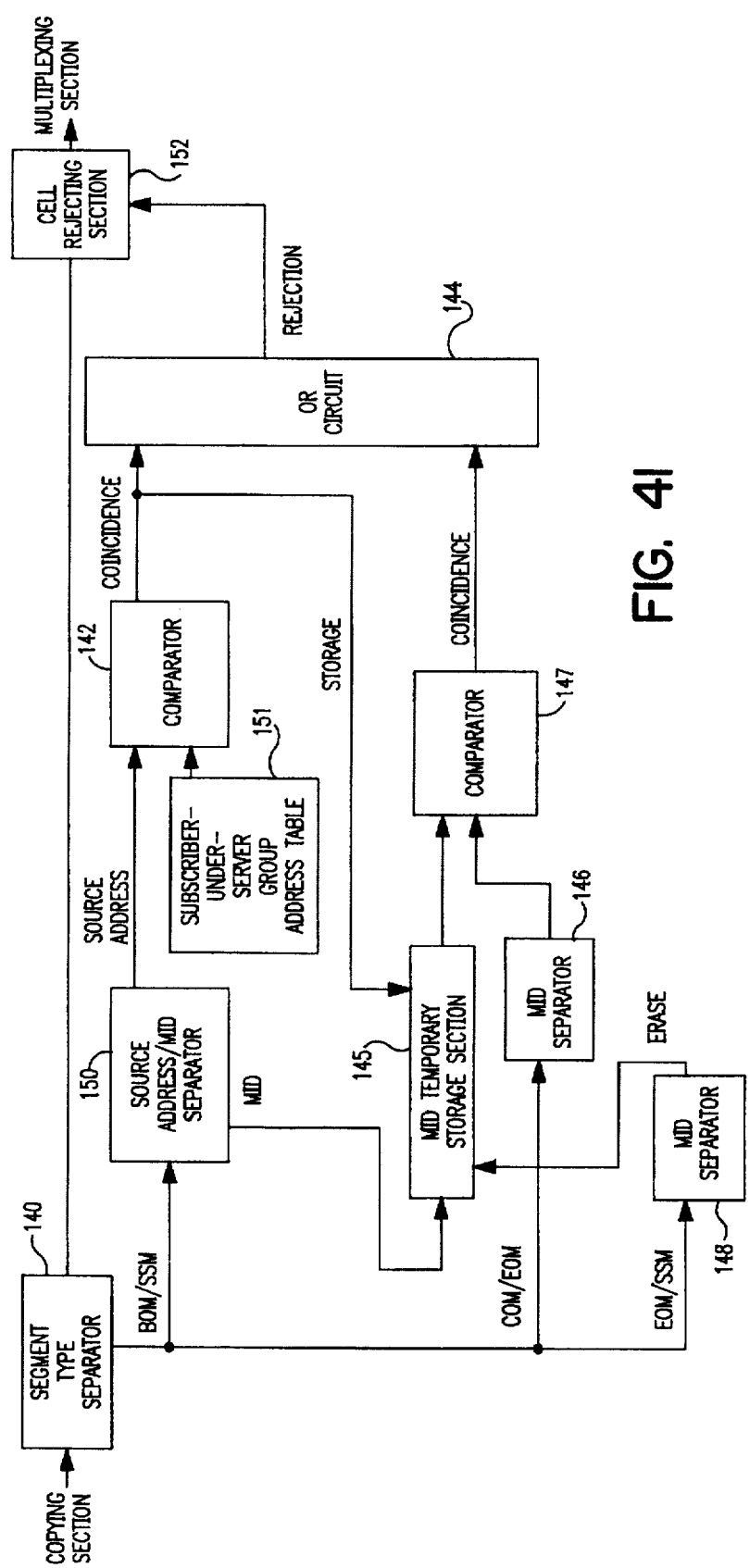
FIG. 41 is a detailed block diagram of the rejecting section.

FIG. 41 is a detailed block diagram of the rejection section 137 of FIG. 39. The rejection section is similar to the copying section shown in FIG. 40, and thus only differences will be described. In this figure, incoming cells from the copying section 136 are subjected to segment type separation by the-segment type separator 140. When a BOM or SSM cell is input, a source-address and MID separator 150 separates a source address and an MID from it. The source address is compared with the contents of a subscriber-under-server address table 151 by a comparator 142. When a coincidence occurs, the source of the incoming cells is identified as a subscriber under the same server. That is, the cells have traveled around the ring form from the virtual channels, so that they are rejected by the rejecting section 152. When no coincidence occurs, incoming cells are output as they are to the multiplexing section 135. The other operations are the same as those in FIG. 40.

Figure 42:
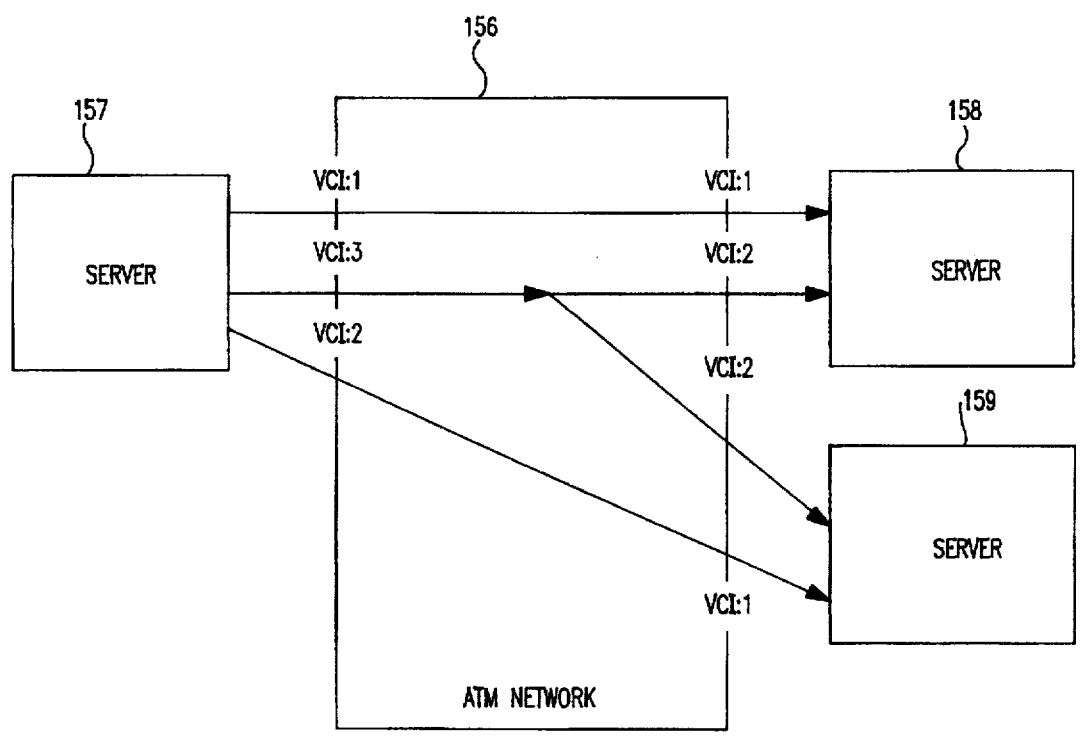
FIG. 42 is a block diagram of an embodiment of a fifth invention.

FIG. 42 illustrates a fifth invention. In this figure, an ATM network 156 cannot only make one-to-one exchange from transmit side to receive side but also set one-to-N (N≧1) virtual channels. When, for example, a server 157 analyzes the destination address of connectionless cells, if the cells are directed to a single destination via, for example, a server 158, they will be sent to the ATM network 156 with the VCI of their cell header as 1. When they are bound for a server 159, VCI is set to 2. In the case of a group address for the servers 158 and 159, VCI is set to 3, so that cells are copied in the ATM network 156 for subsequent transfer to the servers 158 and 159. Here, in the server 158, cells with a single address and cells with a group address, transferred from the server 157, have different VCI values, so that they can be identified as separate messages. The method of copying cells in the ATM network depends on the method of constructing a communication path in the ATM network.

Figure 43:
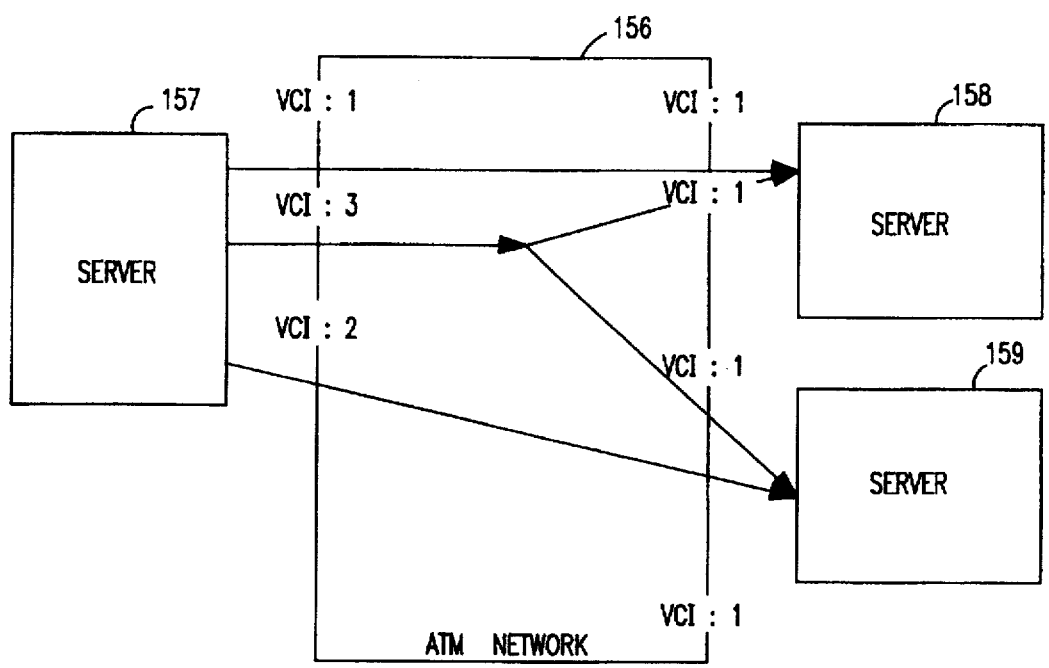
FIG. 43 illustrates the other embodiment of the fifth invention in which receiving VCI are made identical with one another.

FIG. 43 illustrates an embodiment of the fifth invention in which the receive-side VCIs are made equal to one another. Although cells are transferred from the server 157 with VCI assigned as with the case of FIG. 42, the same VCI is assigned to cells with an individual address and cells with a group address in the servers 158 and 159.

As described previously, each cell has a message identifier MID for distinguishing between messages. Dividing message identifiers into ones for group addressing and ones for individual addressing will make it possible to identify cells from the server 157 as individually addressed cells or group addressed cells in the server 158, for example.

The configuration, the cell format, etc., of a communication system of a sixth invention in which the number of virtual channels between connectionless communication servers can be varied according to the number of messages are the same as those of the first invention, and thus their description is omitted.

Figure 44:
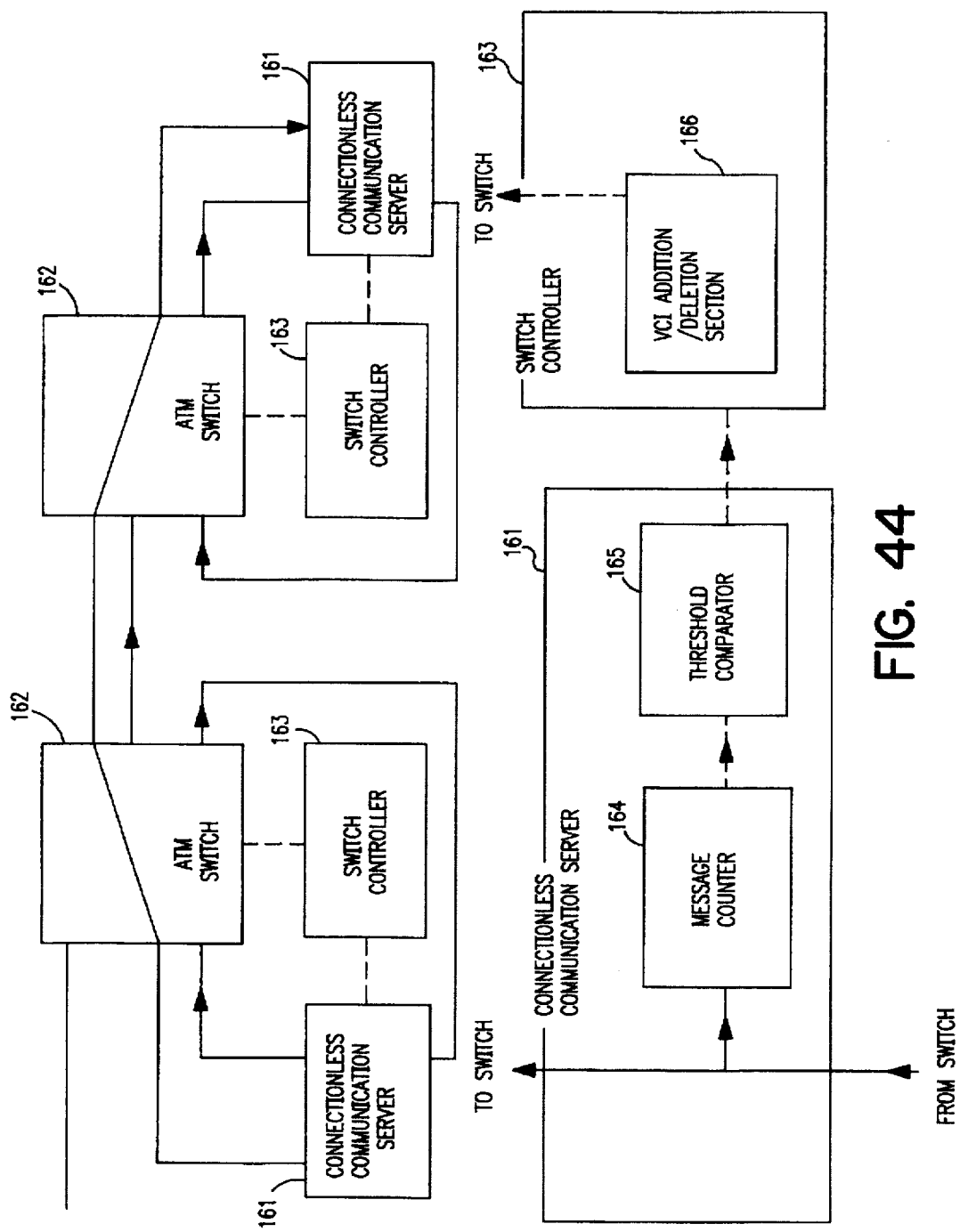
FIG. 44 is a block diagram of a connectionless communication system in accordance with a sixth invention.

FIG. 44 is a block diagram of the communication system according to the sixth invention. In this figure, connectionless communication servers 161 are connected by virtual channels through ATM switches 162 within an ATM network. For each of the ATM switches 162, a switch controller 163 is provided.

The connectionless communication server 161 is equipped with a message counter 164 for counting the number of messages simultaneously transferred between the servers 161, and a threshold comparator for comparing the message count with a threshold value. The switch controller 163 is equipped with a VCI adding/deleting section 166 for causing the switch 162 to set or release a virtual channel.

Figure 45:
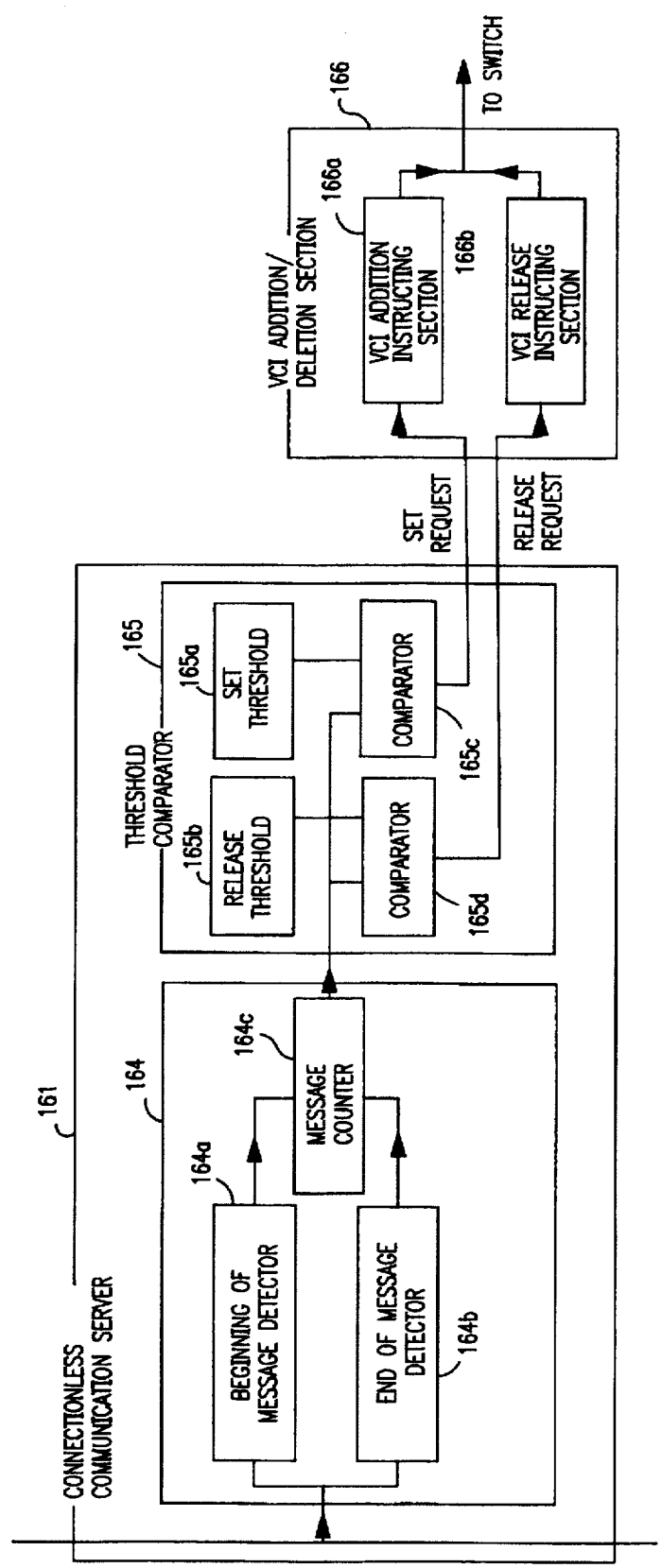
FIG. 45 is a block diagram of the message counter, the threshold comparator, and the VCI adding/deleting section.

FIG. 45 is a block diagram of the message counting section 164 and the comparator 165 in the communication server 161, and the VCI adding/deleting section 166 in the switch controller 163. As shown, the message counting section 164 comprises a beginning-of-message detector 164a for detecting the arrival of a BOM cell, an end-of-message detector 164b for detecting the arrival of an EOM cell, and a message counter 164c which is advanced at the time of the detection of the beginning of message by the beginning-of-message detector 164 and decremented by one when the end of message is detected by the detector 164b.

The threshold comparator 165 stores a threshold value 165a used in setting a new virtual channel and a threshold value 165b used in releasing a virtual channel which has already established and is provided with two comparators 165c and 165d for comparing the message count output from the message counter 164c with those threshold values. When the threshold value 165a is exceeded by the message count, the comparator 165c will issue a request to set a virtual channel to the switch controller 163. When the message count becomes smaller than the threshold value 165b, the comparator 165d will issue a request to release a virtual channel to the switch controller 163.

The VCI addition/deletion section 166 is constructed from a VCI addition instructing section 166a which is responsive to the virtual channel set request from the comparator 165c in the threshold comparing section 165 to instruct the exchange to add VCI, and a VCI release instructing section 166b which is responsive to the release request from the comparator 165d to instruct the exchange to release the virtual channel.

The setting threshold 165a and the releasing threshold 165b have unequal values; in general, the former is larger than the latter. This is because it actually takes long to set or release a virtual channel. The use of hardware for the message counting section 164 and the threshold comparing section 165 would permit the number of virtual channels to be increased or decreased at high speed. In this case, the two thresholds could be set equal to each other.

Figure 46A:
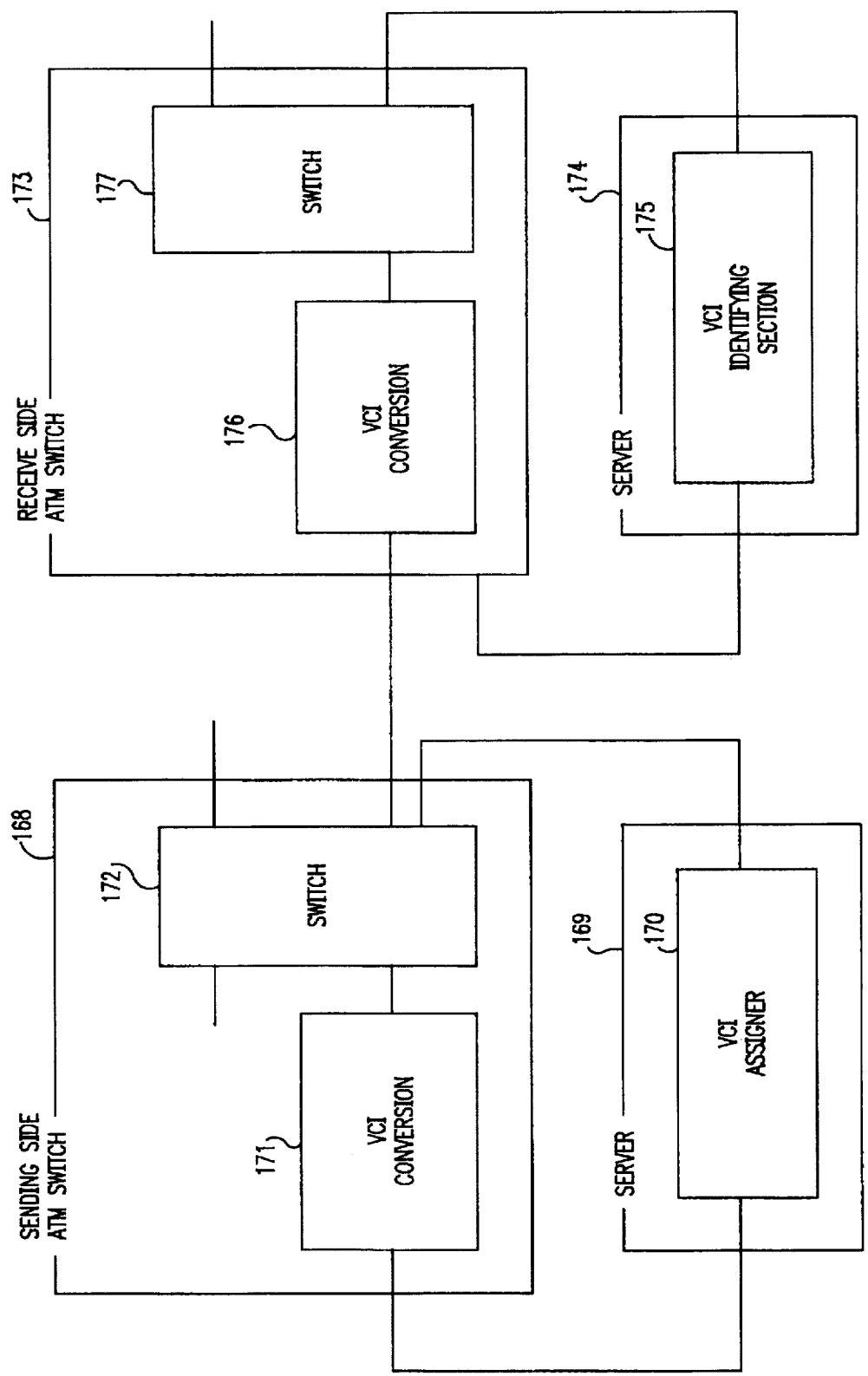
FIG. 46 illustrates an embodiment in which any VCI can be used between switching units.

FIG. 46(a) is a block diagram of an embodiment in which any virtual channel identifier (VCI) is made available between switchs. In this figure, a VCI that is newly set by a VCI adding facility 170 in a server 169 connected to a transmit-side ATM exchange 168 is converted by a VCI adding section 171 to any VCI that is not currently available between switches, thereby making VCIs between the switchs effectively available in the case also where VCIs between servers are variable.

Figure 46B:
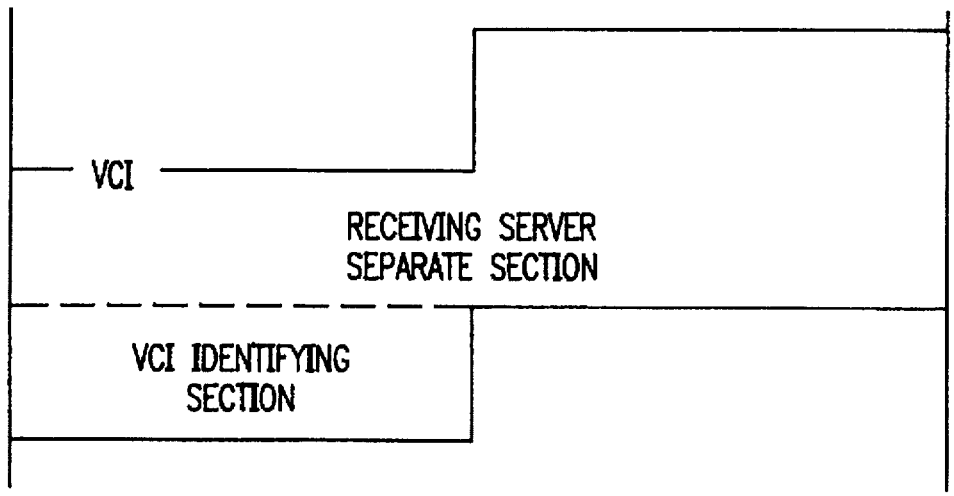

In such a case, as shown in FIG. 46(b) illustrating area division of a VCI, between the VCI adding facility 170 and the VCI conversion section 171, by dividing the VCI storage section in the cell format of FIG. 16 into a receiving server separate section and a VCI identifying section, it becomes possible to determine a receive-side virtual channel in the VCI adding facility 170 and assign a specific value to the server separate section independently of the number of virtual channels currently set between the servers.

Figure 46C:
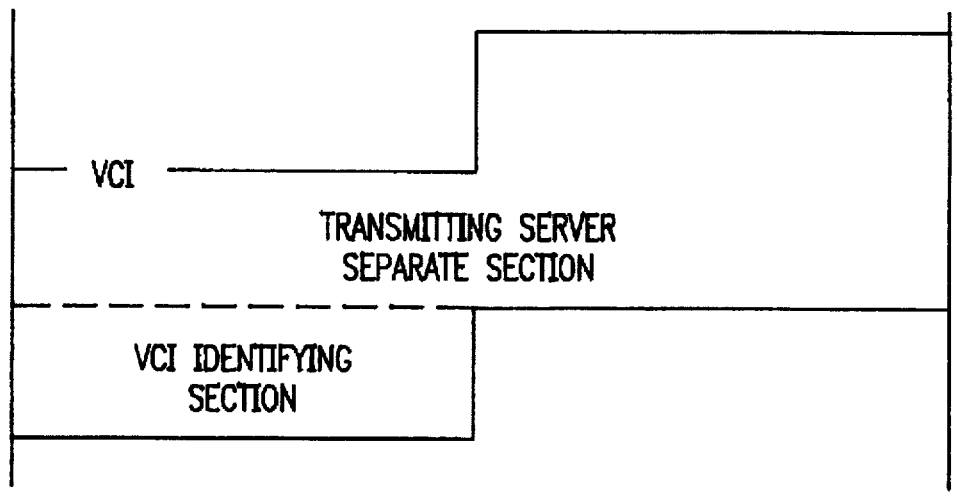

Likewise, as shown in FIG. 46(c), between a VCI converting section 176 in a receive side ATM exchange 173 and a VCI identifying facility 175 in a server 174 as well, by dividing VCI into a transmitting server separate section and a VCI identifier for identifying a virtual channel coupled between the same servers, the receive side will be enabled to specify a transmitting server by identifying only the server separate section.

By assigning a VCI and a MID that are not currently in use as the contents of the VCI identifier of FIG. 46(b), (c)

and a message identifier for a new message, the facility similar to that for releasing and assigning an MID will also be used in the case where VCIs are variable.

In a seventh invention which limits the number of messages to be transmitted to a receiving LAN, receiving routing control means, i.e., a message transmit count limiting section is provided in a server as described previously. In the seventh invention, the whole communication system, the cell format, etc., the same as in the first invention, and thus their description is omitted.

Figure 47:
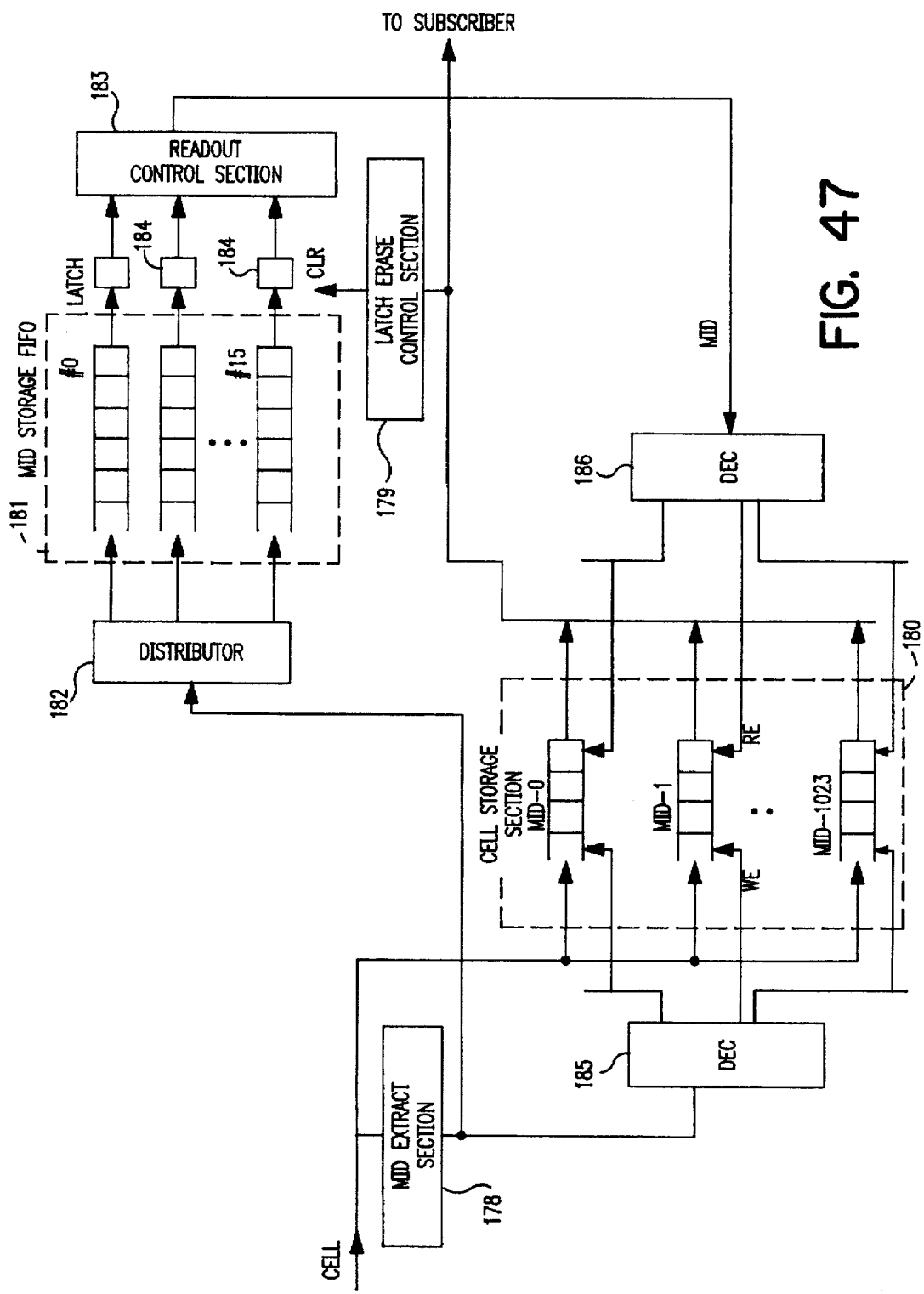
FIG. 47 is a block diagram of one example of a section for limiting the number of messages to be transmitted.

FIG. 47 is a block diagram of one example of a message transmit count limiting section. In this figure, 180 denotes a cell storage section which holds cells corresponding to message identifiers (MID) of all of messages that can arrive simultaneously. In this example, the storage section is arranged to store cells corresponding to 1,024 MIDs from MID-0 through MID-1023.

Reference numeral 181 denotes MID storage FIFOs that store message identifiers (MID) corresponding in number to messages that can be transmitted simultaneously. The FIFOs are arranged to store 16 MIDs from #0 through #15. Reference numeral 182 is a distributor which, when cells are stored in the cell storage section 180, distributes message identifiers (MID) extracted by an MID extractor 178 to the MID FIFOs 181, and 183 denotes a readout control section for scanning the FIFOs in sequence.

Reference numeral 184 denotes latches which hold MID data from the respective MID storage FIFOs 181. The readout control section 183 scans the latch outputs in sequence to take in MID data and output them. Reference numeral 185 is a decoder which decodes address parts of cell data to apply write enable signals WE to respective individual memory units of the cell storage section 180. Thus, upon receipt of a WE signal from the decoder 185, a corresponding memory unit is enabled to store message cell data that is sent at this point.

Reference numeral 186 is a decoder which decodes MID data read from the readout control section 183 to make access to a corresponding memory unit in the cell storage section, thereby reading message cell data from that memory unit. The output of the decoder 186 is applied to the cell storage section 180 as a read enable signal RE.

Message data thus read are sent to subscribers. When the EOM cell is output, each of the latches 184 is cleared by a latch erase control section 179. The circuit arranged as described above operates as follows. When cells are sent from an ATM network, the cell data is stored in a location that is designated by the decoder 185 for decoding their MID in the cell storage section 180. Meanwhile, the distributor 182 stores the MID in the corresponding FIFO memory in the MID storage FIFOs 181 using the MID.

The MID read from the MID storage FIFOs 181 is latched by the corresponding latch 184. The latched MID data is read by the scanning operation of the readout control section 183. The read MID data is applied to the decoder 186.

The decoder 186 decodes the MI data from the readout control section 183 to make access to the corresponding location in the cell storage section 180, so that the corresponding MID cells are read from that location.

The read cell data is sent to a subscriber. When an EOM cell is read, the latch 184 is cleared. Subsequently, the next MID is read from the MID storage FIFOs 181 and then latched by the latch 184. In this way, the number of messages that are transmitted simultaneously can be limited to the number of the MID storage FIFOs 181 (in this example, 16). The number of messages that can simultaneously be transmitted is determined on the basis of contracts with subscribers.

Figure 48:
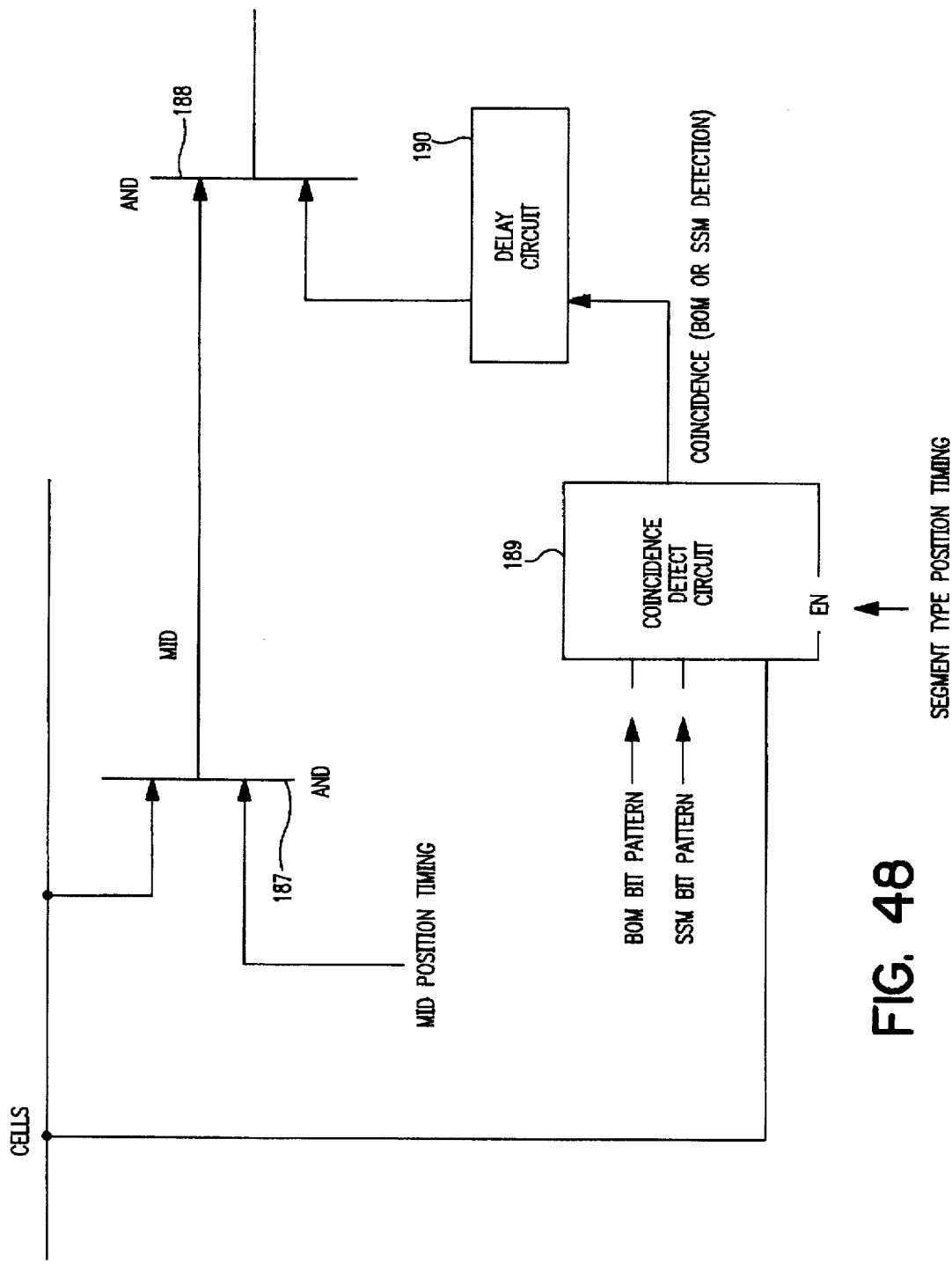
FIG. 48 is a block diagram of the MID extracting section.

FIG. 48 is a block diagram of the MID extracting section 178 for extracting message identifiers MID from incoming cells in FIG. 47. In this figure, an AND circuit 187 extracts an incoming MID in response to an MID timing signal and applies it to an AND circuit 188. Meanwhile, a coincidence detect circuit 189, when supplied with a segment type timing signal at its enable terminal, makes a comparison between the segment type of an incoming cell and a BOM or SSM bit pattern. When a coincidence occurs, a coincidence detect signal output from the circuit 189 is delayed by a delay circuit 190 a period of time from the time corresponding to the segment type storage location to the time corresponding to the MID storage location in the cell in FIG. 16 and then input to the AND circuit 188, which outputs the MID extracted by the AND circuit 188.

Figure 49:
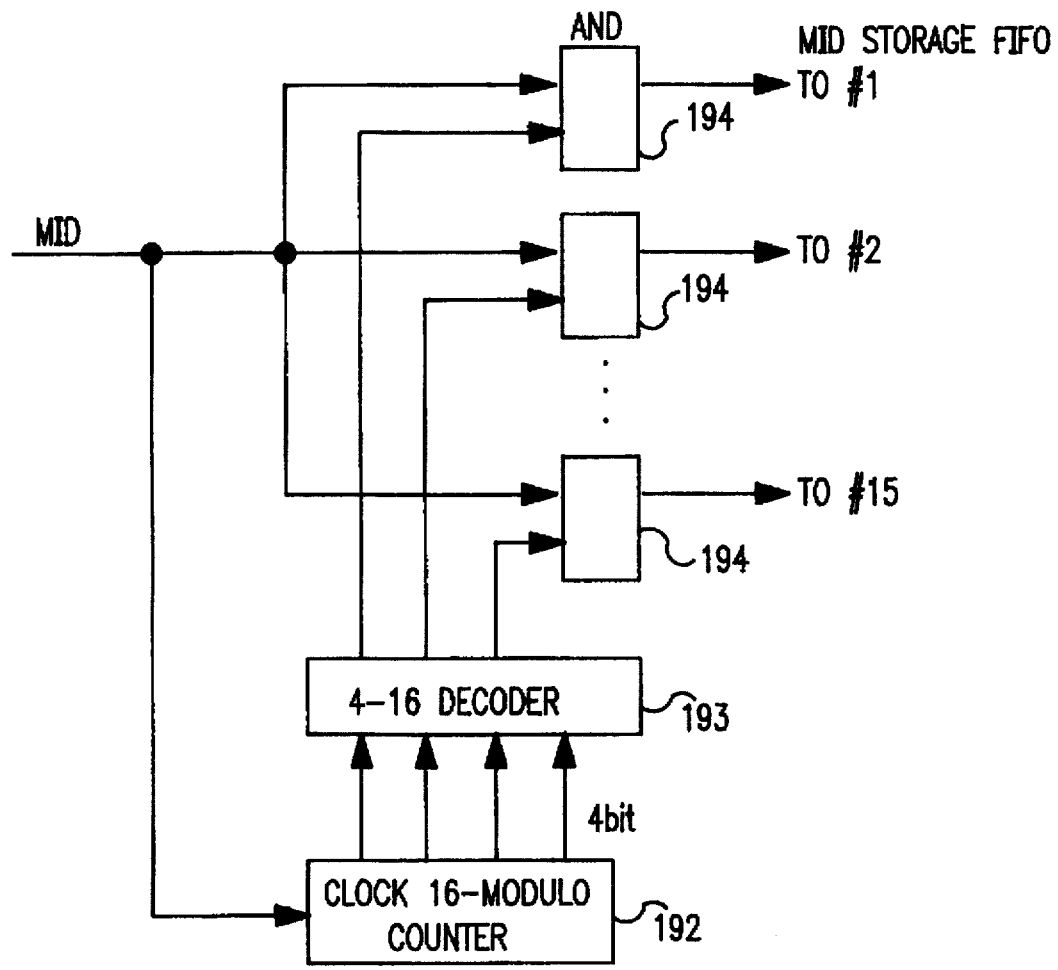
FIG. 49 is a block diagram of the distributing section.

FIG. 49 is a detailed block diagram of the distributor 182 of FIG. 47. In FIG. 47, an MID extracted by the MID extractor 178 is applied to each of AND circuits 194 and the clock input of a 16-modulo (hexadecimal) counter 192. The 16-modulo counter is counted up with each incoming MID. The count in the 16-modulo counter is decoded by a decoder 193. One of the AND circuits 194 having their outputs connected to the respective MID storage FIFOs is enabled by the decoder output, so that the MID is written into a corresponding FIFO.

FIG. 50 is a detailed block diagram of the readout control section of FIG. 47. In this figure, a 16-modulo counter 195 is counted up by a clock supplied to its clock input and having a period corresponding to the duration of one cell. A selector 196 is responsive to the count in the 16-modulo counter 195 to determine which of the latches 184 is to be selected. The MID latched in a latch selected by the selector is read into the decoder186.

Figure 51:
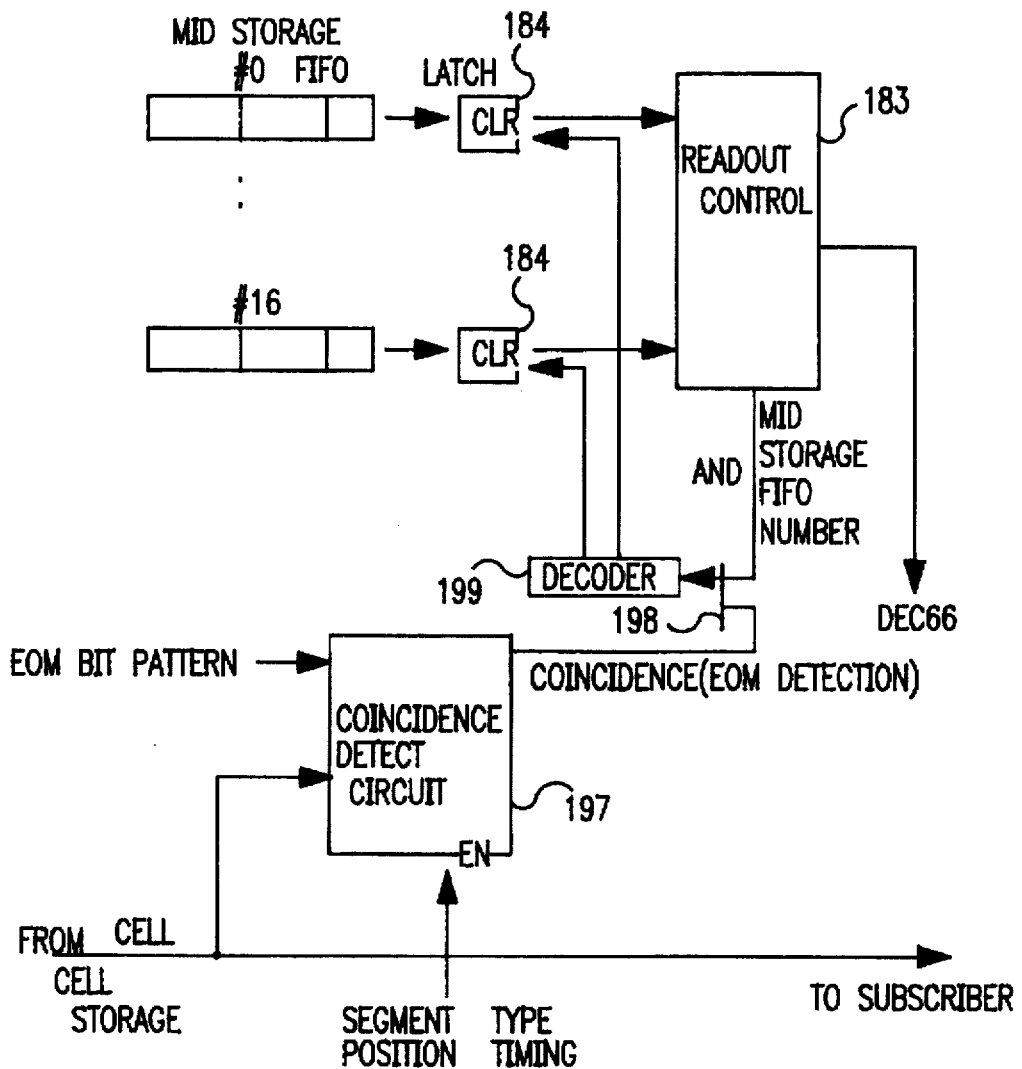
FIG. 51 is a block diagram of the latch erase control section.

FIG. 51 is a detailed block diagram of the latch erase section 179 of FIG. 47. In this figure, a coincidence detect circuit 197, having its enable terminal supplied with a segment type timing signal, makes a comparison between the cells output from the cell storage section 180 and the EOM bit pattern. Upon detecting the EOM, the coincidence detect circuit 197 outputs a coincidence signal to an input of an AND circuit 198 the other input of which is supplied with the MID storage FIFO number read from the readout control section 183, so that the FIFO number is output to a decoder 199. As a result, the decoder 199 outputs a clear signal to the latch 184 corresponding to the FIFO number.

Figure 52:
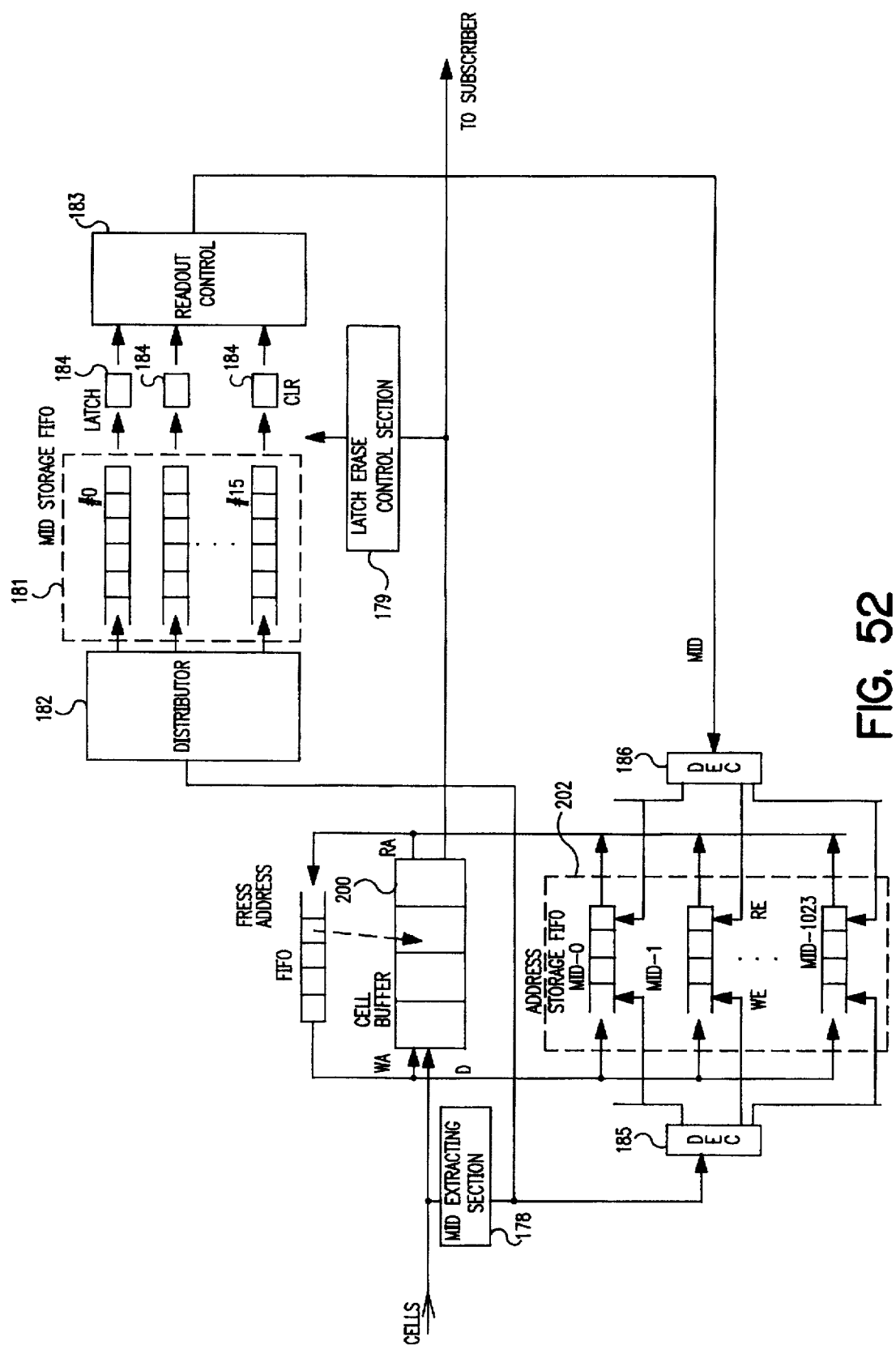
FIG. 52 is a block diagram of the other embodiment of the section for limiting the number of messages to be transmitted.

FIG. 52 is a block diagram of the other example of the message transmit count limiting section. Like reference characters are used to denote corresponding parts to those in FIG. 47. In this figure, 200 denotes a cell buffer which stores all of cells, 201 denotes a free address FIFO storing a free address of the cell buffer 200, and 202 denotes address storage FIFOs for storing cell storage addresses in the cell buffer 200 corresponding in number to messages. The address storage FIFOs 202 can store 1,024 MIDs.

The address storage FIFOs 202 are supplied with write enable signals WE from the decoder 185 and read enable signals RE from the decoder 186. Other points are the same as those in FIG. 47. The circuit thus arranged operates as follows.

When a cell arrives, a free address is taken out from the free address FIFO 201 and then that cell is stored in that location in the cell buffer 200 which corresponds to the free address. At the same time, that free address is stored in that address storage FIFO 202 which corresponds to a MID extracted from that cell by the MID extractor 178. The distributor 182 stores the MID in a corresponding one of the MID storage FIFOs 181 using the MID.

The MID read from the MID storage FIFO 181 is latched by a corresponding latch 184. The latched MID data is read out by scanning the latches 184 by the readout control section 183. The MID data thus read is applied to the decoder 186. The decoder 186 decodes the MID data from the readout control section 183 to make access to the address storage FIFO 202, thereby reading the address of the cell buffer 200 in which the cell assigned the MID is stored.

The address of the cell buffer read from the address storage FIFO 202 is entered into the free address FIFO 201 and the message data is read from the corresponding address of the cell buffer 200 for transmission to a subscriber. According to the embodiment of FIG. 52, the capacity of the buffer for holding cells can be reduced. In addition, a limited number of the MID storage FIFOs 181 (16 in this example) can limit the number of messages that are transmitted simultaneously.

Figure 53:
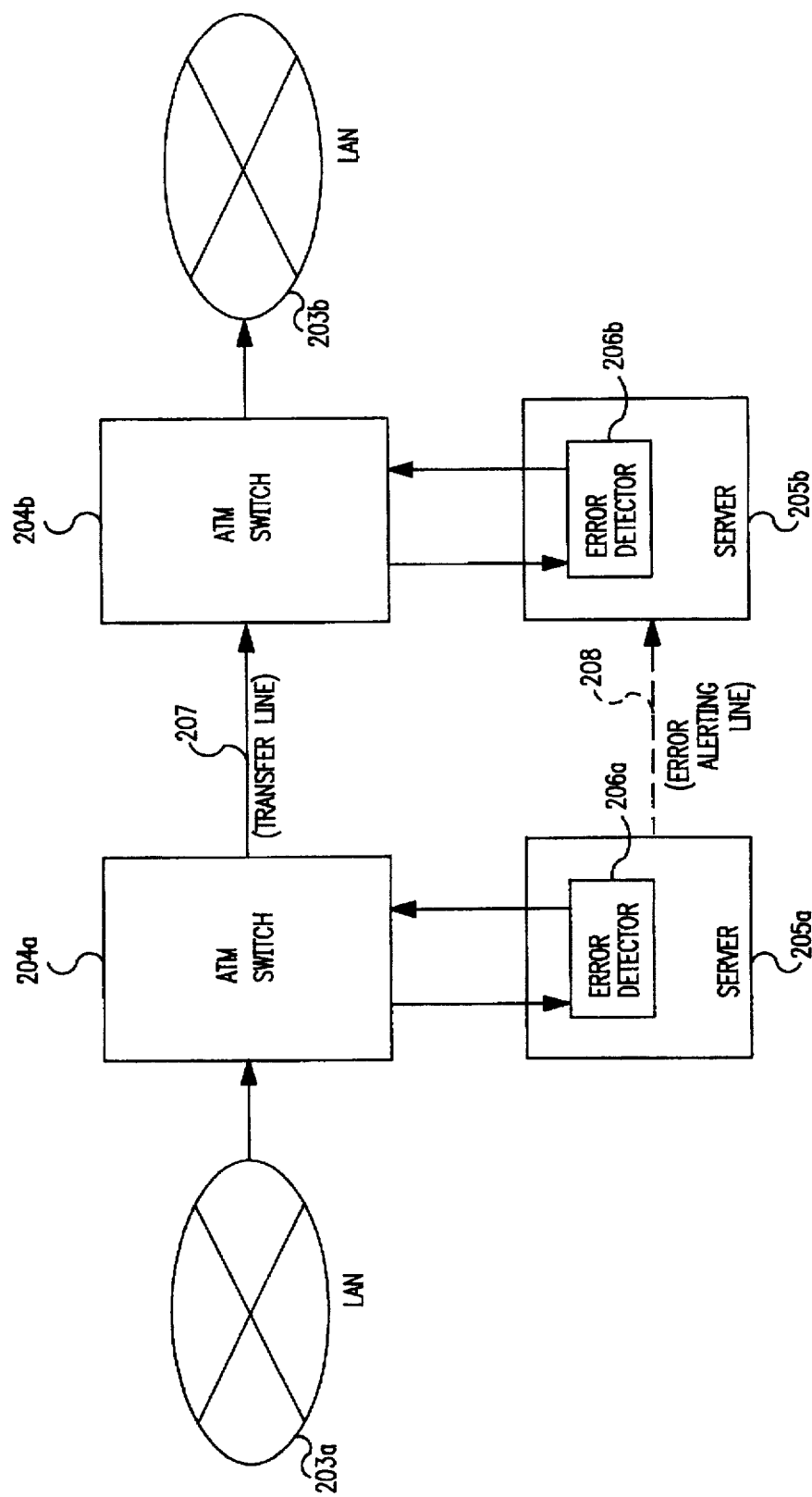
FIG. 53 is a block diagram of a connectionless communication system according to an eighth invention.

FIG. 53 is a block diagram of a communication system according to an eighth invention, in which the routing control means, or the connectionless communication server, is equipped with an error detector. Although, in this figure, the between-LAN-data-and-cell conversion sections, etc., are omitted, the eighth invention is characterized in that transmitting and receiving servers 205a and 205b have their respective built-in error detectors 206a and 206b.

Figure 54:
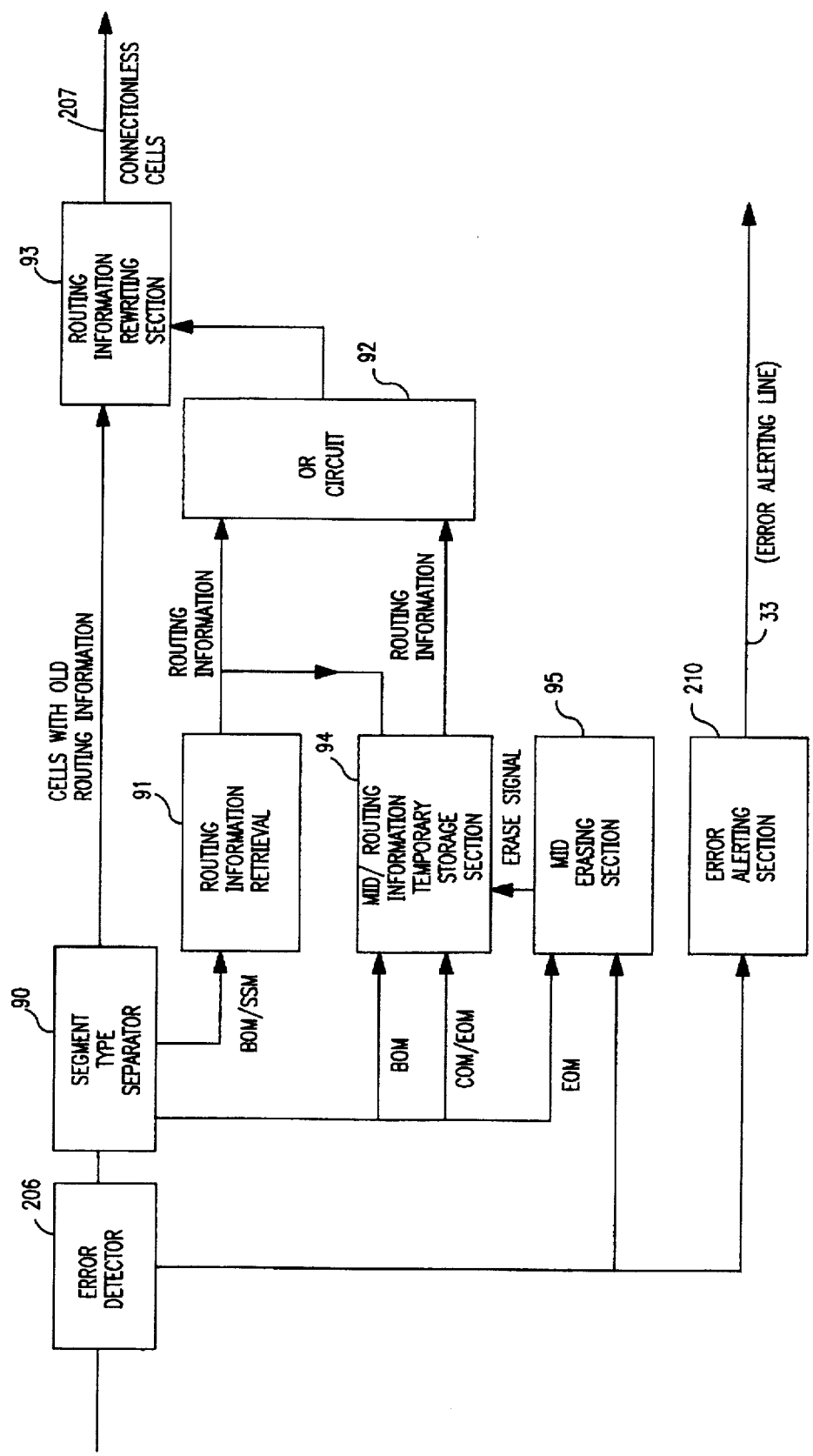
FIG. 54 is a block diagram of a first embodiment of the routing section of the eighth invention.

FIG. 54 illustrates a first example of the connectionless server inherent function section, that is, the routing section according to the eighth invention. The description of parts corresponding to those in FIG. 26 in the first invention will be omitted.

In this figure, the error detector 206 has a function of detecting data errors of connectionless cells (ATM cells). The detection of such errors can be made by monitoring the CRC bits of ATM cells.

Upon detecting an error, the error detector 206 alerts an error alerting section 210 to that an error has been detected. The error alerting section 210 is connected with the error detector 206b of the receiving server 205b by an error alerting line 208 which is different from a line 207 used to transfer connectionless cells.

When an error, such as a data failure, is detected in a COM cell in the transmitting server 205a, error information is presented to the error detector 210 of the transmitting-side error detector 205a. The error detector 206a then stops the transmission of cells following that COM cell. Further, the error detector 206a commands the MID erase section 95 to erase the MID stored in the MID/routing information temporary storage section 94.

The error alerting section 210 of the transmit-side server 205a alerts the receiving server 205b (having the same arrangement as that shown in FIG. 54) of the error detection through the error alerting line 208. In response to this, the error detector 206b in the receiving server 205b instructs the MID erase section 95 on its own side to erase the MID stored in the MID/routing information temporary storage section 94. According to this embodiment, as described above, upon detecting an error in a COM cell, the transmitting server 205a informs the receiving server 205b of the occurrence of an error over the error alerting line 208, so that the receiving MID erase section 95 erases the MID reserved so far and releases it.

In the event of the occurrence of an error on the transmit side, the receiving server 205b can also recognize the error and release the corresponding MID to perform subsequent processing.

Figure 55:
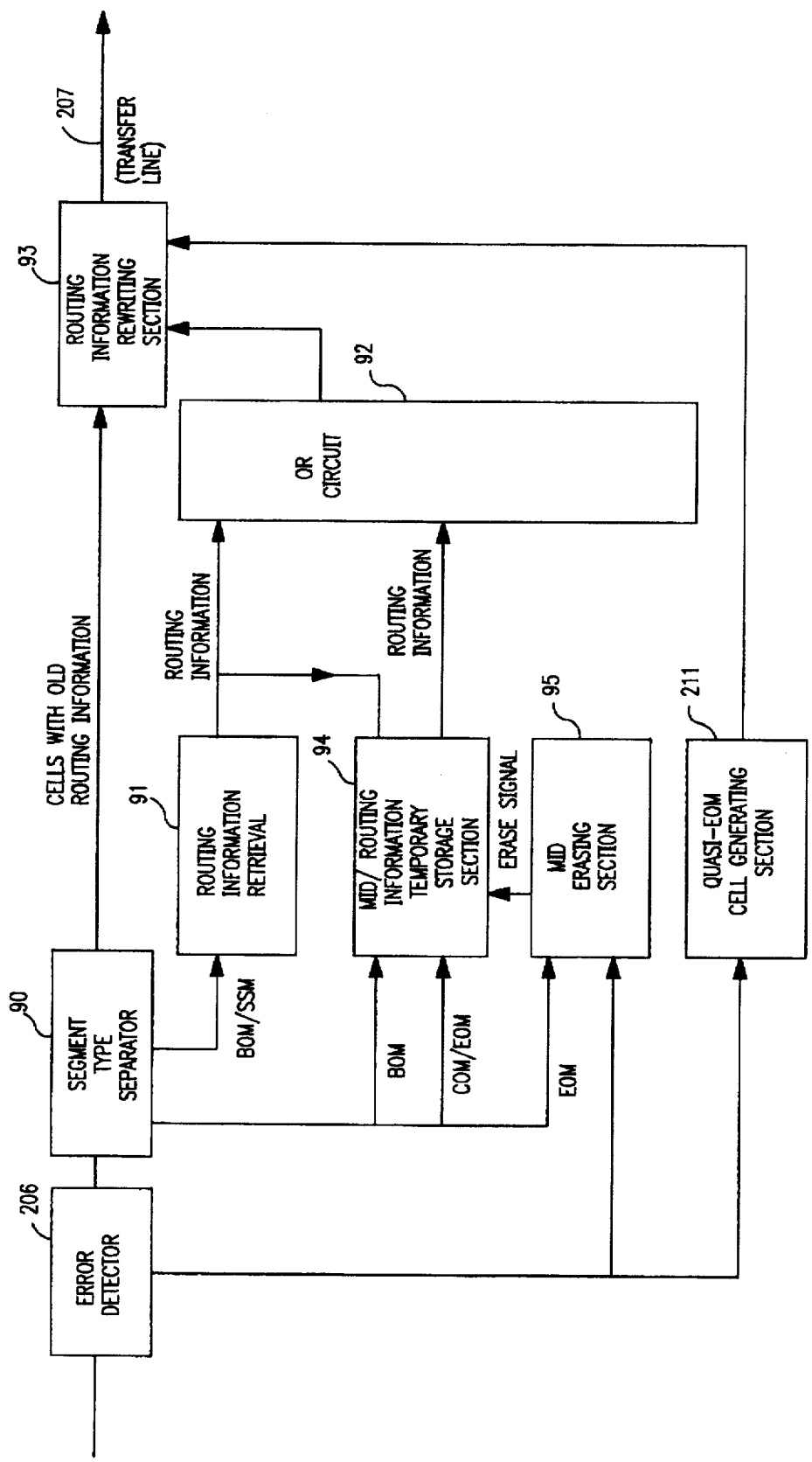
FIG. 55 is a block diagram of a second embodiment of the routing section.

FIG. 55 is a block diagram of a second embodiment of the connectionless server inherent function section of the eighth invention.

In this figure, that blocks which are denoted by the same reference characters as in FIG. 54 described previously have the same functions, and thus their description is omitted here.

In FIG. 55, a quasi-EOM cell generating section 211 is provided.

In this figure, when a COM cell error is detected in the error detector 206a in the transmitting server 205a, MIDs are erased by the MID erase section 95, and a quasi-EOM cell is generated by the quasi-EOM cell generating section 211. The quasi-EOM cell is sent to the receiving server 205b over the transfer path 207.

In the receiving server 205b having the same arrangement as in FIG. 55, the quasi-EOM cell is separated by the segment type separator 90 and then sent to the MID erase section 95, so that it is erased. The quasi-EOM cell can be identified by setting its reserve bit to a specific value (for example, one).

According to this embodiment, as described above, the MID on the receive side can be released by the quasi-EOM cell generated by the sending server. Thus, this embodiments eliminates the need of the error alerting line 208 that is needed in the first embodiment.

Figure 56:
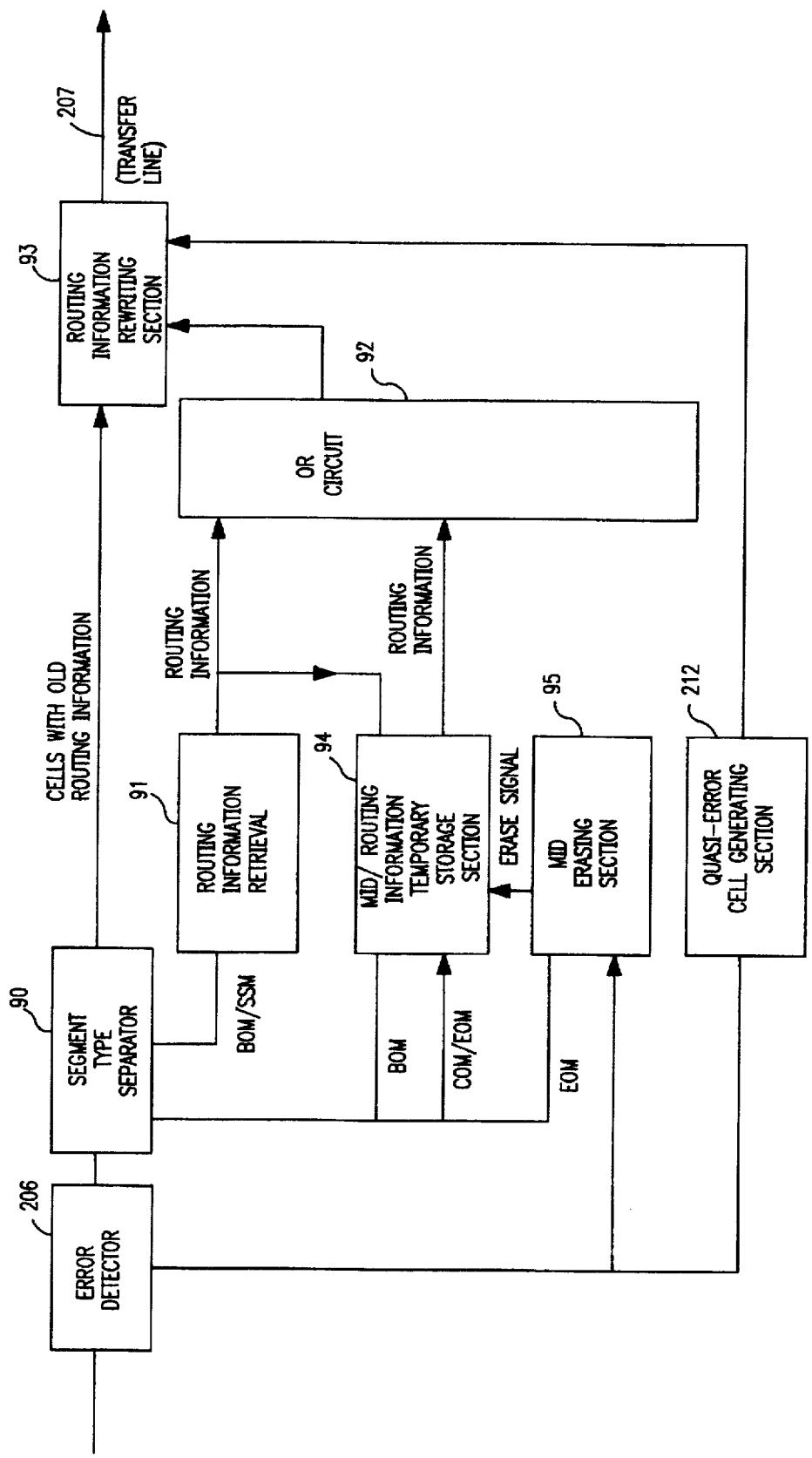
FIG. 56 is a block diagram of a third embodiment of the routing section.

FIG. 56 is a block diagram of a third embodiment of the connectionless server inherent function section.

As shown, the third embodiment is equipped with a quasi-error cell generating section 212, which, when a COM cell error is detected in the error detector 206a of the transmitting server 205a, generates a quasi-error cell in the COM cell format and sends it on the transfer path 207.

It is preferable that the quasi-error cell, which is in the COM cell format and has erroneous data artificially entered into CRC bits, can easily be identified as being in error on the receive side.

Upon receipt of the quasi-error cell, the error detector 206b in the receive-side server 205b will detect the presence of an error. And the MID erase section 95 will erase and release the MID.

In this way, the third embodiment, when the error detector 205a in the transmitting server 205a detects an error in a COM cell, replaces it with a quasi-error cell for transmission to the receive side.

The receiving server 205b detects the error by analyzing the quasi-error cell and then release the MID reserved by itself.

Figure 57:
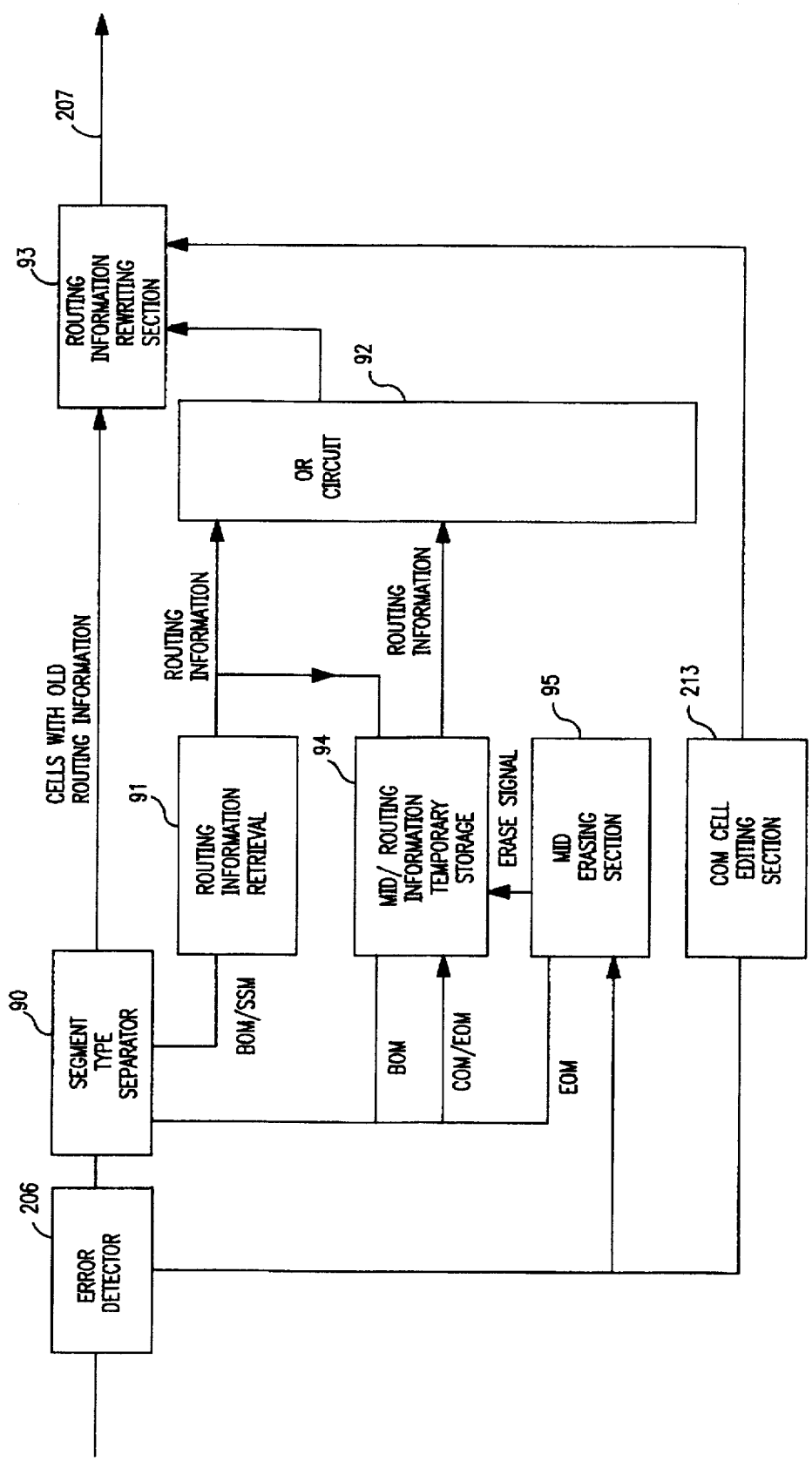
FIG. 57 is a block diagram of a fourth embodiment of the routing section.

FIG. 57 is a block diagram of a fourth embodiment of the connectionless server inherent function section.

The fourth embodiment is equipped, as shown, with a COM cell editing section 213 which places error information from the error detector 206 in a COM cell.

When a COM cell error is detected by the transmitting-side error detector 206a, the COM cell that developed an error is rejected, and a new COM cell in which error information is placed is generated by the COM cell editing section 213. The COM cell can be identified by flagging its reserve bit or specific bit bound for the MID storage.

The COM cell generated by the COM cell editing section 213 is sent on the transfer path 207.

Upon receipt of the error information containing COM cell, the receiving-side error detector 206b analyzes the contents of that COM cell and then alerts the MID erase section 95. The error detector 206 instructs the MID/routing information temporary storage section 94 to release the MID reserved so far.

The third and fourth embodiments are distinct from each other as follows: in the third invention, a quasi-error cell is generated for transmission over the transfer path 207, while, in the fourth embodiment, error information is placed in a COM cell and transmitted over the transmission path 207.

Thus, the receiving server 205b analyzes that COM cell to identify the error information and release the reserved MID.

Next, a ninth invention which is equipped with an error processing section in a server will be described in connection with the arrangement and operation of the error processing section that makes the ninth invention distinct from the other inventions.

Figure 58:
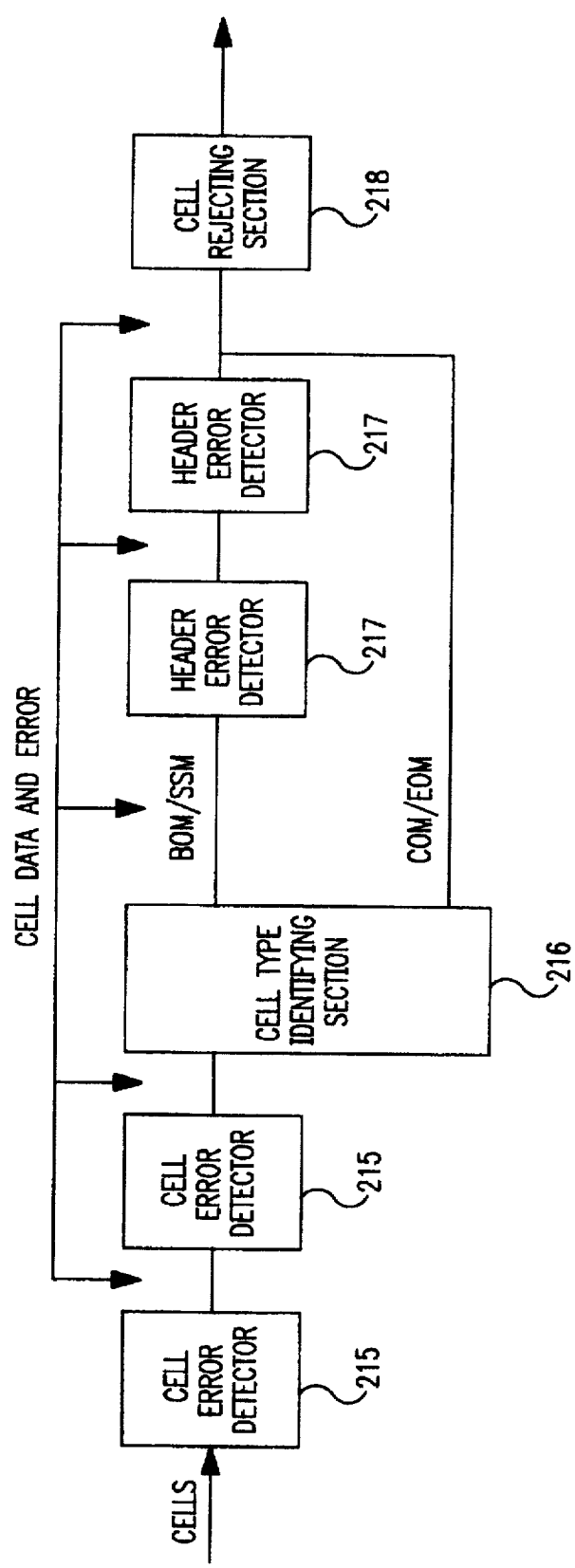
FIG. 58 is a block diagram of a first embodiment of the error processing section.

FIG. 58 is a block diagram of a first embodiment of the error processing section of the ninth invention. The error processing section is constructed, as shown, from two cell error detectors 215 connected in series, a segment type identifying section 216, two header error detectors 217 which are responsive to the result of identification by the segment type identifying section 216 to detect a message-level header error from a cell in which BOM or SSM is placed as a segment type, and a cell rejecting section 218 which rejects a cell-error or header-error detected cell. The provision of two detectors for each of cell error and header error is intended to detect two types of errors for each of cell error and header error; however the number of detectors is not limited to two.

Figure 59:
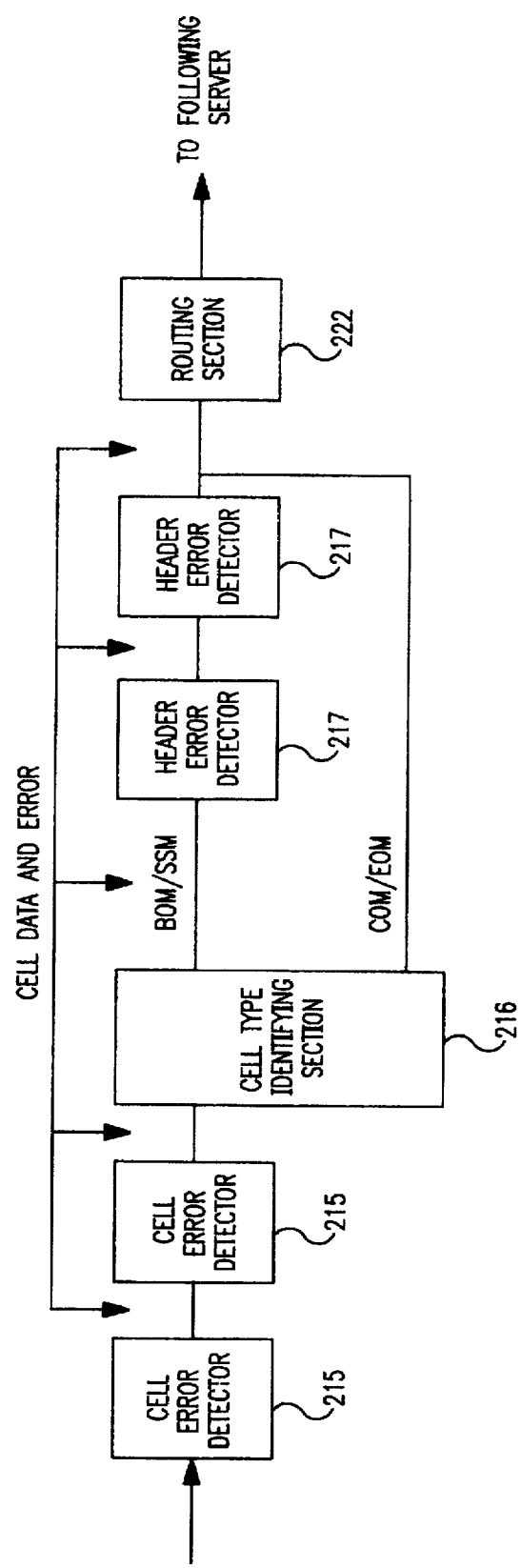
FIG. 59 is a block diagram of a second embodiment of the error processing section.

FIG. 59 is a block diagram of a second embodiment of the error processing section. FIG. 59 is distinct from FIG. 58 only in that a routing section 218 is provided in place of the cell rejecting section 218 which rejects a cell-error or header-error detected cell. In the second embodiment, when a cell error or header error is detected, the result is sent to a cell-routing controlling routing section (connectionless server inherent function section) where, when the leading cell, or the BOM cell, is in error, all the cells having the same message identifier MID as the BOM cell will be rejected by not creating the VCI-to-MID correspondence table used at the time of outputting of cells, that is, the table 116 described in connection with FIG. 34.

Figure 60:
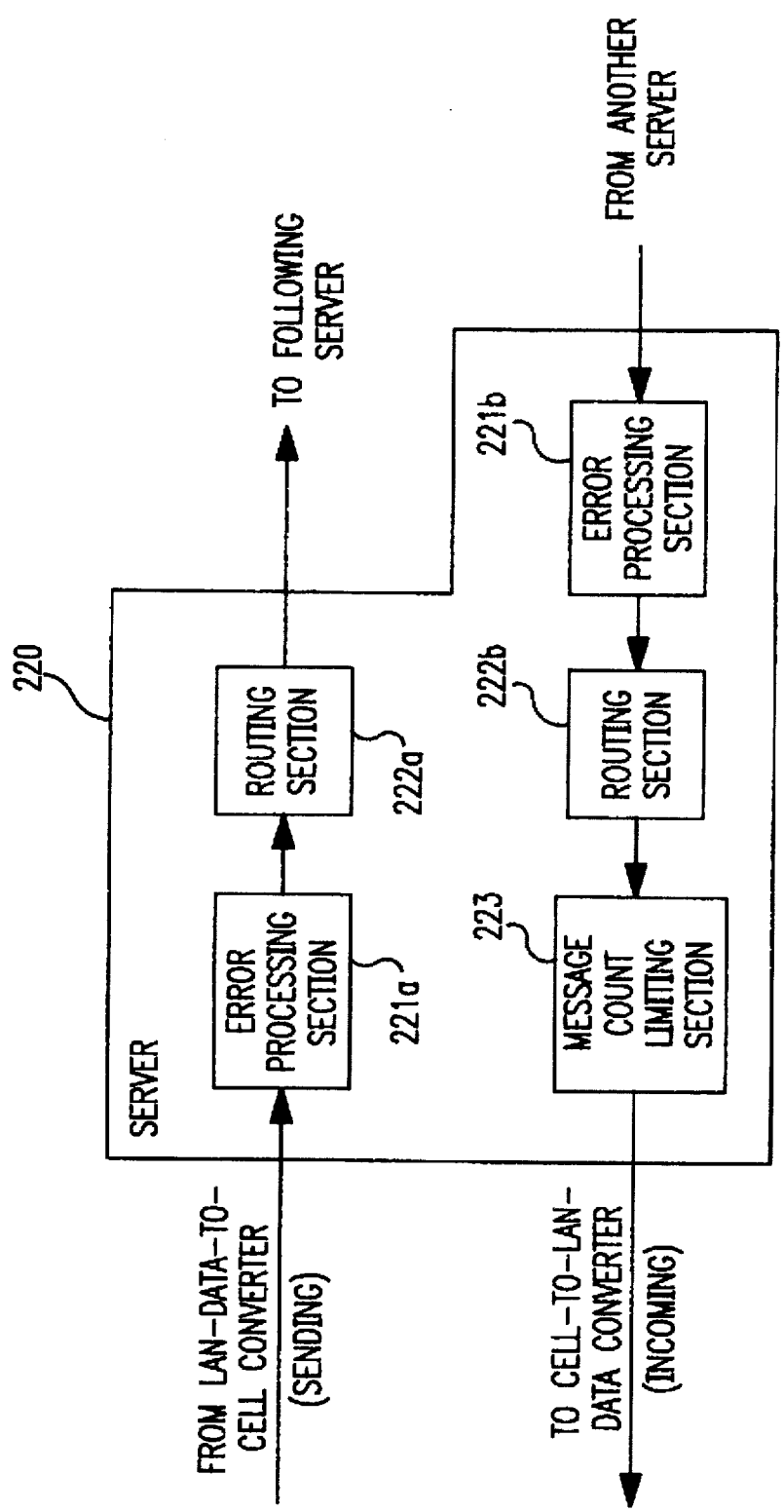
FIG. 60 is a block diagram of a server according to a ninth invention.

FIG. 60 is a block diagram of a server according to the ninth invention. In this figurer the server 220 is constructed from an error processing section 221a and a routing section 222a which are connected to receive cells from a LAN-data-to-cell conversion section and send cells to another server, an error processing section 221b, a routing section 222b, and a number-of-messages-to-be-transmitted limiting section 223 which are connected to receive cells from an ATM network, that is, another server. Cells output from the number-of-messages-to-be-transmitted limiting section 223 are output to a receive-side cell-to-LAN-data conversion section. The number-of-messages-to-be-transmitted limiting section 223 limits the number of messages to be transmitted in the receive-side server, which was described in connection with the seventh invention.

Figure 61:
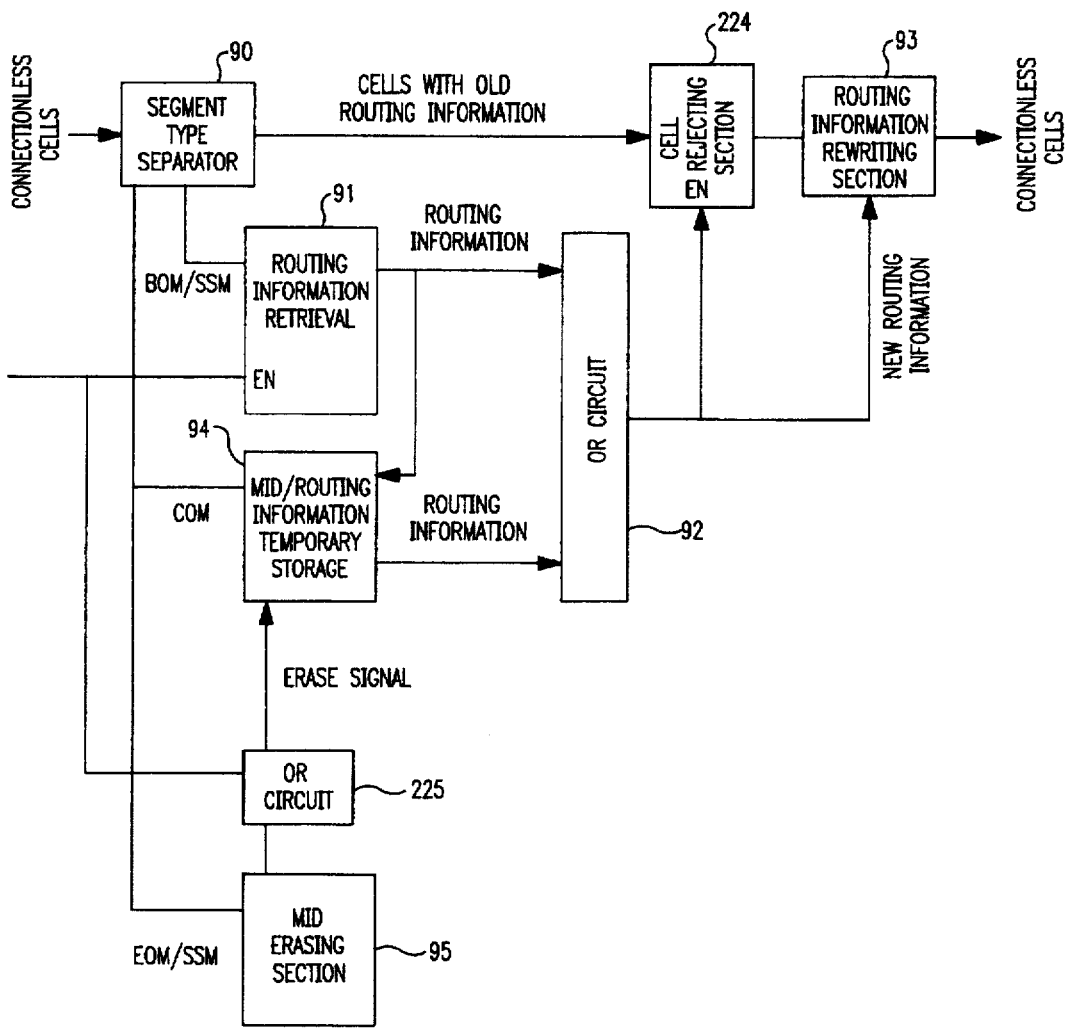
FIG. 61 is a block diagram of the routing section.

FIG. 61 is a block diagram of the routing section in the ninth invention. FIG. 61, which is similar to FIG. 26 illustrating the routing section of the first invention, is distinct from FIG. 26 in that a cell rejecting section 224 which rejects cells that have the same MID as a BOM cell for which an error detect signal is input from the error processing section in FIG. 59 and cannot acquire new routing information, and an OR circuit 225 which is supplied with the error detect signal as an error flag as will be described later. The OR circuit 225 is also supplied with an output of the MID erase section 95. The OR circuit is responsive to the error flag or the output of the MID erase section 95 to output an erase signal to the MID/routing information temporary storage section 94, thereby erasing routing information.

Figure 62:
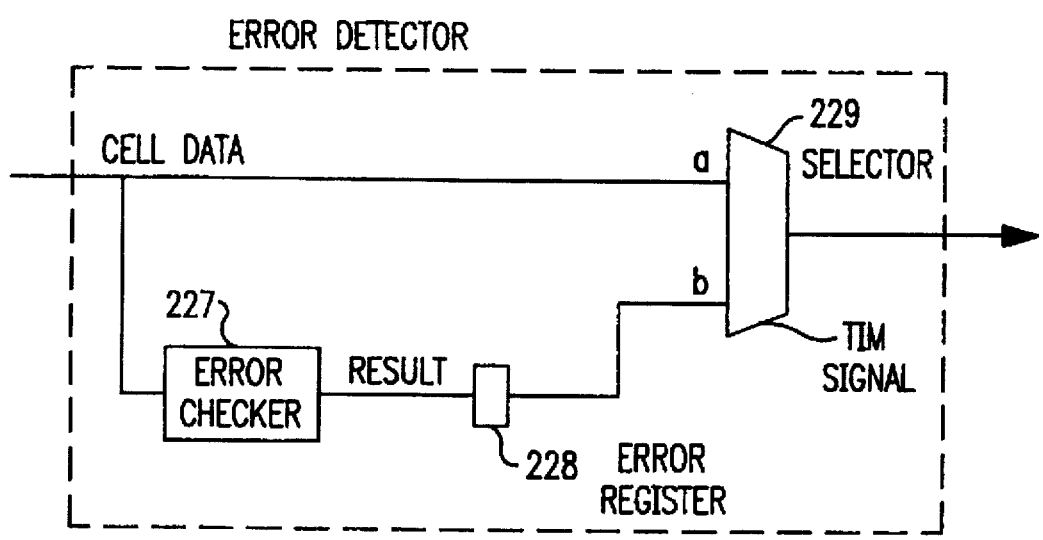
FIG. 62 is a block diagram of an error detecting section.

FIG. 62 is a block diagram of an error detecting section which corresponds to either the cell error detecting section 215 or the header error detecting section 217 in FIG. 58. The error detecting section places the result of error detection in a predetermined bit position of the cell immediately following an error-detected cell for transmission to the cell rejecting section 218. This eliminates a need of a signal line called an error flag line, as described later, which is different from a signal line for transmission of cell data.

In FIG. 62, 229 denotes a selector which is responsive to a timing (TIM) signal to permit an input signal b to pass only during a specific time slot within one cell and an input signal a to pass during the other time slots. Reference character 227 denotes an error checking section which checks cell data for a specific cell error. Reference character 228 denotes an error register the content of which is updated at the completion of the check of each cell.

In this circuit, the error check 227 drops only necessary data from cell data for testing. The result is written into the error register 228. The selector 229, which selects the b input only during a specific time slot, permits the content of the error register 228 to be placed in cell data.

Figure 63:
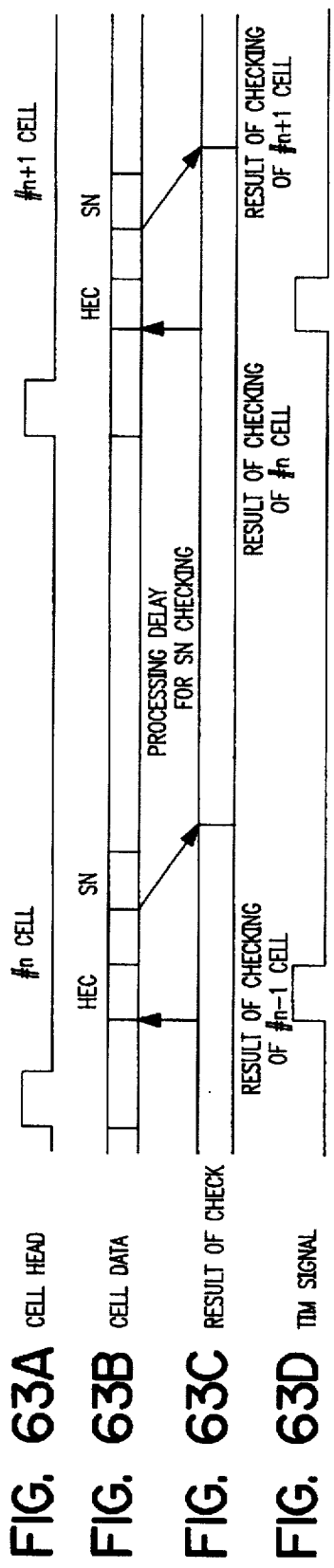
FIG. 63 is a timing diagram for use in explanation of the operation of the error detecting section of FIG. 62.

FIG. 63 is a timing diagram illustrating the operation of the error detecting section of FIG. 62. This timing diagram corresponds to the case where a check is made for verification of the normality of the sequence number SN of cells, and the check result is written into the HEC area of the following cell. (a) indicates the head of a cell, (b) indicates cell data, (c) indicates the check results, and (d) indicates the timing signal.

Into the HEC area of the #n cell is written the result of the SN check for the preceding #n−1 cell. The SN check for the #n cell is made by the error checking section 227 when it is flowing. The result of the SN check, which is output delayed by checking, is written into the error register 228 and then written into the HEC area of the following #n+1 cell.

Figure 64:
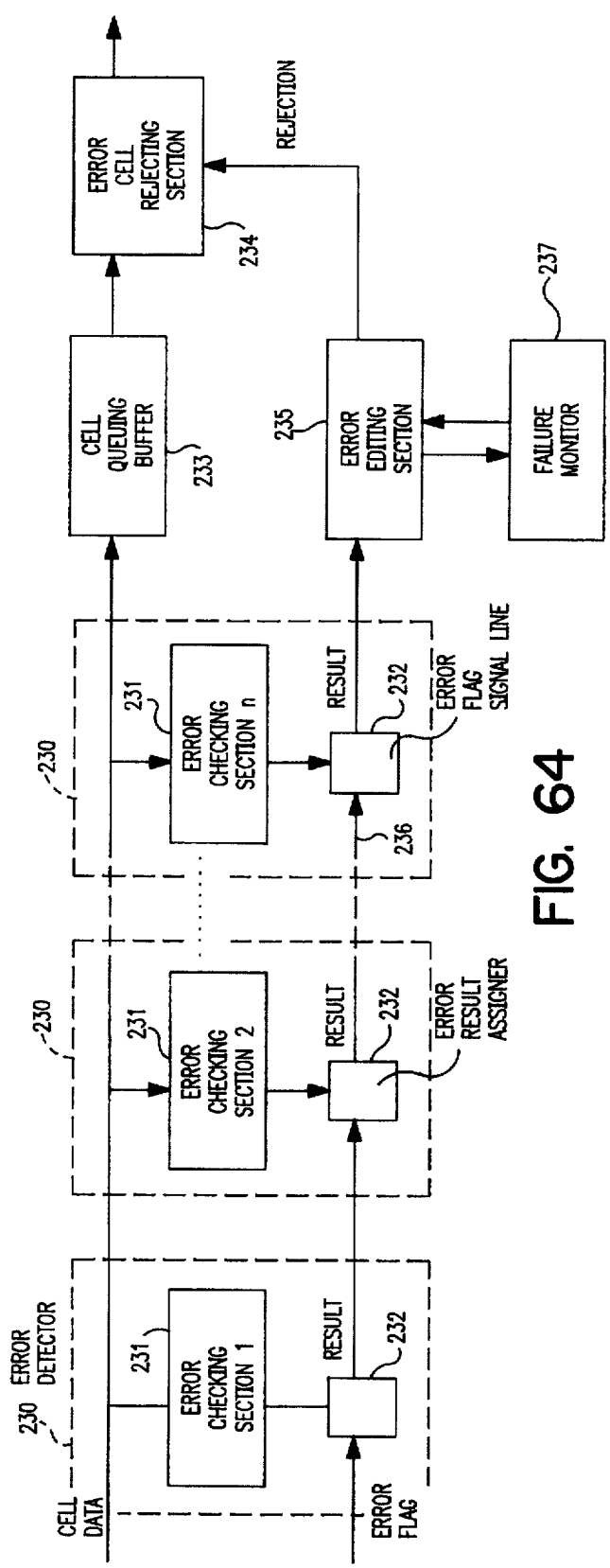
FIG. 64 is a block diagram of the other embodiment of the error processing section.

FIG. 64 is a block diagram of the other embodiment of the error processing section. This embodiment is equipped with an error flag line 236 for storing an error flag in addition to the cell data line. In this figure, 230 denotes an error detecting section which comprises an error checking section 231 and an error result adding section 232. The error flag is synchronized with cell data and indicates the content of an error of a cell by a bit position from the head of that cell. The output of the last error result adding section 232 is input to an error editing section 235. The circuit thus configured operates as follows.

Each of the error checking sections 231, when supplied with cell data, checks cells for normality and alerts the corresponding error result adding section 232 of the check result. In this case, for example, a 0 is presented to the section 232 when the check result is "OK", and a 1 is presented when the result is "NO GOOD".

Figure 65:
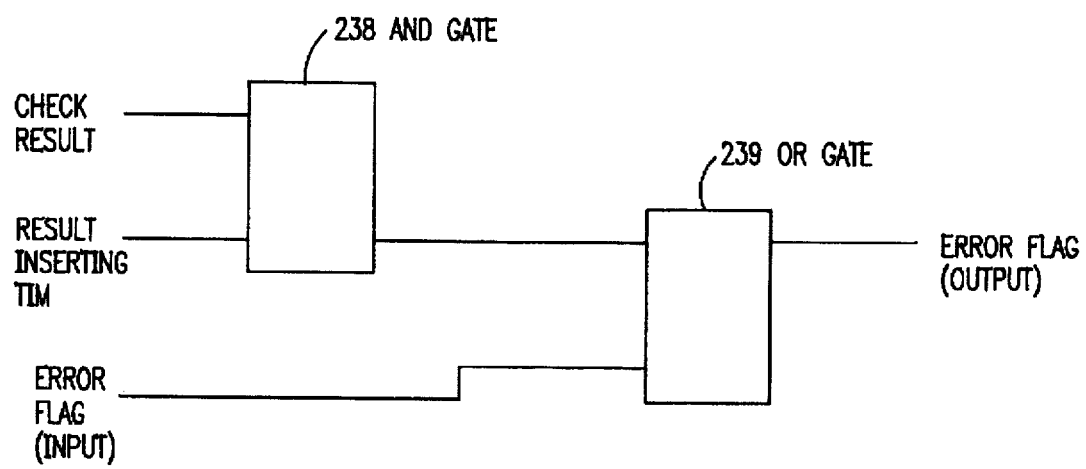
FIG. 65 is a block diagram of the error result placing section.

FIG. 65 illustrates a specific arrangement of the error result adding section 232. The section 232 comprises an AND gate 238 and an OR gate 239. The AND gate 238 is supplied with the check result and a timing signal for defining the timing of the inserting of the check result. The OR gate 239 is supplied with the output of the AND gate 238 and an error flag. The output of the OR gate 239 provides an error flag for the succeeding stage.

The error result adding section 232 places the result of error check by the corresponding error checking section in a predetermined bit position of the error flag. This can be implemented by providing the logical product of the check result and the timing signal by the AND gate 238 and the logical sum of the resultant logical product and the error flag by the OR gate 239.

Thus, the error check result at each stage is added to a predetermined bit position of the error flag. In the last-stage error result adding section 232 all the error check results are stored. The error editing section 235 is responsive to these error check results to determine whether or not such an error as to reject cells has occurred. If such an error has occurred, the error editing section 235 will perform processing such as cell rejection.

Figure 66:
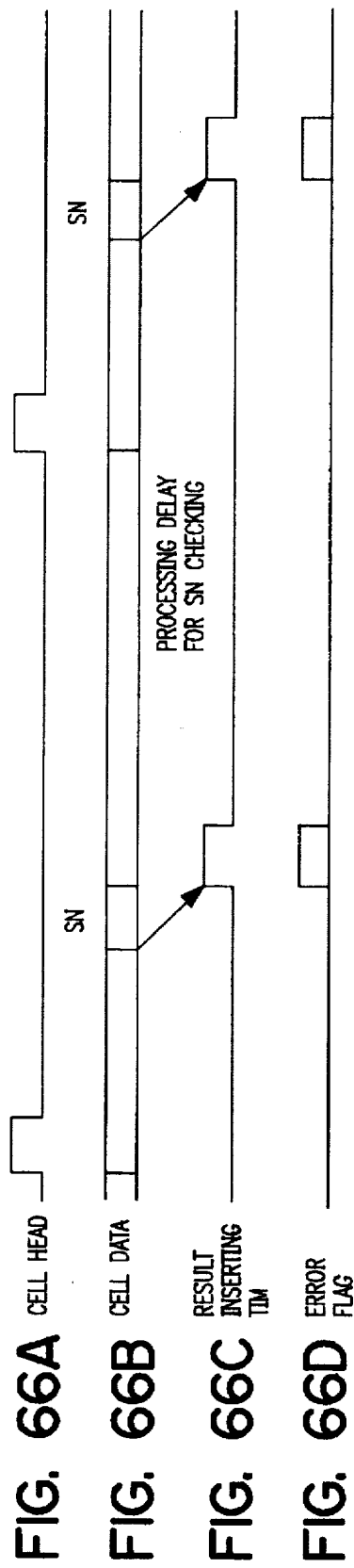
FIG. 66 is a timing diagram for use in explanation of the operation of the error detecting section of FIG. 64.

FIG. 66 is a timing diagram illustrating the operation of the error detecting section 230 shown in FIG. 64. This timing diagram indicates the operation of verification of the normality of the cell sequence number SN. (a) indicates the head of a cell, (b) indicates cell data, (c) indicates a timing signal, and (d) indicates an error flag.

When the presence of an SN error is detected by the error checking section 231, the result is subjected to delay for SN checking as shown in (c) and then written into a specific position of the error flag as shown in (d).

Figure 67:
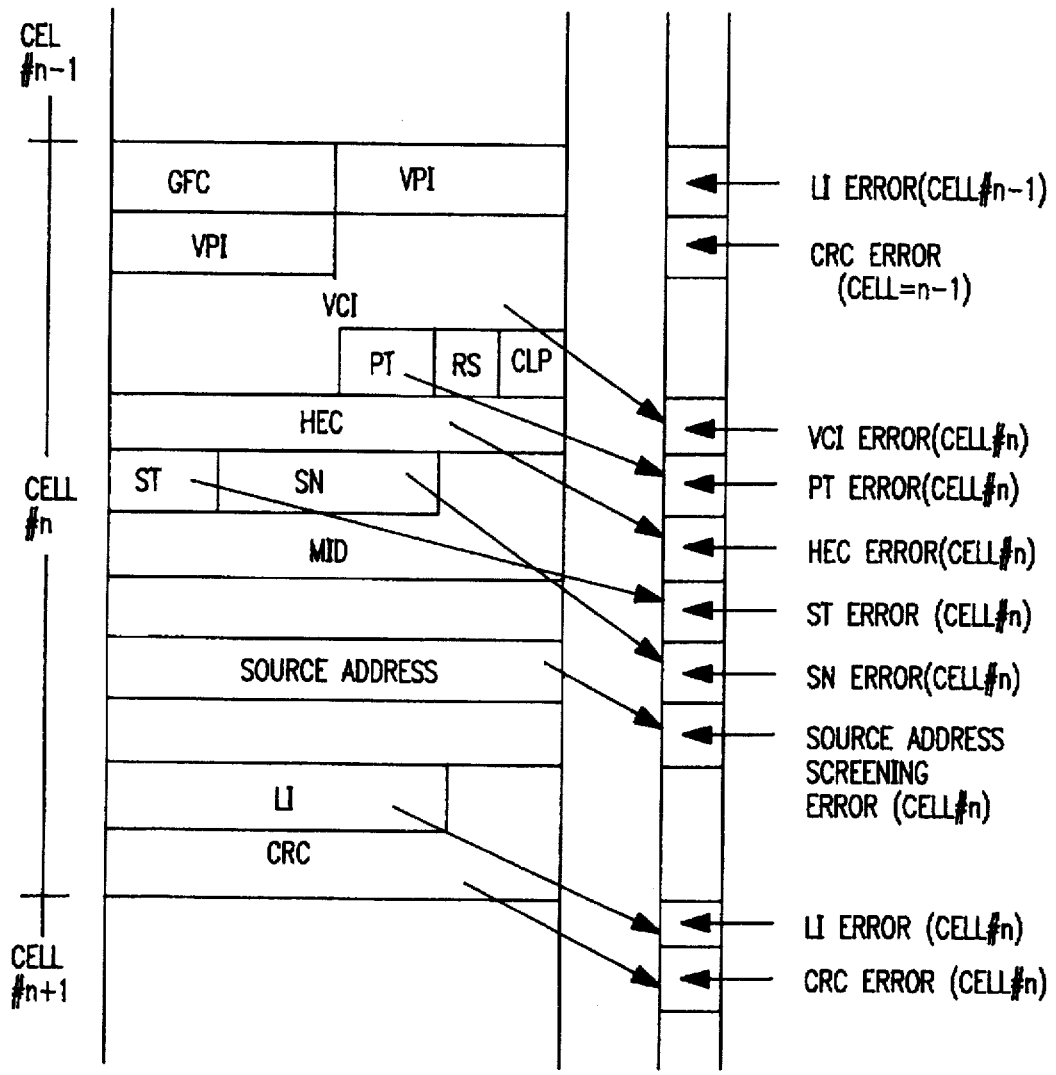
FIG. 67 illustrates one example of error flags.

FIG. 67 illustrates one example of an error flag obtained by the embodiment of FIG. 64. Here, cell data is indicated in the image of 8-bit parallel processing.

Figure 68:
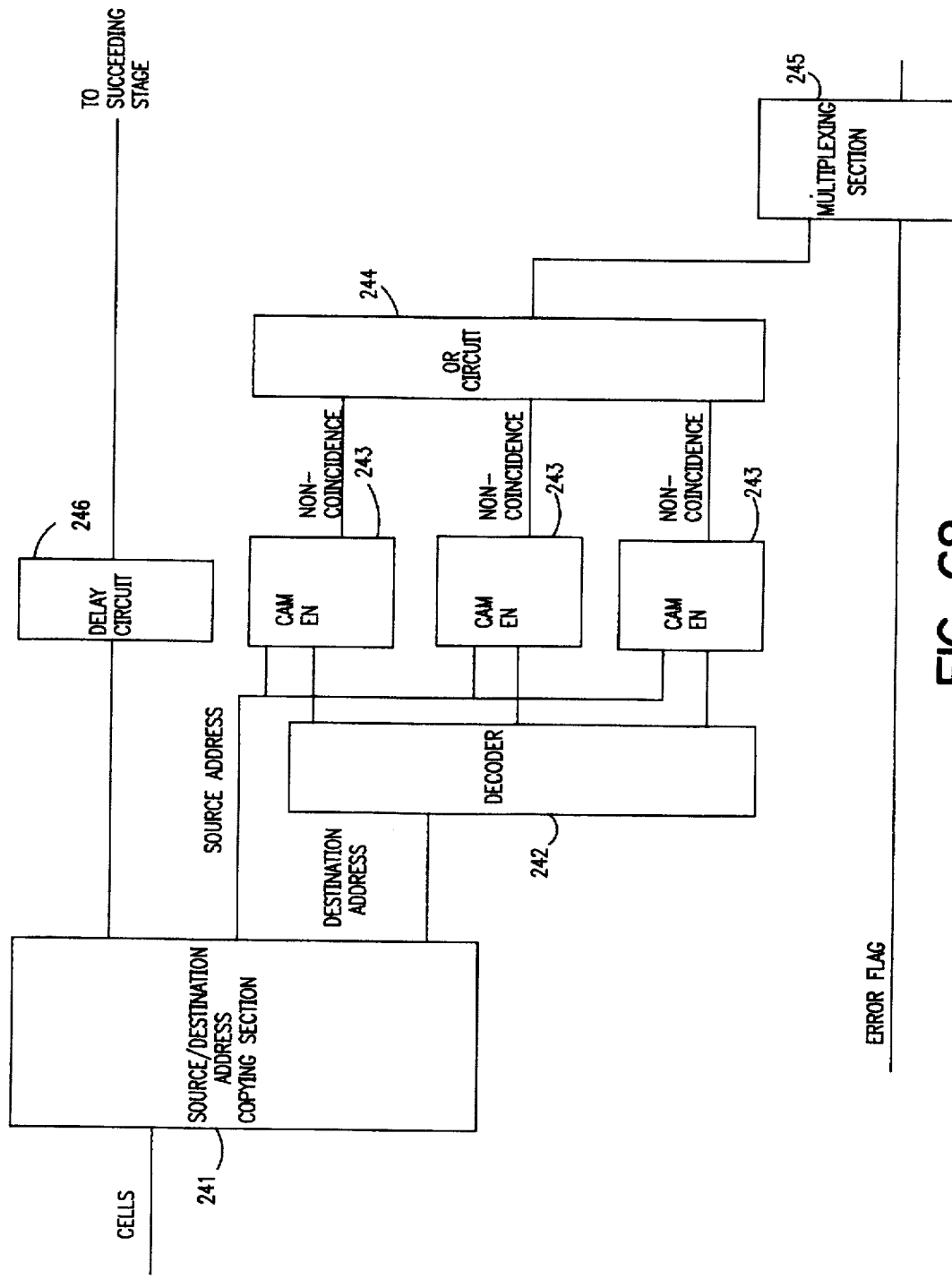
FIG. 68 is a block diagram of an outgoing address cleaning section.

FIG. 68 is a block diagram of a source address screening section serving as the header error detecting section 217 of FIGS. 58 and 59. This section, which is installed in the error processing section of a receive-side server, checks whether or not the source address indicating the sender of incoming cells corresponds to the destination address of a subscriber under that server.

In FIG. 68, the source address and the destination address are copied from incoming cells by a source/destination address copying section 241. The destination address is entered into a decoder 242, while the source address is applied to content addressable memories (CAM) 243. The decode circuit 242 outputs an enable signal to a CAM corresponding to the destination address, that is, the subscriber. The enabled CAM 243 checks whether or not the source address has been registered as a data source to the destination address, that is, the receiving subscriber. If not, the CAM outputs a non-coincidence signal to an OR circuit 244. The OR circuit 244 outputs a non-coincidence signal from any of the CAMs 243 to a multiplexing section 245, which multiplexes and outputs the results on the error flag line. A delay circuit 246 delays incoming cells a period of time required for the above processing, thereby keeping the flag on the error flag signal line and the cells in time coincidence.

Figure 69:
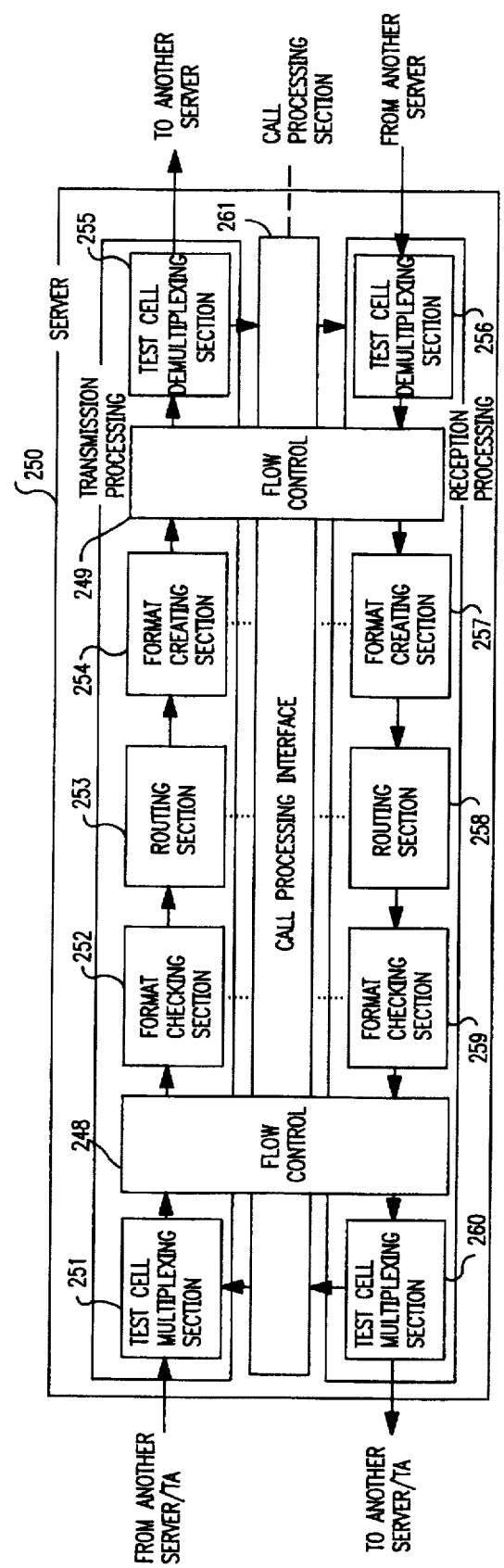
FIG. 69 is a block diagram of a server according to a ninth invention.

FIG. 69 is a block diagram of a server according to a ninth invention. In this figure, the server 250 is constructed from a flow control section 248, 249 for controlling the flow of cells, a test cell multiplexing section 251 for multiplexing test cells for verifying the normality of internal processing with incoming cells from another server or a TA, a format checking section 252 for making a message-level or cell-level format check using the output of the test cell multiplexing section 251, a routing section 253 for translation between a destination address and a VCI, management of outgoing MIDs, translation between a VCI and an MID, and group address copying, a format creating section 254 for creating a message format and a cell format, and a test cell separating section 255 for separating test cells from the output of the format creating section 255, the sections described so far, except the flow control section 248, being adapted for transmission processing, and, for reception processing, a test cell multiplexing section 256 for multiplexing test cells with incoming cells from another server, a format checking section 257, a routing section 258, a format creating section 259, a test cell separating section 260, and a call processing interface 261 serving as an interface with a call processing section for controlling the entire server.

Figure 70A:
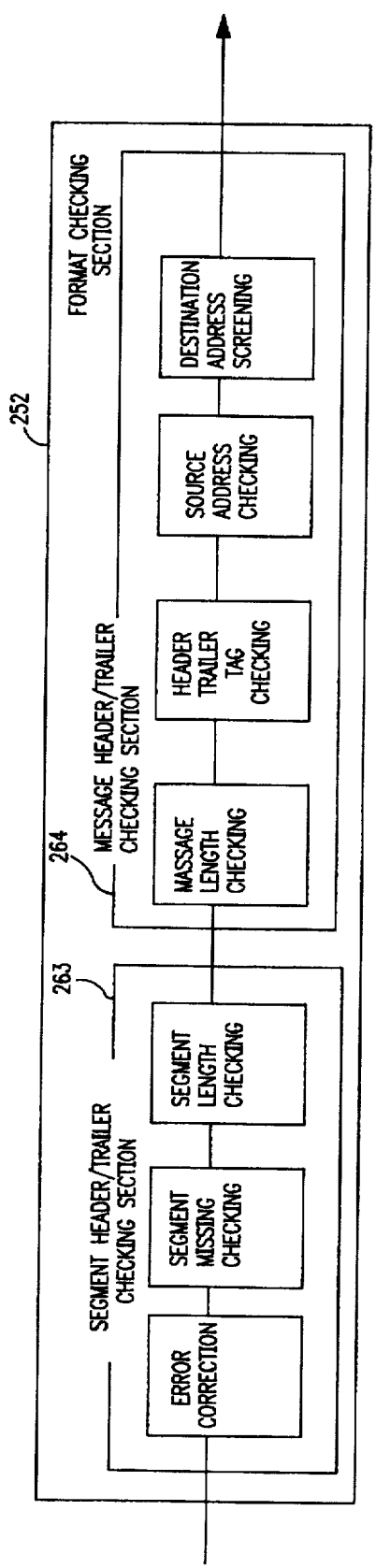
FIG. 70 is a block diagram of the format checking section and the format generating section.

FIG. 70 is a block diagram of the format checking section and the format creating section in FIG. 69. More specifically, FIG. 70(a) is a block diagram of the format checking section 252 for transmission processing, which is constructed from a segment header/trailer checking section 263 and a message header/trailer checking section 264. The segment header/trailer checking section 263 makes error corrections and checks the missing and the information length of segments. The message header/trailer checking section 264 checks the information length of messages, the tag of headers/trailers, and the source addresses, and performs screening of destination addresses.

Figure 70B:
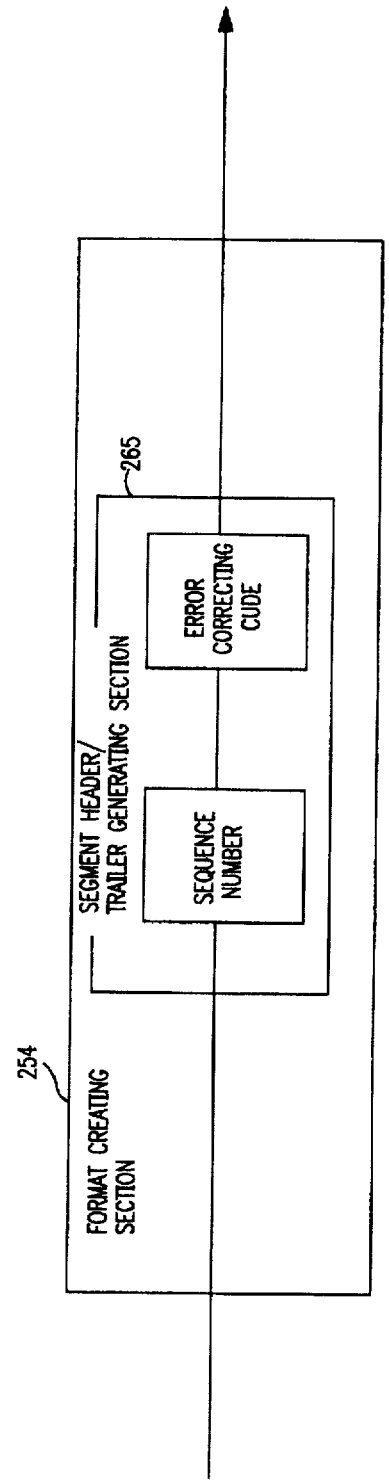

FIG. 70(b) is a block diagram of the format creating section 254 for transmission processing. In this figure, the format creating section is equipped with a segment header/trailer creating section 265, which assigns sequence numbers and error corrective codes.

Figure 71:
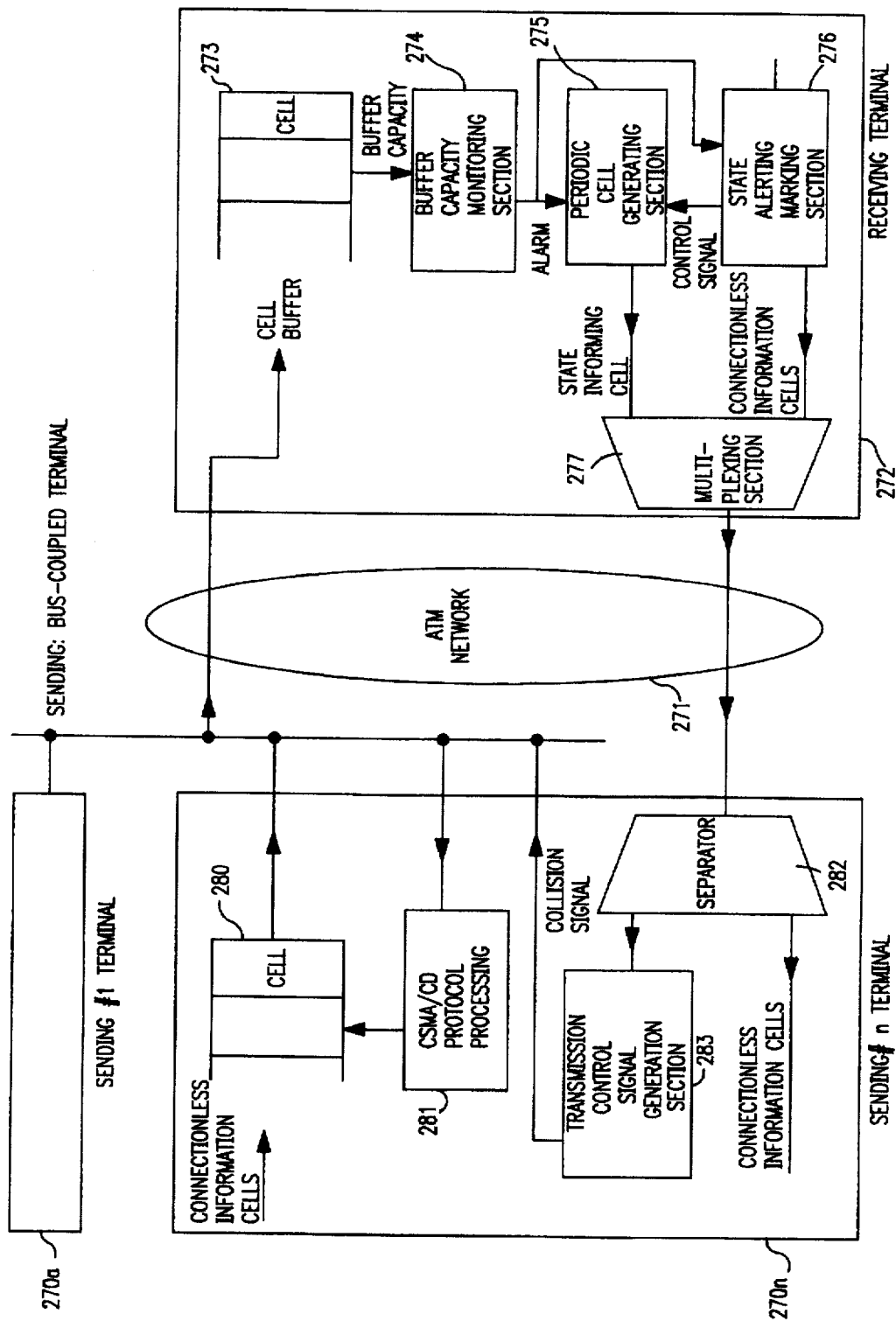
FIG. 71 is a block diagram illustrating the whole of a connectionless communication system according to a tenth invention.

FIG. 71 is a block diagram of the whole of a connectionless communication system according to a tenth invention. In the tenth invention, suppose that the carrier sense multiple access with collision detection (CSMA/CD) protocol is used when LAN information, or a variable-length message, is sent from one of bus-coupled terminals onto a bus.

The CSMA/CD protocol is an access method which was standardized first by the IEEE and then accepted as international standards. According to this access method, a LAN terminal sends LAN information onto a bus after detecting its nonbusy condition, but, when two or more LAN terminals transmit LAN information at the same time, a collision on the bus is detected and thus the LAN terminals make the transmitted LAN information invalid to repeat the information transmit operation from the beginning.

In FIG. 71, sending terminals 270a to 270n are coupled by a bus that is connected to a receiving terminal 272 through an ATM network 271. Although only one receiving terminal is illustrated, it may be one of bus-coupled terminals.

The receiving terminal 272 is equipped with a cell buffer 273 for storing incoming cells, a buffer capacity monitoring section 274 for monitoring the storage capacity of the cell buffer, a periodic cell generating section 275 for generating state informing cells used to periodically alert the sending terminals to the busy state at the receive side, a state alerting marking section 276 for placing a mark used to alert the sending terminals to the state in connectionless information cells, and a multiplexing section 277 for multiplexing either the state alerting cells from the periodic cell generating section 275 or the connectionless information cells from the state alerting marking section 276. The sending terminal 270n is equipped with a cell buffer 280 for sending connectionless information cells, a CSMA/CD (carrier sense multiple access with collision detection) protocol processing section 281 for controlling the transmission of cells from the cell buffer, a separator 282 which, when receiving state-informing connectionless information cells from the receiving terminal, separate them into the state alerting section and the connectionless information cells, and a transmission control signal generating section 283 which, when alerted to the busy state at the receiving station, sends a collision signal onto the outgoing bus.

Figure 7:
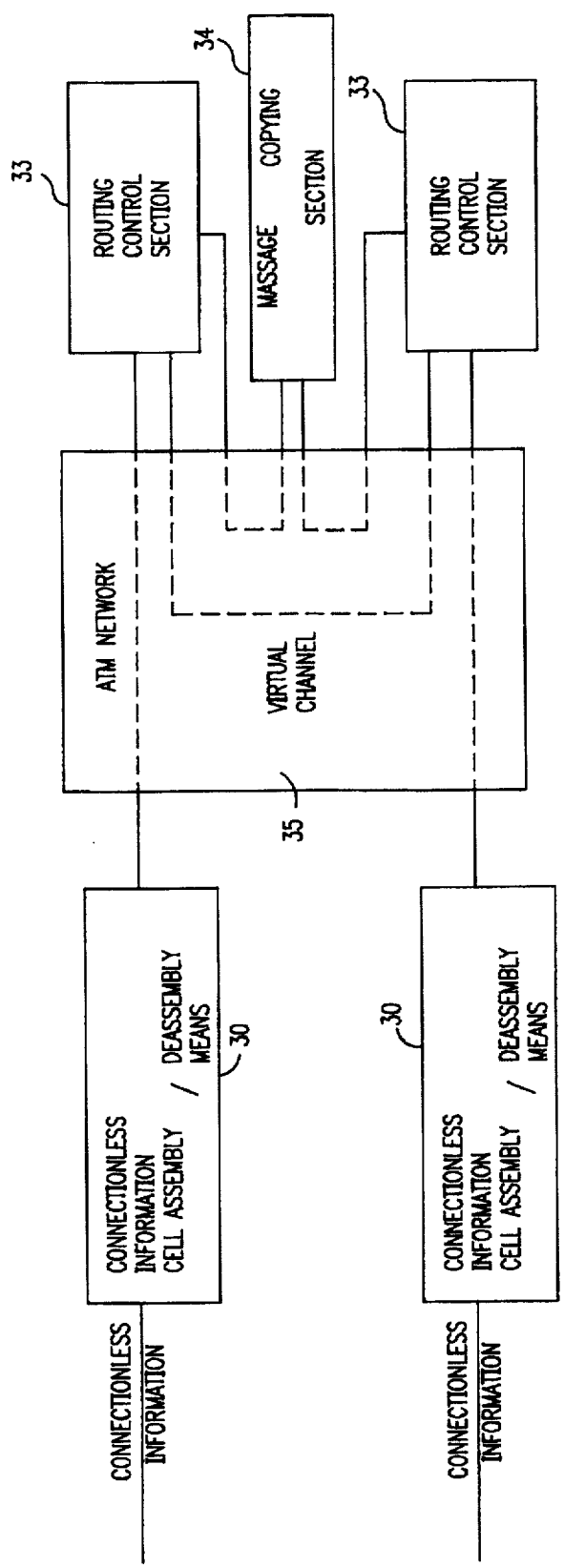
FIG. 7 is a basic block diagram of a third invention.
Figure 8:
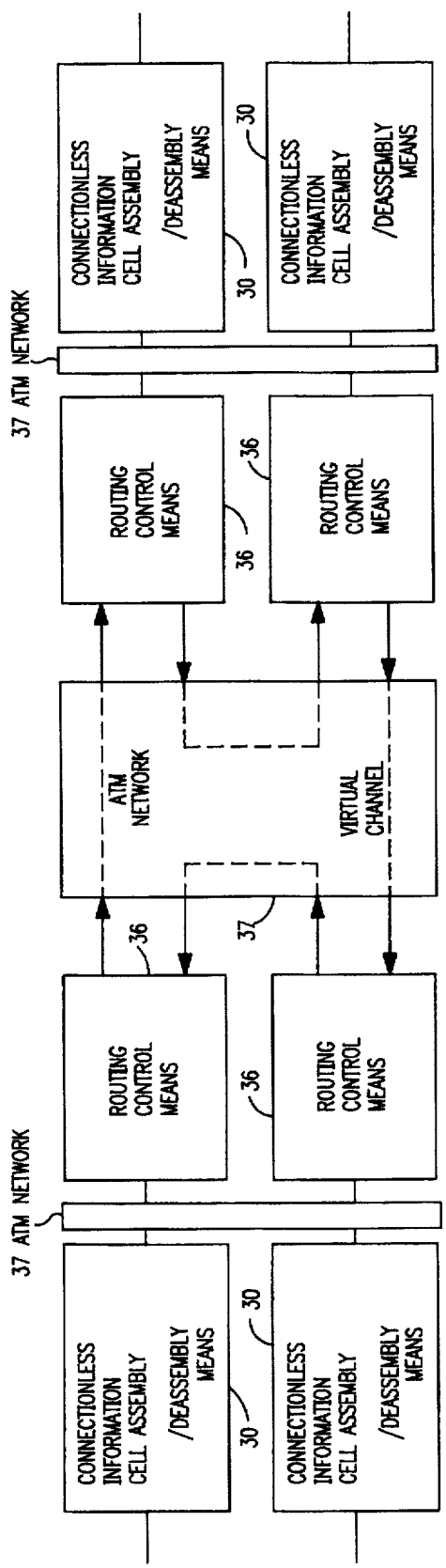
FIG. 8 is a basic block diagram of a fourth invention.
Figure 9:
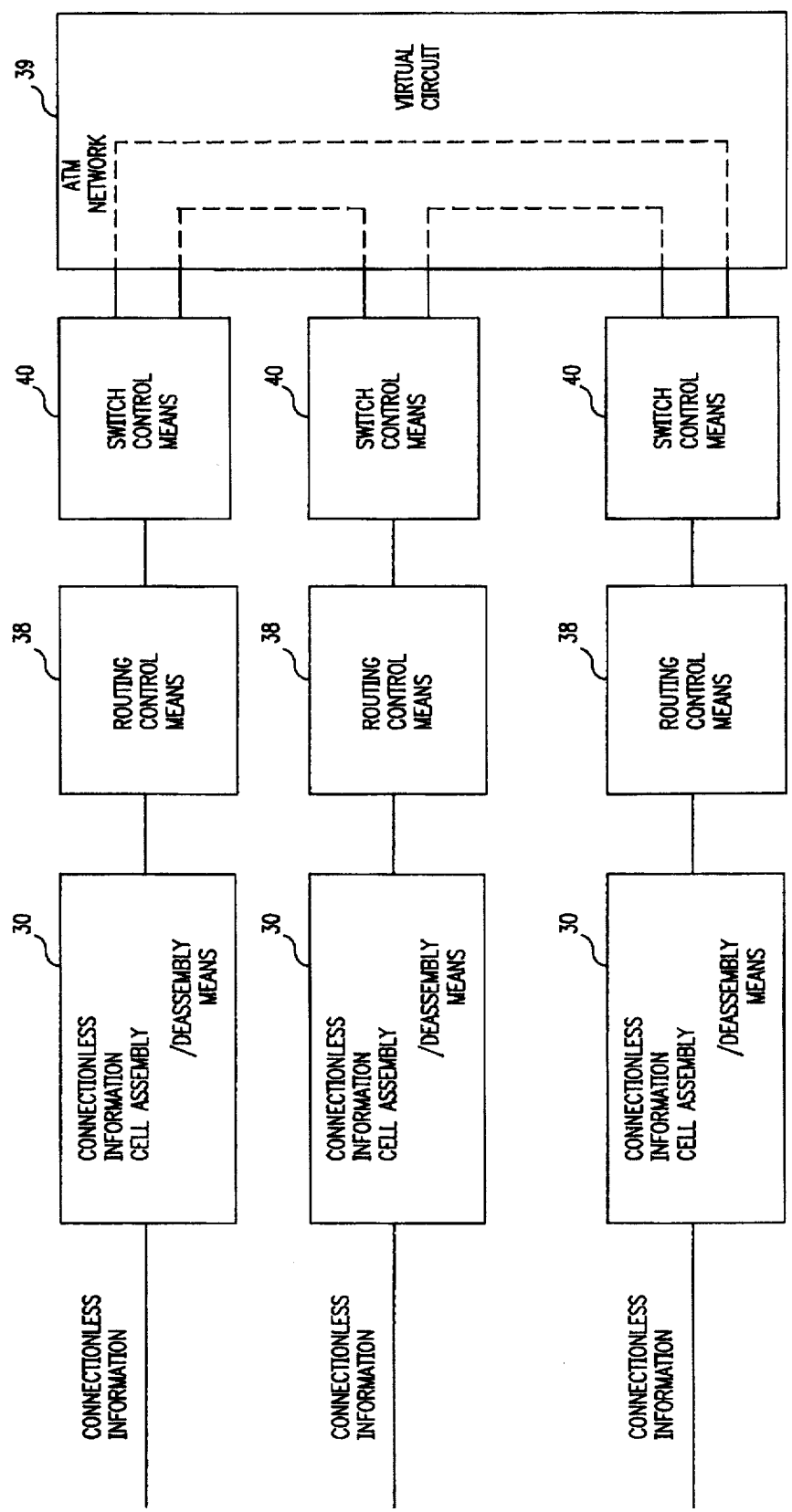
FIG. 9 is a basic block diagram of a sixth invention.
Figure 10:
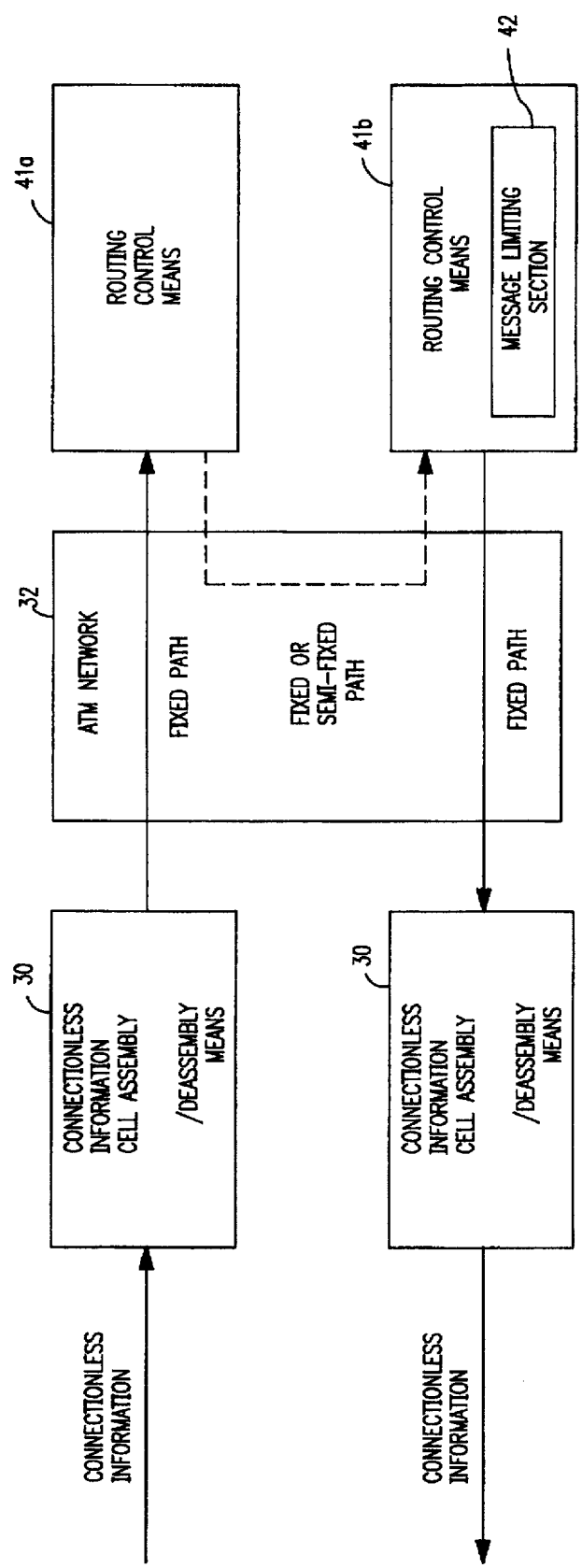
FIG. 10 is a basic block diagram of a seventh invention.
Figure 11:
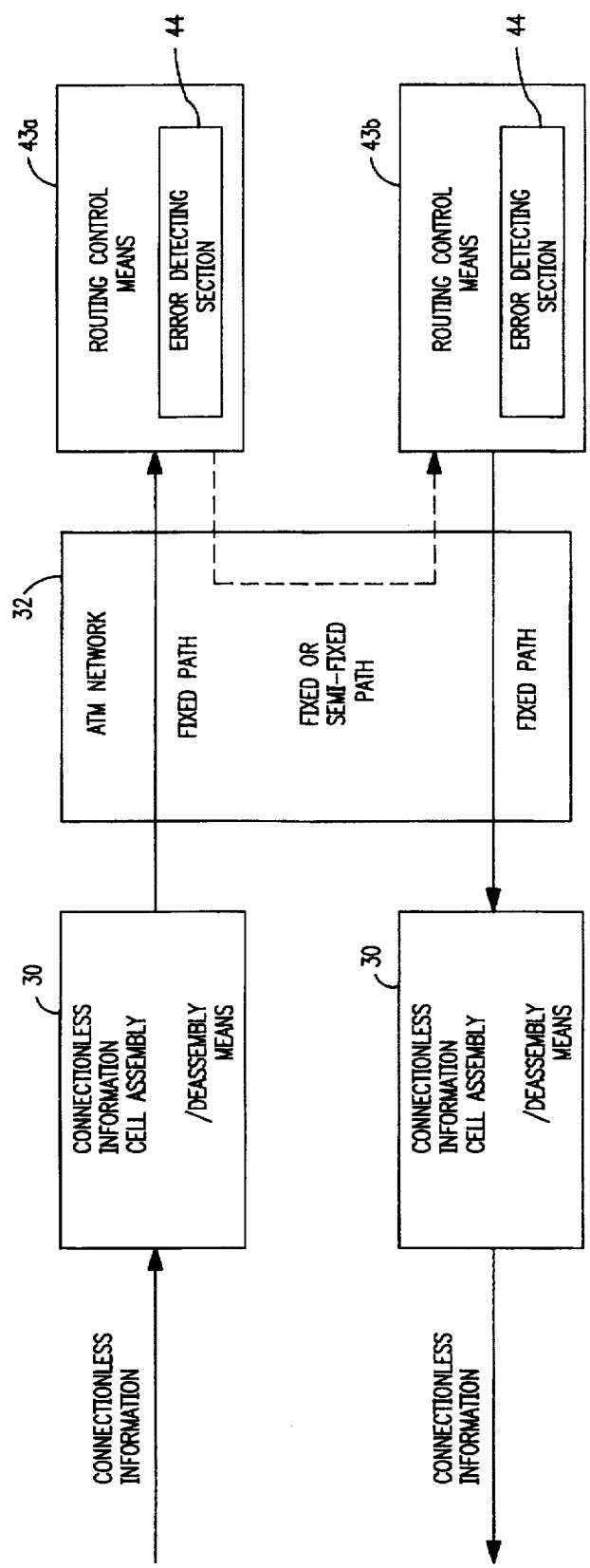
FIG. 11 is a basic block diagram of an eighth invention.
Figure 12:
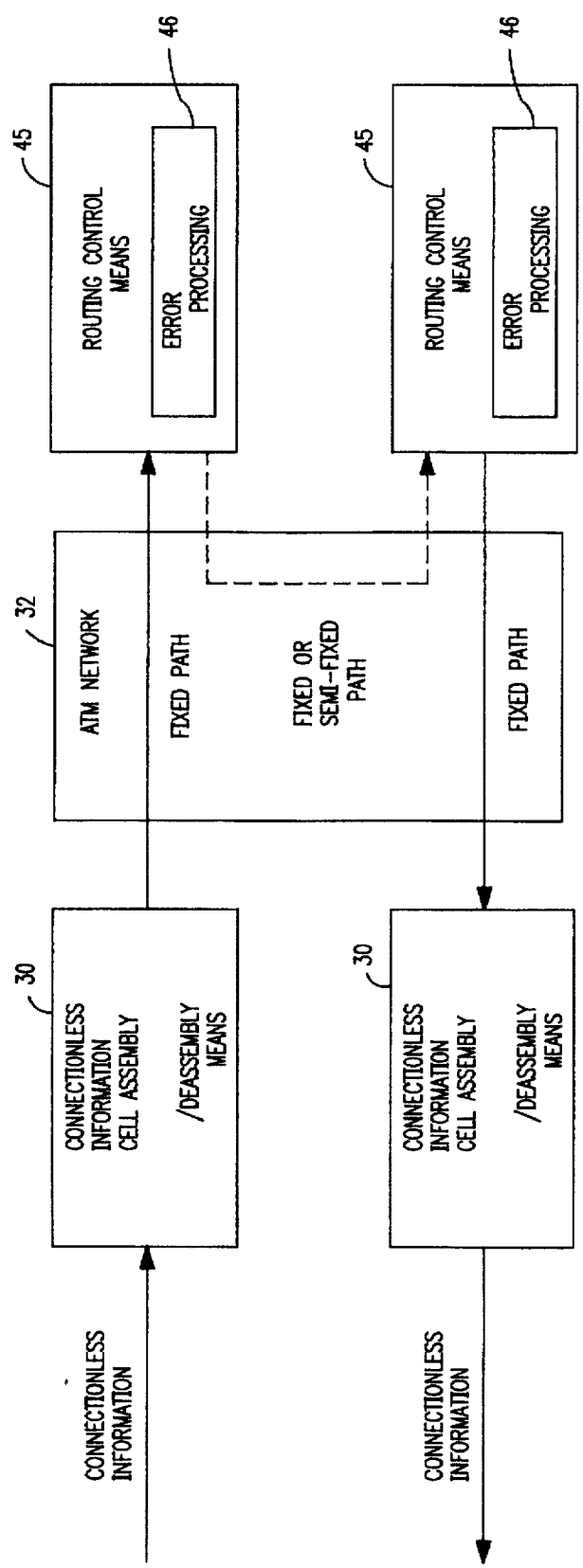
FIG. 12 is a basic block diagram of a ninth invention.
Figure 13:
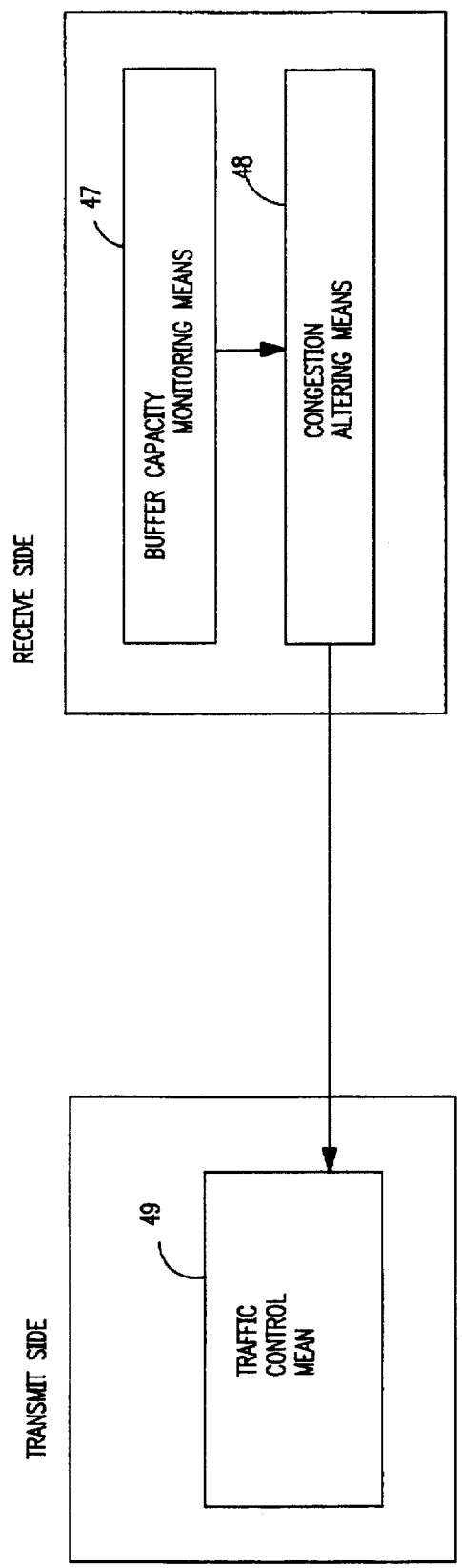
FIG. 13 is a basic block diagram of a tenth invention.

In FIG. 7, when ¾ of the capacity of the receiving cell buffer 273 is exceeded, an alarm signal is delivered from the buffer capacity monitoring section 274 to the periodic cell generating section 275 and the state alerting marking section 276. When, at this point, there are connectionless information cells to be transmitted to the sending side, the state alerting marking section 276 places a mark for alerting the sending side to the busy state in the reserve portion of the header of connectionless information cells. At the same time, a control signal is applied to the periodic cell generating section 275 to control the generation of state alerting cells. Consequently, the connectionless information cells are sent multiplexed by the multiplexing section 277 to the sending side. When there is no connectionless information cell to be sent, the state alerting cells generated by the periodic cell generating section 275 are used to alert the sending side to the busy state. In this case, data for alerting the sending side to the busy sate is inserted in the reserve portion of the header of those cells and then sent via the multiplexer section 277. It is supposed here that, in the cell format of FIG. 16(a), the state alerting cell has its 48-byte information part all vacated.

When alerted to the busy state at the receive side via the separator 282 at the sending terminal, the transmission control signal generator 283 generates a collision signal and then transmits it onto the outgoing bus. In controlling the transmission of cells from the cell buffer 280 to the bus, the CSMA/CD processing section 281 makes a bus scan. Upon detecting a collision signal generated by the transmission control signal generating section 283 in the same terminal, the CSMA/CD processing section 281 controls the transmission of connectionless information cells onto the bus in accordance with the access control method described previously.

In the tenth invention, when there are connectionless information cells to be transmitted to the sending side, the state alerting marking section 276 of FIG. 71 sets the reserve bit Rs of the ATM cell header to "H" for transmission to the sending side. When there is no connectionless information cell to be transmitted, on the other hand, the periodic cell generating section 275 sets the reserve bit Rs of its header to "H".

Figure 72:
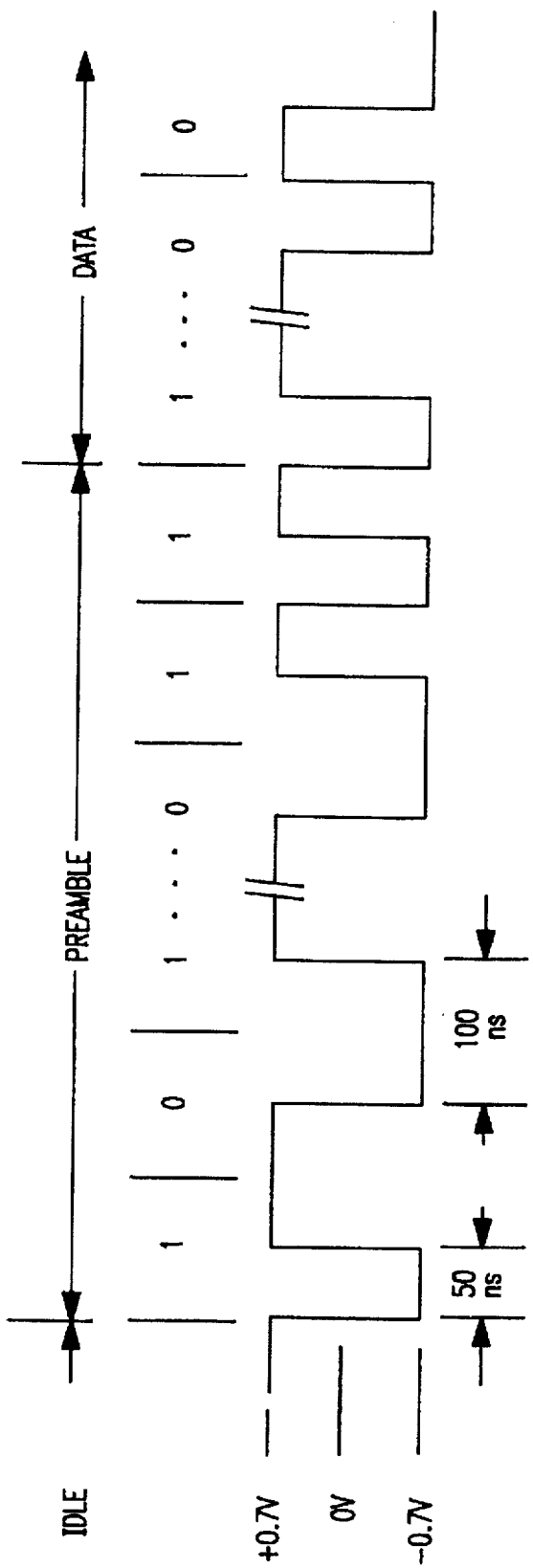
FIG. 72 illustrates an example of a preamble.

FIG. 72 illustrates one example of a preamble serving as a collision signal transmitted by the transmission control signal generating section 283 onto the outgoing bus when alerted to the busy state by the receiving side. In this figure, the preamble is a flag pattern laid down by the CSMA/CD protocol and has a duration as long as several tens of milliseconds.

In the above description, the present invention has been described by taking an ATM network as a communication network and LAN data as connectionless information. However, this is not restrictive. For example, use may be made of a multiple-label type of exchange network such as a MAN (Metropolitan Area Network) and other connectionless information than LAN data.

As described above in detail, the present invention permits efficient and fast routing of fixed-length ATM cells obtained by dividing variable-length connectionless information by the use of hardware, including the case where they are distributed to several destinations. An ATM network can be built in a form that includes local area networks, which will make great contributions to the development of communication systems.

Possibility of Utilizing the Invention in the Industry View

An ATM-network-based connectionless communication system according to the present invention is effective as a communication system for interconnecting two or more local area networks. The present invention is also applicable to communication systems in which various types of data other than LAN data are used as connectionless information, and a network other than an ATM network is used as a communication network.

What is claimed is:

1. A communication system for transmitting at least one fixed-length cell converted from a variable-length information including data and a destination of the data, comprising:

at least one cell assembly/disassembly means for performing bi-directional conversion between said variable-length information and said fixed-length cell;

at least one routing control means for receiving said fixed-length cell converted from said variable-length information by said cell assembly/disassembly means, for analyzing the destination of the data and for controlling a routing of said fixed-length cell based on the analyzed destination, said at least one routing control means including error detecting means for detecting an error of said variable-length information in said fixed-length cell; and a network for connecting said at least one cell aassembly/disassembly means and said at least one routing control means by a fixed capacity path and for connecting said at least one routing control means to each other by one of said fixed capacity path and a variable capacity path.

2. A communication system according to claim 1, wherein said error detecting means of a transmit-side routing control device is equipped with error alerting means for alerting a receive-side routing control device of an occurrence of said detected error by the use of an error alerting line which is distinct from said fixed capacity path and said variable capacity path used for transmitting said cells in said network.

3. A communication system according to claim 1, wherein said error detecting means of a transmit-side routing control device is equipped with a quasi-EOM cell generating means for, when detecting said error, generating a quasi-EOM cell in which EOM, indicating the last cell of a plurality of cells into which a message has been segmented by said cell assembly/disassembly means, is placed as a segment type and a message identifier (MID) for said message is stored, and sending said quasi-EOM cell to a receive-side routing control device, said receive-side routing control device being responsive to an arrival of said quasi-EOM cell to release said message identifier (MID) stored in said quasi-EOM cell.

4. A communication system according to claim 1, wherein said error detecting means of a transmit-side routing control device is equipped with a quasi-error cell generating means for, when detecting said error, generating a quasi-error cell in which a message identifier (MID) for said message is stored and sending said quasi-error cell to a receive-side routing control device, said receive-side routing control device being responsive to an arrival of said quasi-error cell to release said message identifier (MID) stored in said quasi-error cell.

5. A communication system according to claim 1, wherein said error detecting means of a transmit-side routing control device is equipped with a COM cell editing means (213) for, when detecting said error, editing a COM cell in which COM, indicating an intermediate cell of a plurality of cells into which a message has been segmented by said cell assembly/disassembly means, is placed as a segment type and a message identifier (MID) for said message is stored, and sending said COM cell to a receive-side routing control device, said receive-side routing control device being responsive to an arrival of said COM cell to release said message identifier (MID) stored in said COM cell.

6. A communication system for transmitting at least one fixed-length cell converted from a variable-length information including data and a destination of the data, comprising:

at least one cell assembly/disassembly means for performing bi-directional conversion between said variable-length information and said fixed-length cell;

at least one routing control means for receiving said fixed-length cell converted from said variable-length information by said cell assembly/disassembly means, for analyzing the destination of the data and for controlling a routing of said fixed-length cell based on the analyzed destination, said at least one routing control means including error processing means for detecting an error of said variable-length information in a first cell, including the destination of the data, of a plurality of cells into which the variable-length information has been segmented, and rejecting all of the cells following the first cell in which a message identifier has been placed; and a network for connecting said at least one cell assembly/disassembly means and said at least one routing control means by a fixed capacity path and for connecting said at least one routing control means to one another by one of said fixed capacity path and a variable capacity path.

7. A communication system according to claim 6, wherein said error processing means is equipped with at least one cell error detector for detecting at least one type of cell error, at least one header error detector for detecting at least one type of variable-length information error, said cell error detector and said header error detector being connected in series, and cell rejecting means for, when said error is detected in the first cell, rejecting all of the following cells in which a message identifier (MID) for that variable-length information has been stored.

8. A communication system according to claim 6, wherein said error processing means is equipped with at least one cell error detector for detecting at least one type of cell error, at least one header error detector for detecting at least one type of variable-length information error, said cell error detector and said header error detector being connected in series, and in which a routing section following said error processing means in said routing control means is equipped with cell rejecting means for, when said error is detected in the first cell containing said message header, rejecting all of the following cells in which the same message identifier (MID) as said variable-length information has been stored.

9. A communication system according to claim 8, wherein said at least one cell error detector and said at least one header error detector holds the result of error detection for said first cell in a predetermined bit position in a second cell immediately following said first cell and alerts one of the cell error detector, header error detector, cell rejecting means and routing control means of the second cell of the result of error detection.

10. A communication system according to claim 8, wherein said at least one cell error detector and said at least one header error detector holds the result of error detection for said first cell in a predetermined bit position on an error flag line for transmitting an error flag signal synchronized with a transmission of cells and alerts one of the cell error detector, header error detector, cell rejecting means and routing control means of a second cell following said first cell of the result of error detection.

11. A communication system for transmitting at least one fixed-length cell converted from a variable-length information including data and a destination of the data, comprising:

a plurality of routing control means for receiving said fixed-length cell converted from said variable-length information, for analyzing the destination of the data and for controlling a routing of said fixed-length cell based on the analyzed destination, said routing control means including error detecting means for detecting an error of said variable-length information in said fixed-length cell and alerting means for alerting the error to the other of said plurality of routing control means; and a network for connecting said routing control means to each other by one of a fixed capacity path and a variable capacity path.

12. A communication system for transmitting at least one fixed-length cell converted from a variable-length information including data and a destination of the data, comprising:

a plurality of routing control means for receiving said fixed-length cell converted from said variable-length information, for analyzing the destination of the data and for controlling a routing of said fixed-length cell based on the analyzed destination, said routing control means including error processing means for detecting an error in a first cell, having a message header, of a plurality of cells into which a message corresponding to the variable-length information has been segmented, and rejecting all of the cells following the first cell in which a message identifier has been placed, and alerting means for alerting the error to the other of said plurality of routing control means; and a network for connecting said routing control means to each other by a fixed capacity path or a variable capacity path.

13. A routing apparatus, connected via a first virtual connection to a converting apparatus, said converting apparatus converting variable-length information from a transmitting side including data and destination information into a fixed length packet, said routing apparatus comprising:

receiving means for receiving said fixed-length packet from the converting apparatus via the first virtual connection, said fixed-length packet having a header indicating the first virtual connection;

analyzing means for analyzing said destination information included in said fixed-length packet and determining a second virtual connection to route said fixed-length packet to a destination;

control means for rewriting said header in said fixed-length packet to indicate the second virtual connection;

sending means for sending said fixed-length packet to a receiving side via said second virtual connection;

error detecting means for detecting an error of said variable-length information in said fixed-length packet; and alerting means for alerting said error to another routing apparatus which is located in said receiving side of said fixed-length packet.

14. An exchange apparatus, connected via a virtual connection to a converting apparatus, the converting apparatus converting information including data and destination information from a transmitting side into at least one cell which is a fixed-length packet and assigning a header indicating a destination to the cell, said exchange apparatus receiving the cell via the virtual connection, said exchange apparatus comprising:

switching means for switching the cell according to the header of the cell; and routing processing means, connected to said switching means, for receiving the cell with the header, for analyzing the destination information of the information and for generating a corresponding result, for rewriting the header of the cell according to the result, for sending the cell to a receiving side in response to said result, for detecting an error of said information in said cell, and for alerting said error to another exchange apparatus which is located in said receiving side of said cell.

* * * * *

UNITED STATES PATENT AND TRADEMARK OFFICE
CERTIFICATE OF CORRECTION

PATENT NO.: 5,689,501
DATED : November 18, 1997
INVENTORS : Tadahiro TAKASE, et al.

It is certified that error appears in the above-identified patent and that said Letters Patent is hereby corrected as shown below:

Title page,

[Item 30] Foreign Priority Data, please add the following

| | | |
|---|---|---|
| --03-010770 | Japan | 01-31-91 |
| 03-55020 | Japan | 03-19-91 |
| 03-134745 | Japan | 06-06-91 |
| 03-143350 | Japan | 06-14-91 |
| 03-168038 | Japan | 07-09-91 |
| 03-208262 | Japan | 08-20-91-- |

Signed and Sealed this

Thirtieth Day of June, 1998

Attest:

BRUCE LEHMAN

Attesting Officer

Commissioner of Patents and Trademarks